United States Patent
Lapstun et al.

(10) Patent No.: US 7,961,364 B2
(45) Date of Patent: *Jun. 14, 2011

(54) METHOD OF DETERMINING ROTATIONAL ORIENTATION OF CODED DATA ON PRINT MEDIUM

(75) Inventors: Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/506,113

(22) Filed: Jul. 20, 2009

(65) Prior Publication Data

US 2009/0279148 A1 Nov. 12, 2009

Related U.S. Application Data

(63) Continuation of application No. 11/124,156, filed on May 9, 2005, now Pat. No. 7,595,904.

(51) Int. Cl.
*H04N 1/04* (2006.01)
*G06F 17/00* (2006.01)

(52) U.S. Cl. ........................ 358/488; 235/375

(58) Field of Classification Search .................. 358/488, 358/1.12, 1.15, 1.8, 539, 474, 1.16, 1.18; 455/557, 556.1; 340/426.1; 382/119, 187; 235/375, 494, 435, 472.01
See application file for complete search history.

(56) References Cited

U.S. PATENT DOCUMENTS

| | | |
|---|---|---|
| 4,901,090 A | 2/1990 | Ozawa et al. |
| 5,173,630 A | 12/1992 | Tanaka |
| 5,542,971 A | 8/1996 | Auslander et al. |
| 6,036,086 A | 3/2000 | Sizer, II et al. |
| 6,068,362 A | 5/2000 | Dunand et al. |
| 6,249,652 B1 | 6/2001 | Kamata et al. |
| 6,255,665 B1 | 7/2001 | Elgee et al. |
| 6,270,182 B1 | 8/2001 | Silverbrook et al. |
| 6,335,084 B1 | 1/2002 | Biegelson et al. |
| 6,405,055 B1 | 6/2002 | Silverbrook et al. |
| 6,409,401 B1 | 6/2002 | Petteruti et al. |
| 6,726,306 B2 | 4/2004 | Keyes et al. |
| 6,742,887 B2 | 6/2004 | Ando |
| 6,793,310 B2 | 9/2004 | Darby et al. |

(Continued)

FOREIGN PATENT DOCUMENTS

AU 711687 B 10/1999

(Continued)

*Primary Examiner* — Saeid Ebrahimi Dehkordy

(57) ABSTRACT

A method of determining a first relative rotation of coded data on a print medium to be printed on by a mobile device that has a printer, a first sensor and processing means. The print medium has a substrate defining first and second opposite faces, the first face bearing coded data. The method involves capturing a first image of the coded data when the print medium is at a first position using the first sensor, determining a first relative rotation of the coded data with respect to the print medium from a known physical orientation of the print medium and the first image, using the processing means, capturing a second image of the coded data when the print medium is at a second position using the first sensor, determining a second relative rotation of the coded data with respect to the print medium from a known physical orientation of the print medium and the second image, using the processing means and calculating a third rotation from the first and second rotations using the processing means. The third rotation is a more precise measure of the first relative rotation than the first relative rotation or the second relative rotation.

18 Claims, 58 Drawing Sheets

U.S. PATENT DOCUMENTS

| | | |
|---|---|---|
| 6,823,065 B1 | 11/2004 | Cook |
| 6,827,263 B2 | 12/2004 | Yap et al. |
| 6,916,128 B1 | 7/2005 | Petteruti et al. |
| 7,192,208 B2 | 3/2007 | Meyerhofer |
| 7,551,305 B2 * | 6/2009 | Lapstun et al. ............ 358/1.15 |
| 7,572,077 B2 | 8/2009 | Lapstun et al. |
| 7,595,904 B2 | 9/2009 | Lapstun |
| 7,735,993 B2 | 6/2010 | Silverbrook et al. |
| 2001/0032251 A1 | 10/2001 | Rhoads et al. |
| 2001/0038399 A1 | 11/2001 | Lund et al. |
| 2002/0097223 A1 | 7/2002 | Rosenberg |
| 2002/0143643 A1 | 10/2002 | Catan |
| 2003/0076376 A1 | 4/2003 | Greeven et al. |
| 2003/0095160 A1 | 5/2003 | Ogiwara |
| 2003/0095810 A1 | 5/2003 | Haines et al. |
| 2003/0103611 A1 | 6/2003 | Lapstun et al. |
| 2003/0122907 A1 | 7/2003 | Kim |
| 2003/0189610 A1 | 10/2003 | Darby et al. |
| 2003/0194254 A1 | 10/2003 | Guddanti et al. |
| 2004/0047003 A1 | 3/2004 | Silverbrook et al. |
| 2004/0075711 A1 | 4/2004 | Silverbrook et al. |
| 2004/0111322 A1 | 6/2004 | Arias |
| 2004/0117627 A1 | 6/2004 | Brewington |
| 2004/0212648 A1 | 10/2004 | Arakawa et al. |
| 2005/0046667 A1 | 3/2005 | Ando et al. |
| 2005/0073539 A1 | 4/2005 | McGarry et al. |
| 2005/0073544 A1 | 4/2005 | Scofield et al. |
| 2005/0203854 A1 | 9/2005 | Das et al. |

FOREIGN PATENT DOCUMENTS

| | | |
|---|---|---|
| GB | 2295939 A | 6/1996 |
| WO | WO 01/05047 A1 | 1/2001 |
| WO | WO 01/41480 A1 | 6/2001 |

* cited by examiner

FIG. 77
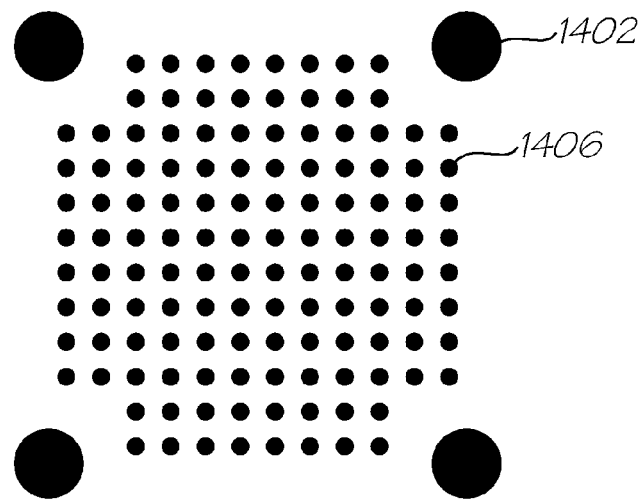
FIG. 78
| 00 | 10 |
|----|----|
| 01 | 11 |
FIG. 79

|  |  |  |  |  |  |
|---|---|---|---|---|---|
| 00 | 10 | 00 | 10 | 00 | 10 |
| 01 | 11 | 01 | 11 | 01 | 11 |
| 00 | 10 | 00 | 10 | 00 | 10 |
| 01 | 11 | 01 | 11 | 01 | 11 |

1400

METHOD OF DETERMINING ROTATIONAL ORIENTATION OF CODED DATA ON PRINT MEDIUM

CROSS REFERENCE TO RELATED APPLICATION

This application is a continuation of U.S. application Ser. No. 11/124,156 filed May 9, 2005 all of which are herein incorporated by reference.

FIELD OF INVENTION

The present invention relates to determining the rotational orientation of a print medium within the media feed path of a mobile device. The invention has primarily been designed for use in a mobile telecommunications device (i.e. a mobile phone) that incorporates a printer, and will be described with reference to such an application. However, it will be appreciated by those skilled in the art that the invention can be used with other types of portable device, or even non-portable devices.

COPENDING APPLICATIONS

The following applications have been filed by the Applicant simultaneously with application Ser. No. 11/124,156:

| | | | | |
|---|---|---|---|---|
| 11/124,158 | 11/124,196 | 11/124,199 | 11/124,162 | 11/124,202 |
| 11/124,197 | 11/124,154 | 11/124,198 | 7,284,921 | 11/124,151 |
| 7,407,257 | 7,470,019 | 11/124,175 | 7,392,950 | 11/124,149 |
| 7,360,880 | 11/124,173 | 7,517,046 | 7,236,271 | 11/124,174 |
| 11/124,194 | 11/124,164 | 7,465,047 | 11/124,195 | 11/124,166 |
| 11/124,150 | 11/124,172 | 11/124,165 | 11/124,186 | 11/124,185 |
| 11/124,184 | 11/124,182 | 11/124,201 | 11/124,171 | 11/124,181 |
| 11/124,161 | 11/124,191 | 11/124,159 | 7,466,993 | 7,370,932 |
| 7,404,616 | 11/124,187 | 11/124,189 | 11/124,190 | 7,500,268 |
| 11/124,193 | 7,447,908 | 11/124,178 | 11/124,177 | 7,456,994 |
| 7,431,449 | 7,466,444 | 11/124,179 | 11/124,169 | |

The disclosures of these co-pending applications are incorporated herein by reference.

CROSS REFERENCES

The following patents or patent applications filed by the applicant or assignee of the present invention are hereby incorporated by cross-reference.

| | | | | |
|---|---|---|---|---|
| 6,405,055 | 6,628,430 | 7,136,186 | 7,286,260 | 7,145,689 |
| 7,130,075 | 7,081,974 | 7,177,055 | 7,209,257 | 7,161,715 |
| 7,154,632 | 7,158,258 | 7,148,993 | 7,075,684 | 7,241,005 |
| 7,108,437 | 6,915,140 | 6,999,206 | 7,136,198 | 7,092,130 |
| 6,750,901 | 6,476,863 | 6,788,336 | 7,170,652 | 6,967,750 |
| 6,995,876 | 7,099,051 | 7,453,586 | 7,193,734 | 7,095,533 |
| 6,914,686 | 7,161,709 | 7,099,033 | 7,364,256 | 7,258,417 |
| 7,293,853 | 7,328,968 | 7,270,395 | 7,461,916 | 7,510,264 |
| 7,334,864 | 7,255,419 | 7,284,819 | 7,229,148 | 7,258,416 |
| 7,273,263 | 7,270,393 | 6,984,017 | 7,347,526 | 7,357,477 |
| 7,465,015 | 7,364,255 | 7,357,476 | 11/003,614 | 7,284,820 |
| 7,341,328 | 7,246,875 | 7,322,669 | 10/815,621 | 7,243,835 |
| 10/815,630 | 10/815,637 | 10/815,638 | 7,251,050 | 10/815,642 |
| 7,097,094 | 7,137,549 | 10/815,618 | 7,156,292 | 10/815,635 |
| 7,357,323 | 10/815,634 | 7,137,566 | 7,131,596 | 7,128,265 |
| 7,197,374 | 7,175,089 | 10/815,617 | 7,537,160 | 7,178,719 |
| 7,506,808 | 7,207,483 | 7,296,737 | 7,270,266 | 10/815,614 |
| 10/815,636 | 7,128,270 | 11/041,650 | 11/041,651 | 7,506,168 |
| 7,441,712 | 11/041,610 | 11/041,609 | 11/041,626 | 7,537,157 |
| 11/041,624 | 7,395,963 | 7,457,961 | 11/041,580 | 7,467,300 |
| 7,467,299 | 11/041,648 | 7,457,007 | 7,150,398 | 7,159,777 |
| 7,450,273 | 7,188,769 | 7,097,106 | 7,070,110 | 7,243,849 |
| 6,623,101 | 6,406,129 | 6,505,916 | 6,457,809 | 6,550,895 |
| 6,457,812 | 7,152,962 | 6,428,133 | 6,231,148 | 6,293,658 |
| 6,614,560 | 6,238,033 | 6,312,070 | 6,238,111 | 6,378,970 |
| 6,196,739 | 6,270,182 | 6,152,619 | 7,006,143 | 6,876,394 |
| 6,738,096 | 6,970,186 | 6,287,028 | 6,412,993 | 11/033,145 |
| 7,204,941 | 7,282,164 | 7,465,342 | 7,278,727 | 7,417,141 |
| 7,452,989 | 7,367,665 | 7,138,391 | 7,153,956 | 7,423,145 |
| 7,456,277 | 10/913,376 | 7,122,076 | 7,148,345 | 7,416,280 |
| 7,156,508 | 7,159,972 | 7,083,271 | 7,165,834 | 7,080,894 |
| 7,201,469 | 7,090,336 | 7,156,489 | 7,413,283 | 7,438,385 |
| 7,083,257 | 7,258,422 | 7,255,423 | 7,219,980 | 10/760,253 |
| 7,416,274 | 7,367,649 | 7,118,192 | 10/760,194 | 7,322,672 |
| 7,077,505 | 7,198,354 | 7,077,504 | 10/760,189 | 7,198,355 |
| 7,401,894 | 7,322,676 | 7,152,959 | 7,213,906 | 7,178,901 |
| 7,222,938 | 7,108,353 | 7,104,629 | 7,246,886 | 7,128,400 |
| 7,108,355 | 6,991,322 | 7,287,836 | 7,118,197 | 10/728,784 |
| 7,364,269 | 7,077,493 | 6,962,402 | 10/728,803 | 7,147,308 |
| 7,524,034 | 7,118,198 | 7,168,790 | 7,172,270 | 7,229,155 |
| 6,830,318 | 7,195,342 | 7,175,261 | 7,465,035 | 7,108,356 |
| 7,118,202 | 7,510,269 | 7,134,744 | 7,510,270 | 7,134,743 |
| 7,182,439 | 7,210,768 | 7,465,036 | 7,134,745 | 7,156,484 |
| 7,118,201 | 7,111,926 | 7,431,433 | 7,018,021 | 7,401,901 |
| 7,468,139 | 10/944,043 | 7,156,289 | 7,178,718 | 7,225,979 |
| 7,540,429 | 11/084,742 | 11/084,806 | 09/575,197 | 7,079,712 |
| 6,825,945 | 7,330,974 | 6,813,039 | 7,190,474 | 6,987,506 |
| 6,824,044 | 7,038,797 | 6,980,318 | 6,816,274 | 7,102,772 |
| 7,350,236 | 6,681,045 | 6,678,499 | 6,679,420 | 6,963,845 |
| 6,976,220 | 6,728,000 | 7,110,126 | 7,173,722 | 6,976,035 |
| 6,813,558 | 6,766,942 | 6,965,454 | 6,995,859 | 7,088,459 |
| 6,720,985 | 7,286,113 | 6,922,779 | 6,978,019 | 6,847,883 |
| 7,131,058 | 7,295,839 | 7,406,445 | 7,533,031 | 6,959,298 |
| 6,973,450 | 7,150,404 | 6,965,882 | 7,233,924 | 09/575,181 |
| 09/722,174 | 7,175,079 | 7,162,259 | 6,718,061 | 7,464,880 |
| 7,012,710 | 6,825,956 | 7,451,115 | 7,222,098 | 10/291,825 |
| 7,263,508 | 7,031,010 | 6,972,864 | 6,862,105 | 7,009,738 |
| 6,989,911 | 6,982,807 | 7,518,756 | 6,829,387 | 6,714,678 |
| 6,644,545 | 6,609,653 | 6,651,879 | 10/291,555 | 7,293,240 |
| 7,467,185 | 7,415,668 | 7,044,363 | 7,004,390 | 6,867,880 |
| 7,034,953 | 6,987,581 | 7,216,224 | 7,506,153 | 7,162,269 |
| 7,162,222 | 7,290,210 | 7,293,233 | 7,293,234 | 6,850,931 |
| 6,865,570 | 6,847,961 | 10/685,523 | 10/685,583 | 7,162,442 |
| 10/685,584 | 7,159,784 | 10/804,034 | 7,404,144 | 6,889,896 |
| 10/831,232 | 7,174,056 | 6,996,274 | 7,162,088 | 7,388,985 |
| 7,417,759 | 7,362,463 | 7,259,884 | 7,167,270 | 7,388,685 |
| 6,986,459 | 10/954,170 | 7,181,448 | 10/981,626 | 10/981,616 |
| 7,324,989 | 7,231,293 | 7,174,329 | 7,369,261 | 7,295,922 |
| 7,200,591 | 11/020,106 | 11/020,260 | 11/020,321 | 11/020,319 |
| 7,466,436 | 7,347,357 | 11/051,032 | 7,382,482 | 11/107,944 |
| 7,446,893 | 11/082,940 | 11/082,815 | 7,389,423 | 7,401,227 |
| 6,991,153 | 6,991,154 | 7,068,382 | 7,007,851 | 6,957,921 |
| 6,457,883 | 7,044,381 | 7,094,910 | 7,091,344 | 7,122,685 |
| 7,038,066 | 7,099,019 | 7,062,651 | 6,789,194 | 6,789,191 |
| 7,529,936 | 7,278,018 | 7,360,089 | 7,526,647 | 7,467,416 |
| 6,644,642 | 6,502,614 | 6,622,999 | 6,669,385 | 6,827,116 |
| 7,011,128 | 7,416,009 | 6,549,935 | 6,987,573 | 6,727,996 |
| 6,591,884 | 6,439,706 | 6,760,119 | 7,295,332 | 7,064,851 |
| 6,826,547 | 6,290,349 | 6,428,155 | 6,785,016 | 6,831,682 |
| 6,741,871 | 6,927,871 | 6,980,306 | 6,965,439 | 6,840,606 |
| 7,036,918 | 6,977,746 | 6,970,264 | 7,068,389 | 7,093,991 |
| 7,190,491 | 7,511,847 | 10/932,044 | 10/962,412 | 7,177,054 |
| 7,364,325 | 10/965,733 | 10/965,933 | 10/974,742 | 7,468,809 |
| 7,180,609 | 7,538,793 | 7,466,438 | 6,982,798 | 6,870,966 |
| 6,822,639 | 6,474,888 | 6,627,870 | 6,724,374 | 6,788,982 |
| 7,263,270 | 6,788,293 | 6,946,672 | 6,737,591 | 7,091,960 |
| 7,369,265 | 6,792,165 | 7,105,753 | 6,795,593 | 6,980,704 |
| 6,768,821 | 7,132,612 | 7,041,916 | 6,797,895 | 7,015,901 |
| 7,289,882 | 7,148,644 | 10/778,056 | 10/778,058 | 10/778,060 |
| 7,515,186 | 10/778,063 | 10/778,062 | 10/778,061 | 10/778,057 |
| 7,096,199 | 7,286,887 | 7,400,937 | 7,474,930 | 7,324,859 |
| 7,218,978 | 7,245,294 | 7,277,085 | 7,187,370 | 10/917,436 |
| 10/943,856 | 10/919,379 | 7,019,319 | 10/943,878 | 10/943,849 |
| 7,043,096 | 7,148,499 | 7,055,739 | 7,233,320 | 6,830,196 |
| 6,832,717 | 7,182,247 | 7,120,853 | 7,082,562 | 6,843,420 |
| 10/291,718 | 6,789,731 | 7,057,608 | 6,766,944 | 6,766,945 |
| 7,289,103 | 7,412,651 | 7,299,969 | 7,108,192 | 7,111,791 |
| 7,077,333 | 6,983,878 | 10/786,631 | 7,134,598 | 7,431,219 |
| 6,929,186 | 6,994,264 | 7,017,826 | 7,014,123 | 7,134,601 |

-continued

| | | | | |
|---|---|---|---|---|
| 7,150,396 | 7,469,830 | 7,017,823 | 7,025,276 | 7,284,701 |
| 7,080,780 | 7,376,884 | 10/492,169 | 7,469,062 | 7,359,551 |
| 7,444,021 | 7,308,148 | 10/502,575 | 10/683,040 | 10/510,391 |
| 10/510,392 | 7,526,128 | 6,957,768 | 7,456,820 | 7,170,499 |
| 7,106,888 | 7,123,239 | 6,982,701 | 6,982,703 | 7,227,527 |
| 6,786,397 | 6,947,027 | 6,975,299 | 7,139,431 | 7,048,178 |
| 7,118,025 | 6,839,053 | 7,015,900 | 7,010,147 | 7,133,557 |
| 6,914,593 | 7,437,671 | 6,938,826 | 7,278,566 | 7,123,245 |
| 6,992,662 | 7,190,346 | 7,417,629 | 7,468,724 | 7,382,354 |
| 11/075,917 | 7,221,781 | 11/102,843 | 10/727,181 | 10/727,162 |
| 7,377,608 | 7,399,043 | 7,121,639 | 7,165,824 | 7,152,942 |
| 10/727,157 | 7,181,572 | 7,096,137 | 7,302,592 | 7,278,034 |
| 7,188,282 | 10/727,159 | 10/727,180 | 10/727,179 | 10/727,192 |
| 10/727,274 | 10/727,164 | 7,523,111 | 10/727,198 | 10/727,158 |
| 10/754,536 | 10/754,938 | 10/727,160 | 10/934,720 | 6,795,215 |
| 7,070,098 | 7,154,638 | 6,805,419 | 6,859,289 | 6,977,751 |
| 6,398,332 | 6,394,573 | 6,622,923 | 6,747,760 | 6,921,144 |
| 10/884,881 | 7,092,112 | 7,192,106 | 7,457,001 | 7,374,266 |
| 7,427,117 | 7,448,707 | 7,281,330 | 10/854,503 | 7,328,956 |
| 10/854,509 | 7,188,928 | 7,093,989 | 7,377,609 | 10/854,495 |
| 10/854,498 | 10/854,511 | 7,390,071 | 10/854,525 | 10/854,526 |
| 10/854,516 | 7,252,353 | 10/854,515 | 7,267,417 | 10/854,505 |
| 7,517,036 | 7,275,805 | 7,314,261 | 10/854,490 | 7,281,777 |
| 7,290,852 | 7,484,831 | 10/854,523 | 10/854,527 | 10/854,524 |
| 10/854,520 | 10/854,514 | 10/854,519 | 10/854,513 | 10/854,499 |
| 10/854,501 | 7,266,661 | 7,243,193 | 10/854,518 | 10/934,628 |
| 7,448,734 | 7,425,050 | 7,364,263 | 7,201,468 | 7,360,868 |
| 7,234,802 | 7,303,255 | 7,287,846 | 7,156,511 | 10/760,264 |
| 7,258,432 | 7,097,291 | 10/760,222 | 10/760,248 | 7,083,273 |
| 7,367,647 | 7,374,355 | 7,441,880 | 10/760,205 | 10/760,206 |
| 7,513,598 | 10/760,270 | 7,198,352 | 7,364,264 | 7,303,251 |
| 7,201,470 | 7,121,655 | 7,293,861 | 7,232,208 | 7,328,985 |
| 7,344,232 | 7,083,272 | 11/014,764 | 11/014,763 | 7,331,663 |
| 7,360,861 | 7,328,973 | 7,427,121 | 7,407,262 | 7,303,252 |
| 7,249,822 | 7,537,309 | 7,311,382 | 7,360,860 | 7,364,257 |
| 7,390,075 | 7,350,896 | 7,429,096 | 7,384,135 | 7,331,660 |
| 7,416,287 | 7,488,052 | 7,322,684 | 7,322,685 | 7,311,381 |
| 7,270,405 | 7,303,268 | 7,470,007 | 7,399,072 | 7,393,076 |
| 11/014,750 | 11/014,749 | 7,249,833 | 7,524,016 | 7,490,927 |
| 7,331,661 | 7,524,043 | 7,300,140 | 7,357,492 | 7,357,493 |
| 11/014,766 | 7,380,902 | 7,284,816 | 7,284,845 | 7,255,430 |
| 7,390,080 | 7,328,984 | 7,350,913 | 7,322,671 | 7,380,910 |
| 7,431,424 | 7,470,006 | 11/014,732 | 7,347,534 | 6,454,482 |
| 6,808,330 | 6,527,365 | 6,474,773 | 6,550,997 | 7,093,923 |
| 6,957,923 | 7,131,724 | 7,396,177 | 7,168,867 | 7,125,098 |
| 7,322,677 | 7,484,841 | 7,079,292 | | |

BACKGROUND OF INVENTION

The Assignee has developed mobile phones, personal data assistants (PDAs) and other mobile telecommunication devices, with the ability to print hard copies of images or information stored or accessed by the device (see for example, U.S. Pat. No. 6,405,055, filed on Nov. 9, 1999). Likewise, the Assignee has also designed digital cameras with the ability to print captured images with an inbuilt printer (see for example, U.S. Pat. No. 6,750,901 filed on Jul. 10, 1998). As the prevalence of mobile telecommunications devices with digital cameras increases, the functionality of these devices is further enhanced by the ability to print hard copies.

As these devices are portable, they must be compact for user convenience. Accordingly, any printer incorporated into the device needs to maintain a small form factor. Also, the additional load on the battery should be as little as possible. Furthermore, the consumables (ink and paper etc) should be relatively inexpensive and simple to replenish. It is these factors that strongly influence the commercial success or otherwise of products of this type. With these basic design imperatives in mind, there are on-going efforts to improve and refine the functionality of these devices.

The Assignee of the present invention has also developed the Netpage system for enabling interaction with computer software using a printed interface and a proprietary stylus-shaped sensing device.

As described in detail in U.S. Pat. No. 6,792,165, filed on Nov. 25, 2000 and U.S. patent application Ser. No. 10/778,056, filed on Feb. 17, 2004, a Netpage pen captures, identifies and decodes tags of coded data printed onto a surface such as a page. In a preferred Netpage implementation, each tag encodes a position and an identity of the document. By decoding at least one of the tags and transmitting the position (or a refined version of the position, representing a higher resolution position of the pen) and identity referred to by the decoded tag, a remote computer can determine an action to perform. Such actions can include, for example, causing information to be saved remotely for subsequent retrieval, downloading of a webpage for printing or display via a computer, bill payment or even the performance of handwriting recognition based on a series of locations of the Netpage pen relative to the surface. These and other applications are described in many of the Netpage-related applications cross-referenced by the present application.

When printing onto a print medium, it is desirable in some cases to determine the relative rotation of coded data relative to the print medium upon which it is disposed.

SUMMARY OF INVENTION

In a first aspect the present invention provides a method of using a mobile device to determine a first relative rotation of coded data on a print medium, the print medium configured to be printed on by the mobile device in a print direction, the mobile device including a printer, a first sensor and processing means, the print medium comprising a laminar substrate defining first and second opposite faces, the first face bearing coded data, the method comprising the steps of:

(a) using the first sensor to capture a first image of at least some of the coded data when the print medium is at a first position;

(b) using the processing means to determine, from a known physical orientation of the print medium and the first image, a first relative rotation of the coded data with respect to the print medium.

Optionally the mobile device further includes a transmitter, the method further including the step of transmitting, using the transmitter, the first relative rotation to a remote computer system.

Optionally the transmitter is configured to transmit the relative rotation via a mobile telecommunications network.

Optionally the method further including the steps of:

using the first sensor to capture a second image of at least some of the coded data when the print medium is at a second position;

using the processing means to determine, from a known physical orientation of the print medium and the second image, a second relative rotation of the coded data with respect to the print medium; and using the processing means to calculate, from the first and second rotations, a third rotation, the third rotation being a more accurate indication of the relative rotation of the coded data with respect to the print medium than the first or second rotations.

Optionally the mobile device further includes a transmitter, the method further including the step of transmitting, using the transmitter, the third relative rotation to a remote computer system.

Optionally the method further including the steps, performed by the processing means, of:
decoding at least some of the coded data in the first image;
determining a location from the decoded data; and
determining, based on the location and a position of the coded data within the first image, a first position of the print medium relative to the first sensor at time the first image was captured.

Optionally determining the movement includes capturing a plurality of images of the coded data as the print medium moves past the first sensor, and determining the movement based on the plurality of images.

Optionally the mobile device further including a light emitting device, the method including the step of using the light emitting device to illuminate the print medium while the first sensor senses the coded data.

Optionally the method further including the steps of generating a clock signal based on the movement, and using the clock signal to synchronize the printing onto the print medium.

Optionally the coded data takes the form of a two-dimensional array of data, the first sensor being configured to capture an image of a subset of the coded data, the subset of the coded data being sufficient to enable the position to be determined.

Optionally the method including the steps, performed during printing onto the print medium, of:
using the first sensor to sense the coded data; and
using the processing means to generate a clock signal based on the sensed coded data; and
using the clock signal to synchronize the printing onto the print medium.

Optionally the step of using the first sensor to sense the coded data includes capturing a first image of the coded data, and the step of generating the clock signal includes using the processor to perform the steps of;
determining a position of the print medium relative to the first sensor at the time the coded data was sensed, based at least partly on the determined location;
using the first sensor to capture subsequent images of the coded data as the printhead is being printed;
determining movement of the print medium during printing based on the subsequently captured images; and
deriving the clock signal based on the movement.

Optionally determining the movement during printing includes using the processing means to perform the steps of:
decoding the coded data captured in at least some of the subsequently captured images;
determining a position of the print medium relative to the first sensor at the time each of the images was captured; and
determining the movement of the print medium based on the positions determined over time.

Optionally determining the movement during printing includes the step of performing pattern recognition on at least some of the coded data in at least some of the captured images to determine movement of the print medium relative to initial position.

Optionally the print medium includes at least one orientation indicator indicative of an orientation of the print medium, the method comprising determining the orientation from the orientation indicator before commencing printing.

Optionally the at least one orientation indicator is disposed at or adjacent an edge of the print medium.

Optionally the print medium having a leading edge and a trailing edge defined relative to intended feed direction of the print medium through a media feed path, at least one of the at least one orientation indicators being disposed on or in the print medium at or adjacent the leading edge.

Optionally the method further including the steps of:
using a second sensor to capture a second image of at least some of the coded data;
using the processing means to determine, from a known physical orientation of the print medium and the second image, a second relative rotation of the coded data with respect to the print medium; and
using the processing means to calculate, from the first and second rotations, a third rotation, the third rotation being a more accurate indication of the relative rotation of the coded data with respect to the print medium than the first or second rotations.

Optionally the method including capturing the first and second images substantially simultaneously.

TERMINOLOGY

Mobile device: When used herein, the phrase "mobile device" is intended to cover all devices that by default operate on a portable power source such as a battery. As well as including the mobile telecommunications device defined above, mobile devices include devices such as cameras, non telecommunications-enabled PDAs and hand-held portable game units. "Mobile devices" implicitly includes "mobile telecommunications devices", unless the converse is clear from the context.

Mobile telecommunications device: When used herein, the phrase "mobile telecommunications device" is intended to cover all forms of device that enable voice, video, audio and/or data transmission and/or reception. Typical mobile telecommunications devices include:
GSM and 3G mobile phones (cellphones) of all generational and international versions, whether or not they incorporate data transmission capabilities; and
PDAs incorporating wireless data communication protocols such as GPRS/EDGE of all generational and international versions.

M-Print: The assignee's internal reference for a mobile printer, typically incorporated in a mobile device or a mobile telecommunications device. Throughout the specification, any reference made to the M-Print printer is intended to broadly include the printing mechanism as well as the embedded software which controls the printer, and the reading mechanism(s) for the media coding.

M-Print mobile telecommunications device: a mobile telecommunications device incorporating a Memjet printer.

Netpage mobile telecommunications device: a mobile telecommunications device incorporating a Netpage-enabled Memjet printer and/or a Netpage pointer.

Throughout the specification, the blank side of the medium intended to be printed on by the M-Print printer is referred to as the front side. The other side of the medium, which may be pre-printed or blank, is referred to as the back side.

Throughout the specification, the dimension of the medium parallel to the transport direction is referred to as the longitudinal dimension. The orthogonal dimension is referred to as the lateral dimension.

Furthermore, where the medium is hereafter referred to as a card, it should be understood that this is not meant to imply anything specific about the construction of the card. It may be made of any suitable material including paper, plastic, metal, glass and so on. Likewise, any references to the card having been pre-printed, either with graphics or with the media coding itself, is not meant to imply a particular printing process or even printing per se. The graphics and/or media coding can be disposed on or in the card by any suitable means.

BRIEF DESCRIPTION OF THE DRAWINGS

Preferred embodiments of the invention will now be described by way of example only, with reference to the accompanying drawings, in which:

FIG. 38 is a lateral cross section of the print cartridge inserted into the cradle assembly;

FIG. 77 shows the ordering of the bits within the symbol;

FIG. 78 shows a single Netpage tag with every bit set;

FIG. 79 shows a tag group of four tags;

DETAILED DESCRIPTION OF THE PREFERRED EMBODIMENTS

Mobile Telecommunications Device Overview

Whilst the main embodiment includes both Netpage and printing functionality, only one or the other of these features is provided in other embodiments.

Figure 1:
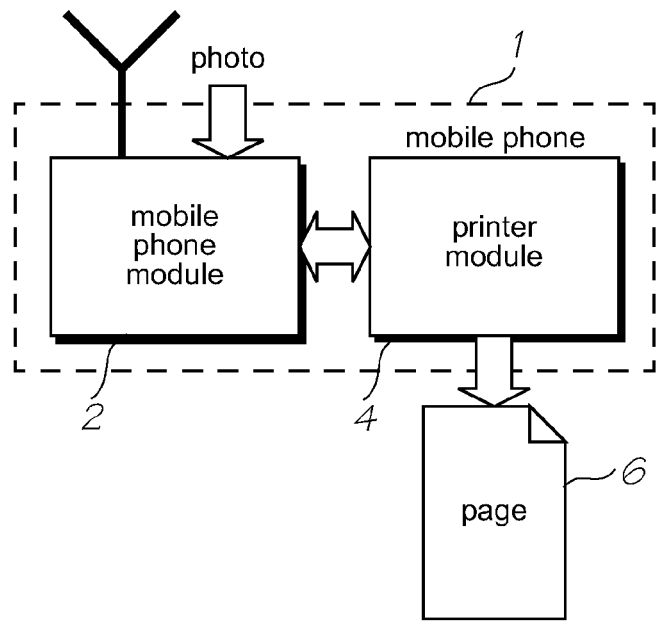
FIG. 1 is a schematic representation of the modular interaction in a printer/mobile phone.

One such embodiment is shown in FIG. 1, in which a mobile telecommunications device in the form of a mobile phone 1 (also known as a "cellphone") includes a mobile phone module 2 and a printer module 4. The mobile phone module is configured to send and receive voice and data via a telecommunications network (not shown) in a conventional manner known to those skilled in the art. The printer module 4 is configured to print a page 6. Depending upon the particular implementation, the printer module 4 can be configured to print the page 6 in color or monochrome.

The mobile telecommunications device can use any of a variety of known operating systems, such as Symbian (with UIQ and Series 60 GUIs), Windows Mobile, PalmOS, and Linux.

In the preferred embodiment (described in more detail below), the print media is pre-printed with tags, and the printer module 4 prints visible information onto the page 6 in registration with the tags. In other embodiments, Netpage tags are printed by the printer module onto the page 6 along with the other information. The tags can be printed using either the same visible ink as used to print visible information, or using an infrared or other substantially invisible ink.

The information printed by the printer module 4 can include user data stored in the mobile phone 1 (including phonebook and appointment data) or text and images received via the telecommunications network or from another device via a communication mechanism such as Bluetooth™ or infrared transmission. If the mobile phone 1 includes a camera, the printer module 4 can be configured to print the captured images. In the preferred form, the mobile phone module 2 provides at least basic editing capabilities to enable cropping, filtering or addition of text or other image data to the captured image before printing.

The configuration and operation of the printer module 4 is described in more detail below in the context of various types of mobile telecommunication device that incorporate a printhead.

Figure 2:
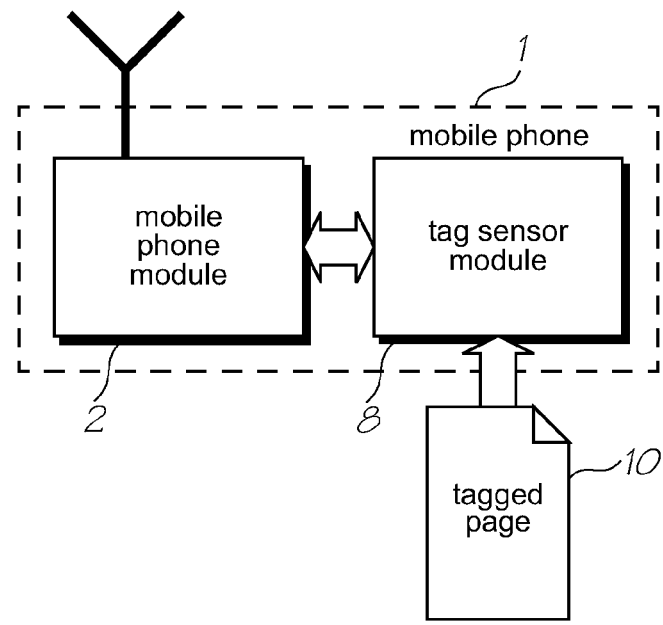
FIG. 2 is a schematic representation of the modular interaction in a tag sensor/mobile phone.

FIG. 2 shows another embodiment of a mobile telecommunications device, in which the printer module 4 is omitted, and a Netpage tag sensor module 8 is included. The Netpage module 8 enables interaction between the mobile phone 1 and a page 10 including Netpage tags. The configuration and operation of the Netpage pointer in a mobile phone 1 is described in more detail below. Although not shown, the mobile phone 1 with Netpage module 8 can include a camera.

Figure 3:
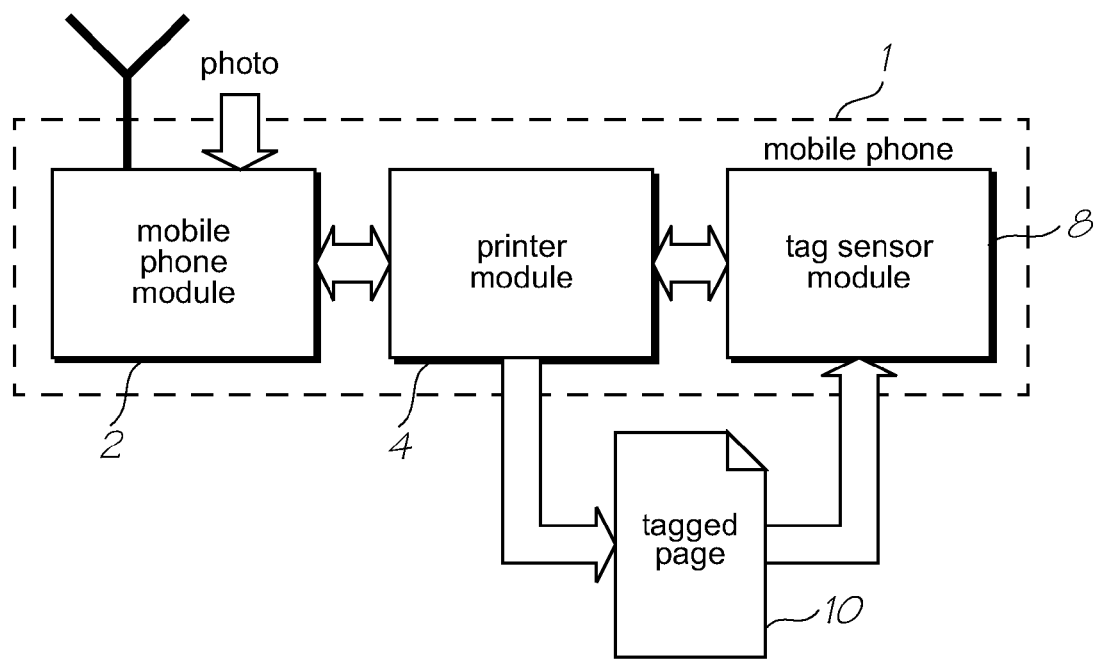
FIG. 3 is a schematic representation of the modular interaction in a printer/tag sensor/mobile phone.

FIG. 3 shows a mobile phone 1 that includes both a printer module 4 and a Netpage tag sensor module 8. As with the embodiment of FIG. 2, the printer module 4 can be configured to print tagged or untagged pages. As shown in FIG. 3, where tagged pages 10 are produced (and irrespective of whether the tags were pre-printed or printed by the printer module 4), the Netpage tag sensor module 8 can be used to interact with the resultant printed media.

Figure 4:
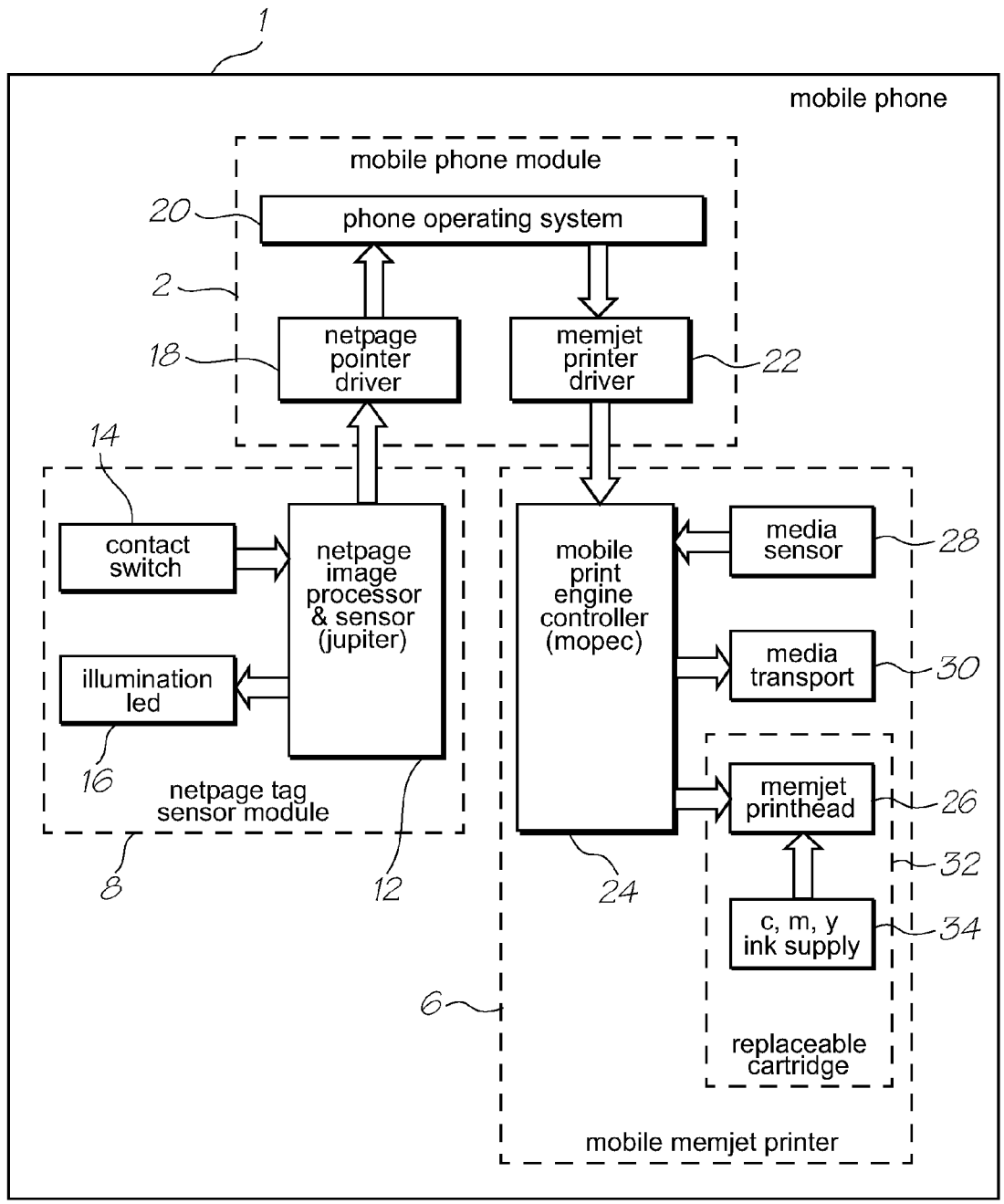
FIG. 4 is a more detailed schematic representation of the architecture within the mobile phone of FIG. 3.

A more detailed architectural view of the mobile phone 1 of FIG. 3 is shown in FIG. 4, in which features corresponding to those shown in FIG. 3 are indicated with the same reference numerals. It will be appreciated that FIG. 4 deals only with communication between various electronic components in the mobile telecommunications device and omits mechanical features. These are described in more detail below.

The Netpage tag sensor module 8 includes a monolithically integrated Netpage image sensor and processor 12 that captures image data and receives a signal from a contact switch 14. The contact switch 14 is connected to a nib (not shown) to determine when the nib is pressed into contact with a surface. The sensor and processor 12 also outputs a signal to control illumination of an infrared LED 16 in response to the stylus being pressed against the surface.

The image sensor and processor 12 outputs processed tag information to a Netpage pointer driver 18 that interfaces with the phone operating system 20 running on the mobile telecommunications device's processor (not shown).

Output to be printed is sent by the phone operating system 20 to a printer driver 22, which passes it on to a MoPEC chip 24. The MoPEC chip processes the output to generate dot data for supply to the printhead 26, as described in more detail below. The MoPEC chip 24 also receives a signal from a media sensor 28 indicating when the media is in position to be printed, and outputs a control signal to a media transport 30.

The printhead 26 is disposed within a replaceable cartridge 32, which also includes ink 34 for supply to the printhead.

Mobile Telecommunications Device Module

Figure 5:
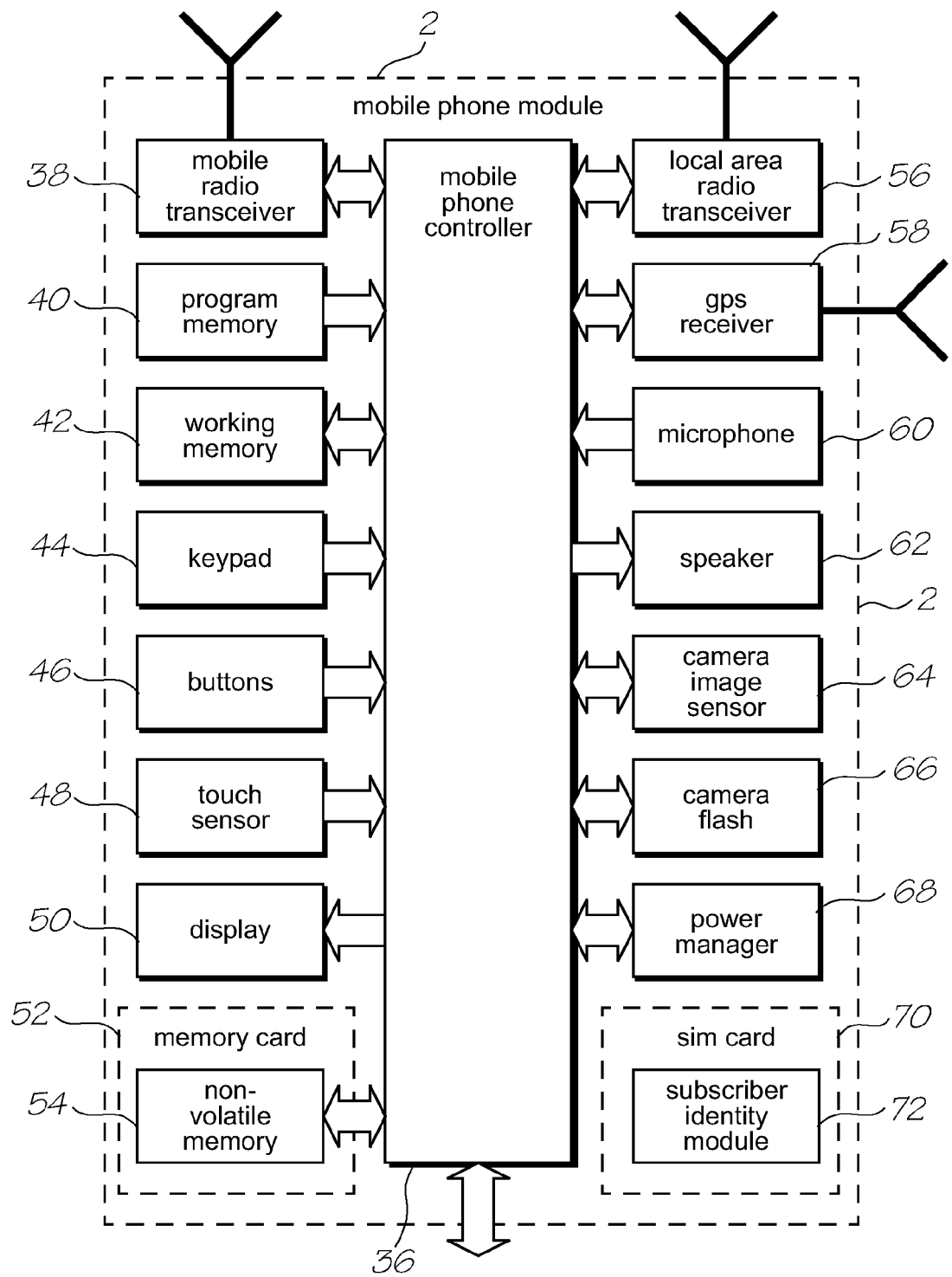
FIG. 5 is a more detailed schematic representation of the architecture within the mobile phone module of FIG. 4.

FIG. 5 shows the mobile phone module 2 in more detail. The majority of the components other than those directly related to printing and Netpage tag sensing are standard and well known to those in the art. Depending upon the specific implementation of the mobile phone 1, any number of the illustrated components can be included as part of one or more integrated circuits.

Operation of, and communication between, the mobile phone module 2 components is controlled by a mobile phone controller 36. The components include:

- mobile radio transceiver 38 for wireless communication with a mobile telecommunications network;
- program memory 40 for storing program code for execution on the mobile phone controller 36;
- working memory 42 for storing data used and generated by the program code during execution. Although shown as separate from the mobile phone controller 36, either or both memories 40 and 42 may be incorporated in the package or silicon of the controller;
- keypad 44 and buttons 46 for accepting numerical and other user input;
- touch sensor 48 which overlays display 50 for accepting user input via a stylus or fingertip pressure;
- removable memory card 52 containing non-volatile memory 54 for storing arbitrary user data, such as digital photographs or files;
- local area radio transceiver 56, such as a Bluetooth™ transceiver;
- GPS receiver 58 for enabling determination of the location of the mobile telecommunications device (alternatively the phone may rely on mobile network mechanisms for determining its location);
- microphone 60 for capturing a user's speech;
- speaker 62 for outputting sounds, including voice during a phone call;
- camera image sensor 64 including a CCD for capturing images;
- camera flash 66;
- power manager 68 for monitoring and controlling power consumption of the mobile telecommunications device and its components; and
- SIM (subscriber Identity Module) card 70 including SIM 72 for identifying the subscriber to mobile networks.

The mobile phone controller 36 implements the baseband functions of mobile voice and data communications protocols such as GSM, GSM modem for data, GPRS and CDMA, as well as higher-level messaging protocols such as SMS and MMS.

The one or more local-area radio transceivers 56 enable wireless communication with peripherals such as headsets and Netpage pens, and hosts such as personal computers. The mobile phone controller 36 also implements the baseband functions of local-area voice and data communications protocols such as IEEE 802.11, IEEE 802.15, and Bluetooth™.

The mobile phone module 2 may also include sensors and/or motors (not shown) for electronically adjusting zoom, focus, aperture and exposure in relation to the digital camera.

Figure 6:
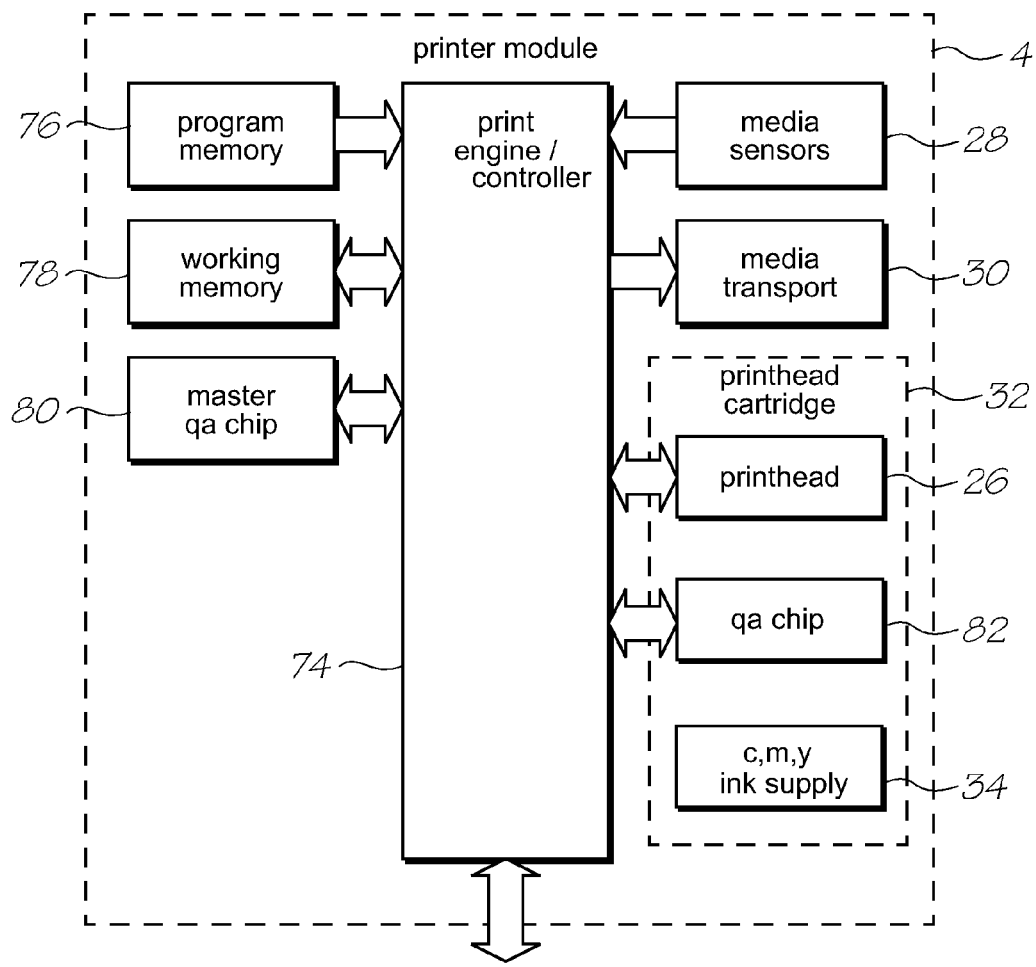
FIG. 6 is a more detailed schematic representation of the architecture within the printer module of FIG. 4.

Similarly, as shown in FIG. 6, components of the printer module 4 include:

- print engine controller (PEC) 74 in the form of a MoPEC device;
- program memory 76 for storing program code for execution by the print engine controller 74;
- working memory 78 for storing data used and generated by the program code during execution by the print engine controller 74; and
- a master QA chip 80 for authenticating printhead cartridge 32 via its QA chip 82.

Whilst the printhead cartridge in the preferred form includes the ink supply 34, the ink reservoirs can be housed in a separate cartridge in alternative embodiments.

Figure 7:
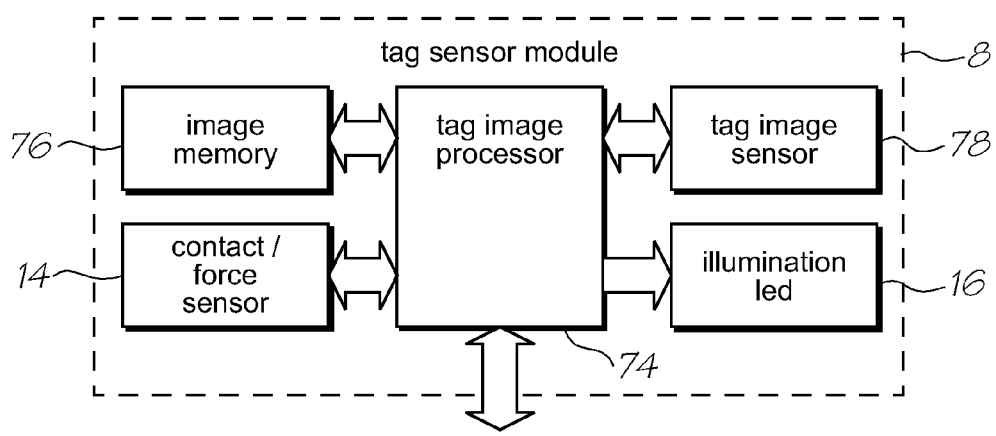
FIG. 7 is a more detailed schematic representation of the architecture within the tag sensor module of FIG. 4.

FIG. 7 shows the components of the tag sensor module 8, which includes a CMOS tag image processor 74 that communicates with image memory 76. A CMOS tag image sensor 78 sends captured image data to the processor 74 for processing. The contact sensor 14 indicates when a nib (not shown) is brought into contact with a surface with sufficient force to close a switch within the contact sensor 14. Once the switch is closed, the infrared LED 16 illuminates the surface, and the image sensor 78 captures at least one image and sends it to the image processor 74 for processing. Once processed (as described below in more detail), image data is sent to the mobile phone controller 36 for decoding.

Figure 8:
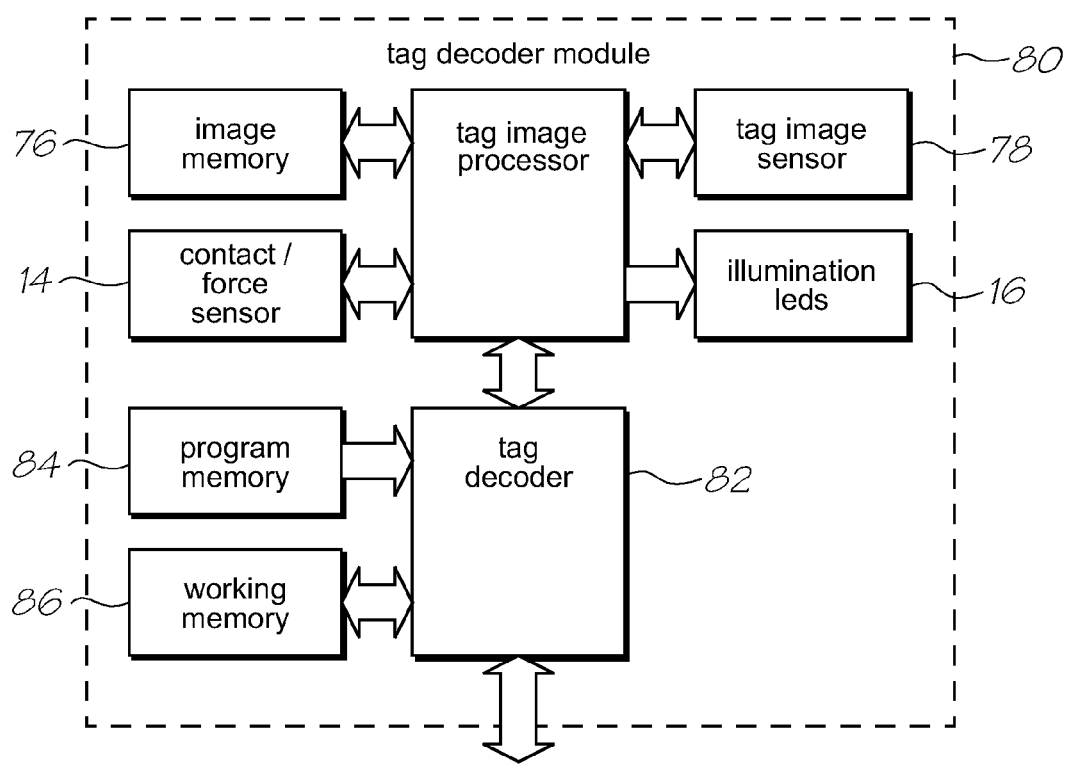
FIG. 8 is a schematic representation of the architecture within a tag decoder module for use instead of the tag sensor module of FIG. 4.

In an alternative embodiment, shown in FIG. 8, the tag sensor module 8 is replaced by a tag decoder module 84. The tag decoder module 80 includes all the elements of the tag sensor module 8, but adds a hardware-based tag decoder 86, as well as program memory 88 and working memory 90 for the tag decoder. This arrangement reduces the computational load placed on the mobile phone controller, with a corresponding increase in chip area compared to using the tag sensor module 8.

The Netpage sensor module can be incorporated in the form of a Netpage pointer, which is a simplified Netpage pen suitable mostly for activating hyperlinks. It preferably incorporates a non-marking stylus in place of the pen's marking nib (described in detail later in the specification); it uses a surface contact sensor in place of the pen's continuous force sensor; and it preferably operates at a lower position sampling rate, making it unsuitable for capturing drawings and handwriting. A Netpage pointer is less expensive to implement than a Netpage pen, and tag image processing and tag decoding can potentially be performed by software without hardware support, depending on sampling rate.

The various aspects of the invention can be embodied in any of a number of mobile telecommunications device types. Several different devices are described here, but in the interests of brevity, the detailed description will concentrate on the mobile telecommunications device embodiment.

Mobile Phone

One preferred embodiment is the non-Netpage enabled 'candy bar' mobile telecommunications device in the form of a mobile phone shown in FIGS. 9 to 14. A Netpage enabled version is described in a later section of this specification.

While a candy bar style phone is described here, it could equally take the form of a "flip" style phone, which includes a pair of body sections that are hinged to each other. Typically, the display is disposed on one of the body sections, and the keypad is disposed on the other, such that the display and keypad are positioned adjacent to each other when the device is in the closed position.

In further embodiments, the device can have two body sections that rotate or slide relative to each other. Typically, the aim of these mechanical relationships between first and second body sections is to protect the display from scratches and/or the keypad from accidental activation.

Photo printing is considered one of the most compelling uses of the mobile Memjet printer. A preferred embodiment of the invention therefore includes a camera, with its attendant processing power and memory capacity.

Figure 9:
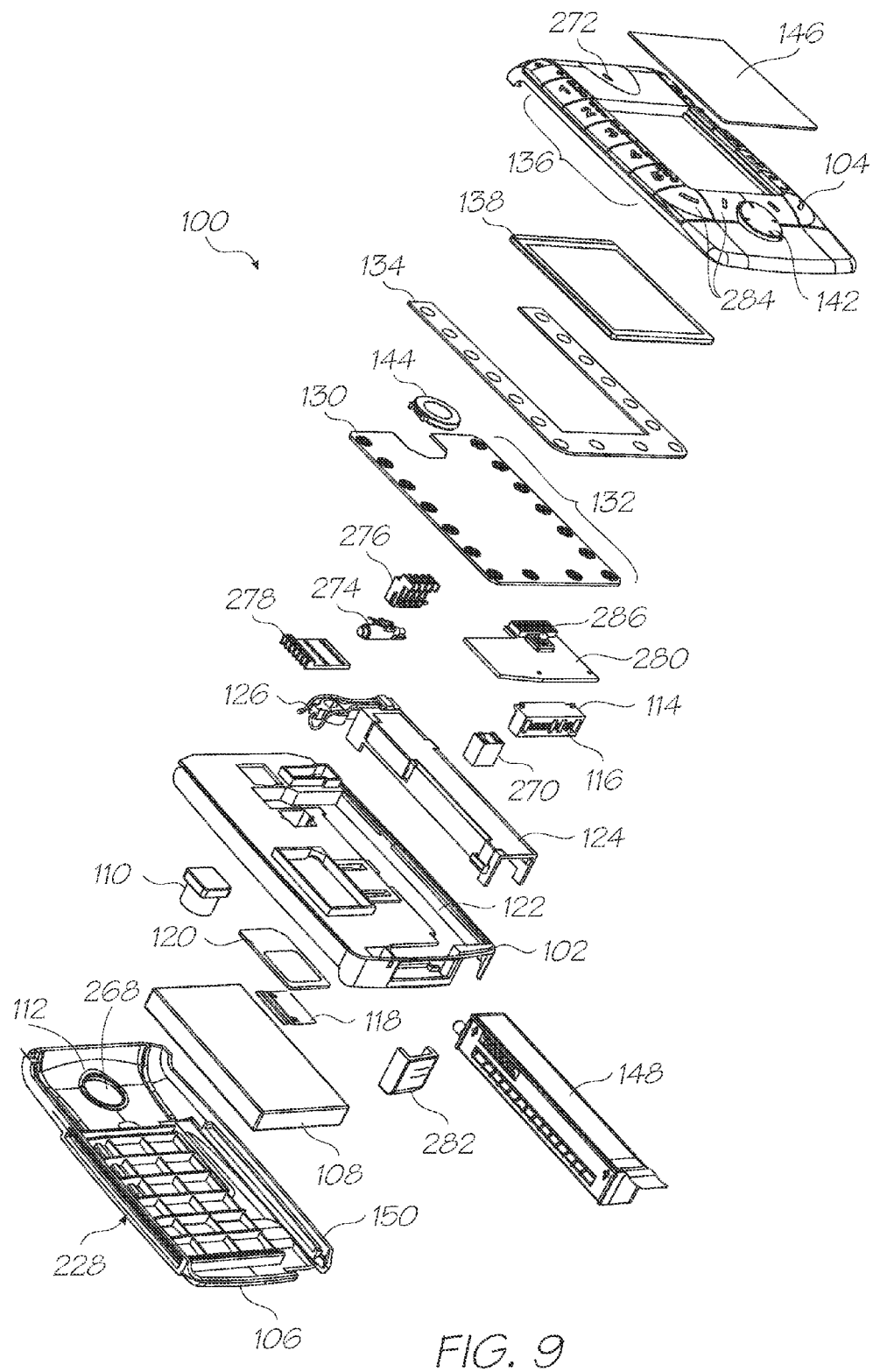
FIG. 9 is an exploded perspective view of a 'candy bar' type mobile phone embodiment of the present invention.
Figure 10:
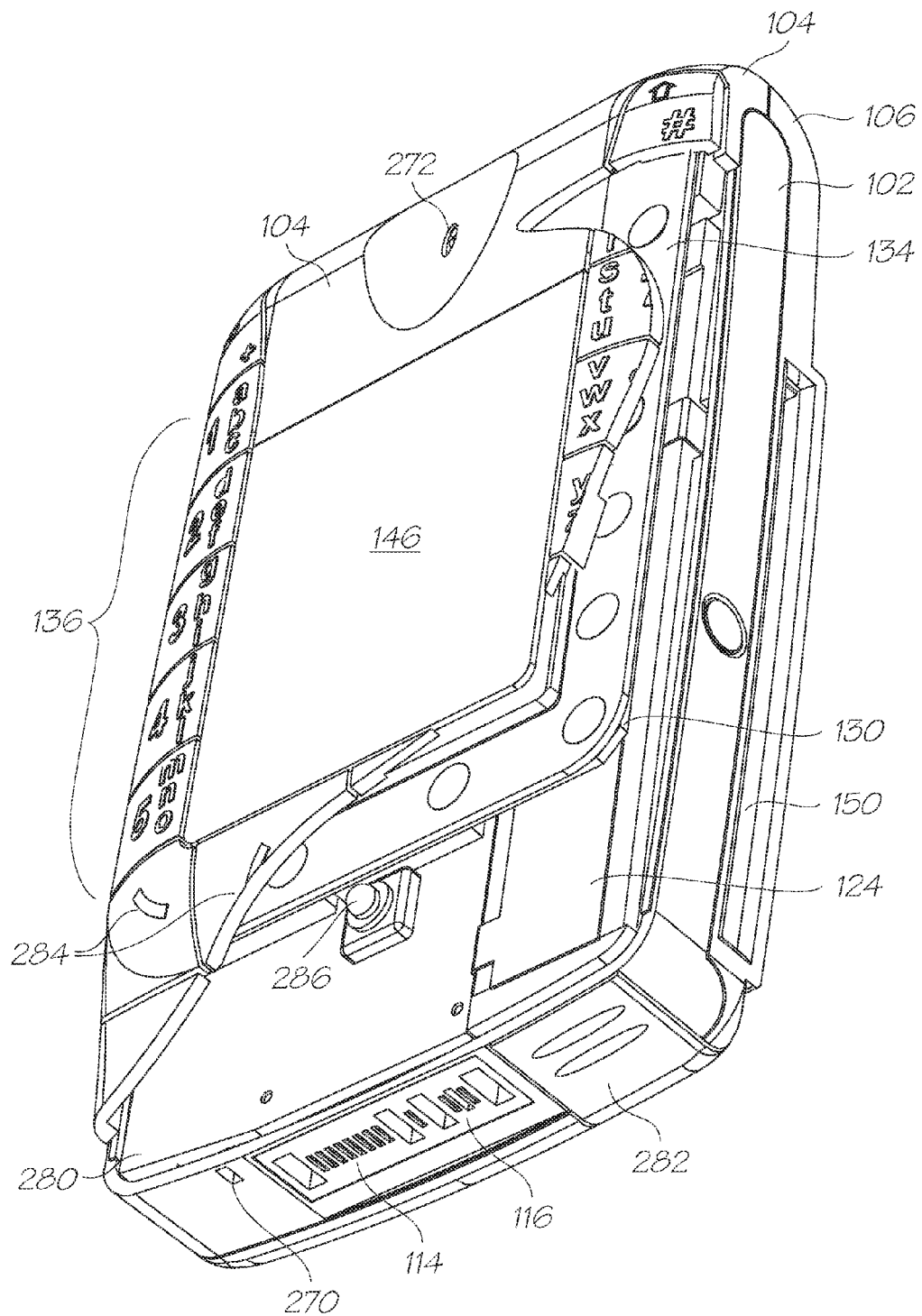
FIG. 10 is a partially cut away front and bottom perspective of the embodiment shown in FIG. 9.
Figure 11:
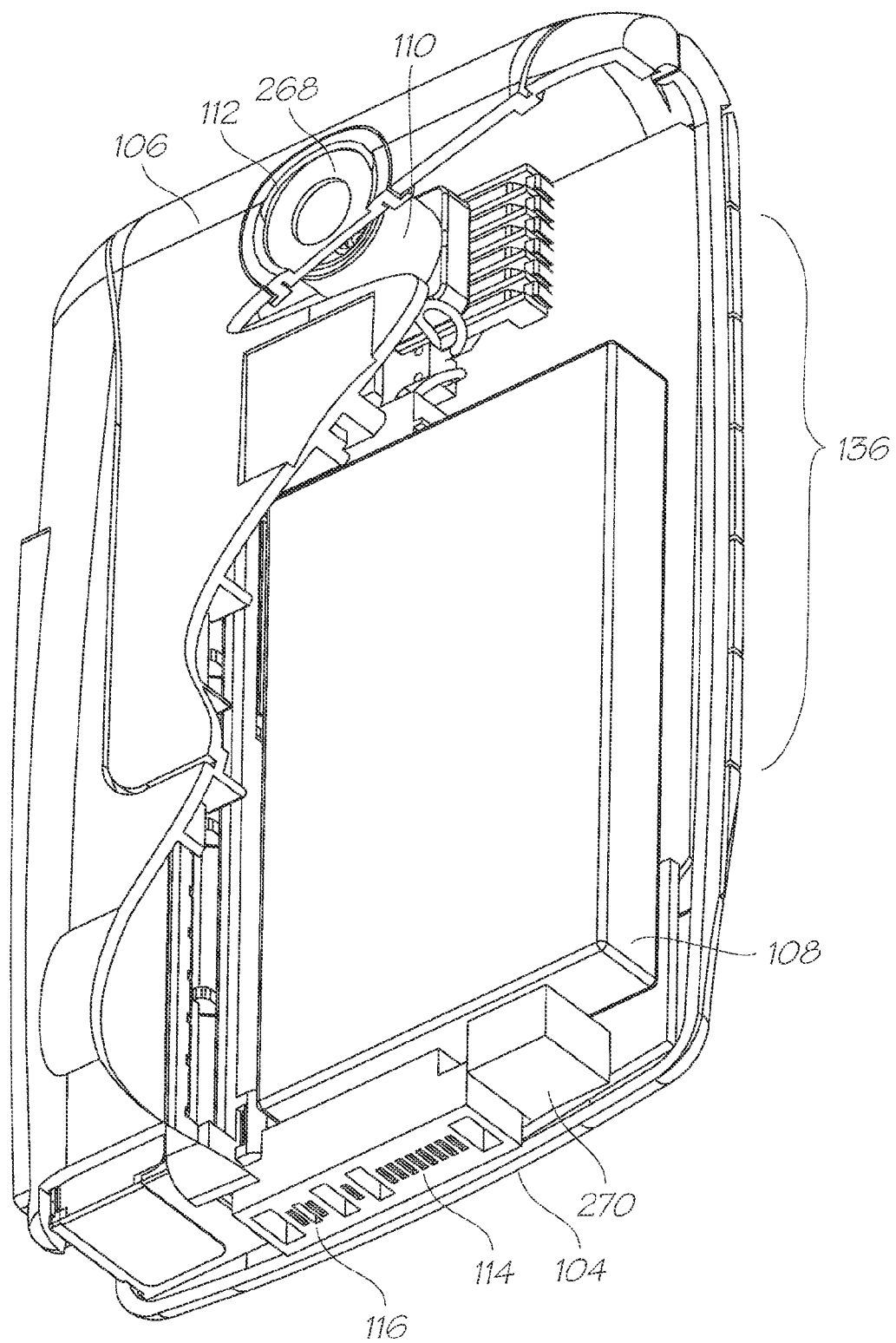
FIG. 11 is a partially cut away rear and bottom perspective of the embodiment shown in FIG. 9.

The elements of the mobile telecommunications device are best shown in FIG. 9, which (for clarity) omits minor details such as wires and hardware that operatively connect the various elements of the mobile telecommunications device together. The wires and other hardware will be well known to those skilled in the art.

The mobile phone 100 comprises a chassis moulding 102, a front moulding 104 and a rear cover moulding 106. A rechargeable battery 108, such as a lithium ion or nickel metal hydride battery, is mounted to the chassis moulding 102 and covered by the rear cover moulding 106. The battery 108 powers the various components of the mobile phone 100 via battery connector 276 and the camera and speaker connector 278.

The front moulding 104 mounts to the chassis to enclose the various components, and includes numerical interface buttons 136 positioned in vertical rows on each side of the display 138. A multi-directional control pad 142 and other control buttons 284 enable menu navigation and other control inputs. A daughterboard 280 is mounted to the chassis moulding 102 and includes a directional switch 286 for the multi directional control pad 142.

The mobile telecommunications device includes a cartridge access cover 132 that protects the interior of the mobile telecommunications device from dust and other foreign objects when a print cartridge 148 is not inserted in the cradle 124.

An optional camera module 110 is also mounted to the chassis moulding 102, to enable image capture through a hole 112 in the rear cover moulding 106. The camera module 110 includes a lens assembly and a CCD image sensor for capturing images. A lens cover 268 in the hole 112 protects the lens of the camera module 110. The rear cover moulding 106 also includes an inlet slot 228 and an outlet slot 150 through which print media passes.

The chassis moulding 102 supports a data/recharge connector 114, which enables a proprietary data cable to be plugged into the mobile telecommunications device for uploading and downloading data such as address book information, photographs, messages, and any type of information that might be sent or received by the mobile telecommunications device. The data/recharge connector 114 is configured to engage a corresponding interface in a desktop stand (not shown), which holds the mobile telecommunications device in a generally upright position whilst data is being sent or received by the mobile telecommunications device. The data/recharge connector also includes contacts that enable recharging of the battery 108 via the desktop stand. A separate recharge socket 116 in the data/recharge connector 114 is configured to receive a complimentary recharge plug for enabling recharging of the battery when the desktop stand is not in use.

A microphone 170 is mounted to the chassis moulding 102 for converting sound, such as a user's voice, into an electronic signal to be sampled by the mobile telecommunications device's analog to digital conversion circuitry. This conversion is well known to those skilled in the art and so is not described in more detail here.

A SIM (Subscriber Identity Module) holder 118 is formed in the chassis moulding 102, to receive a SIM card 120. The chassis moulding is also configured to support a print cartridge cradle 124 and a drive mechanism 126, which receive a replaceable print cartridge 148. These features are described in more detail below.

Another moulding in the chassis moulding 102 supports an aerial (not shown) for sending and receiving RF signals to and from a mobile telecommunications network.

A main printed circuit board (PCB) 130 is supported by the chassis moulding 102, and includes a number of momentary pushbuttons 132. The various integrated and discrete components that support the communications and processing (including printing processing) functions are mounted to the main PCB, but for clarity are not shown in the diagram.

A conductive elastomeric overlay 134 is positioned on the main PCB 130 beneath the keys 136 on the front moulding 104. The elastomer incorporates a carbon impregnated pill on a flexible profile. When one of the keys 136 is pressed, it pushes the carbon pill to a 2-wire open circuit pattern 132 on the PCB surface. This provides a low impedance closed circuit. Alternatively, a small dome is formed on the overlay corresponding to each key 132. Polyester film is screen printed with carbon paint and used in a similar manner to the carbon pills. Thin adhesive film with berrylium copper domes can also be used.

A loudspeaker 144 is installed adjacent apertures 272 in the front moulding 104 to enable a user to hear sound such as voice communication and other audible signals.

A color display 138 is also mounted to the main PCB 130, to enable visual feedback to a user of the mobile telecommunications device. A transparent lens moulding 146 protects the display 138. In one form, the transparent lens is touch-sensitive (or is omitted and the display 138 is touch sensitive), enabling a user to interact with icons and input text displayed on the display 138, with a finger or stylus.

A vibration assembly 274 is also mounted to the chassis moulding 102, and includes a motor that drives an eccentrically mounted weight to cause vibration. The vibration is transmitted to the chassis 102 and provides tactile feedback to a user, which is useful in noisy environments where ringtones are not audible.

MoPEC—High Level

Documents to be printed must be in the form of dot data by the time they reach the printhead.

Before conversion to dot data, the image is represented by a relatively high spatial resolution bilevel component (for text and line art) and a relatively low spatial resolution contone component (for images and background colors). The bilevel component is compressed in a lossless format, whilst the contone component is compressed in accordance with a lossy format, such as JPEG.

Figure 15:
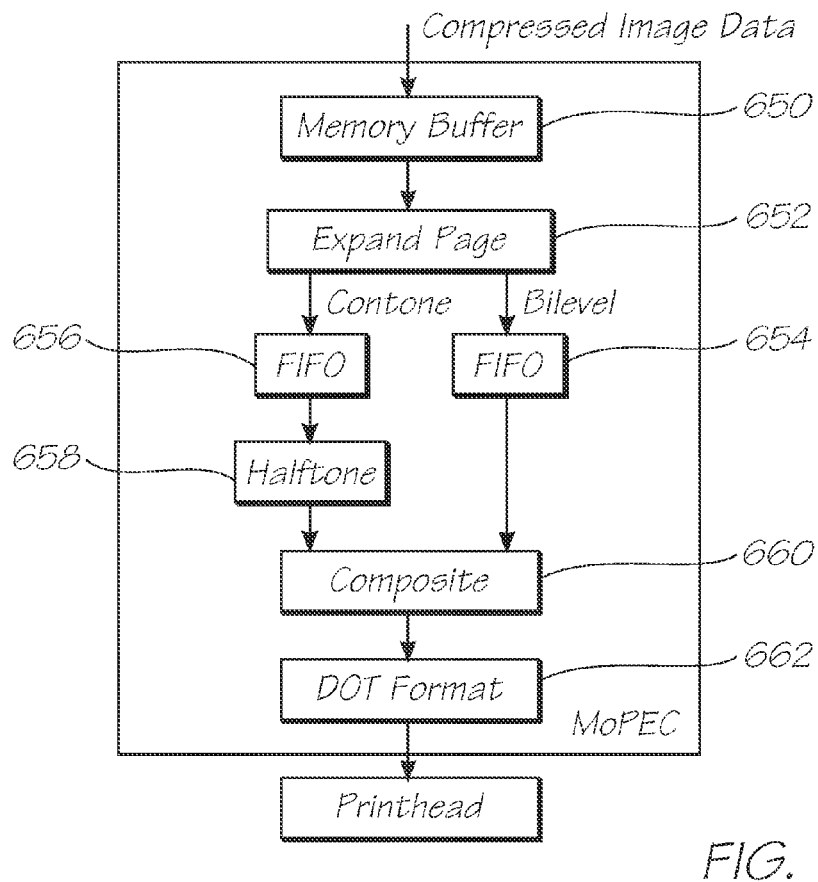
FIG. 15 is a schematic representation of a first mode of operation of MoPEC.

The preferred form of MoPEC is configurable to operate in either of two modes. In the first mode, as shown in FIG. 15, an image to be printed is received in the form of compressed image data. The compressed image data can arrive as a single bundle of data or as separate bundles of data from the same or different sources. For example, text can be received from a first remote server and image data for a banner advertisement can be received from another. Alternatively, either or both of the forms of data can be retrieved from local memory in the mobile device.

Upon receipt, the compressed image data is buffered in memory buffer 650. The bilevel and contone components are decompressed by respective decompressors as part of expand page step 652. This can either be done in hardware or software, as described in more detail below. The decompressed bilevel and contone components are then buffered in respective FIFOs 654 and 656.

The decompressed contone component is halftoned by a halftoning unit 658, and a compositing unit 660 then composites the bilevel component over the dithered contone component. Typically, this will involve compositing text over images. However, the system can also be run in stencil mode, in which the bilevel component is interpreted as a mask that is laid over the dithered contone component. Depending upon what is selected as the image component for the area in which the mask is being applied, the result can be text filled with the underlying image (or texture), or a mask for the image. The advantage of stencil mode is that the bilevel component is not dithered, enabling sharp edges to be defined. This can be useful in certain applications, such as defining borders or printing text comprising colored textures.

After compositing, the resultant image is dot formatted 662, which includes ordering dots for output to the printhead and taking into account any spatial or operative compensation issues, as described in more detail below. The formatted dots are then supplied to the printhead for printing, again as described in more detail below.

Figure 16:
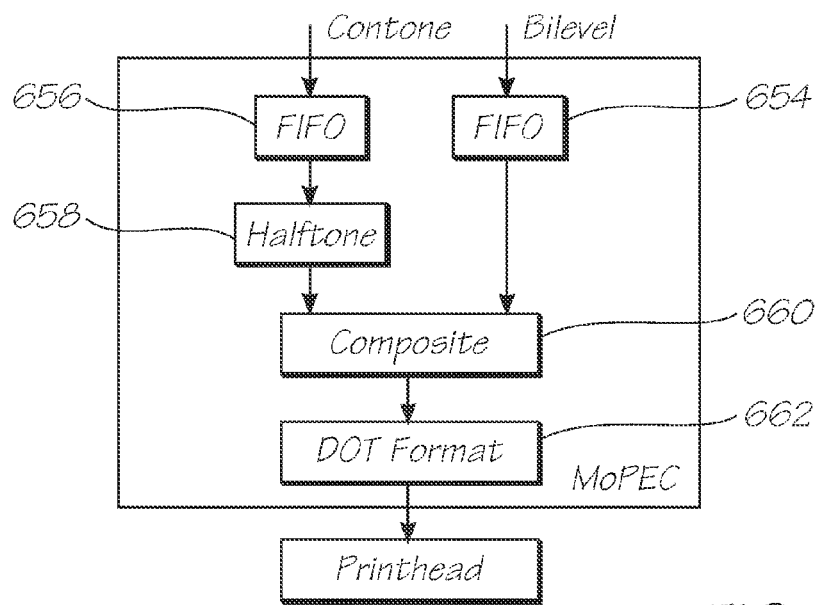
FIG. 16 is a schematic representation of a second mode of operation of MoPEC.

In the second mode of operation, as shown in FIG. 16, the contone and bilevel components are received in uncompressed form by MoPEC directly into respective FIFOs 656 and 654. The source of the components depends on the application. For example, the host processor in the mobile telecommunications device can be configured to generate the decompressed image components from compressed versions, or can simply be arranged to receive the uncompressed components from elsewhere, such as the mobile telecommunications network or the communication port described in more detail elsewhere.

Once the bilevel and contone components are in their respective FIFOs, MoPEC performs the same operations as described in relation to the first mode, and like numerals have therefore been used to indicate like functional blocks.

Figure 18:
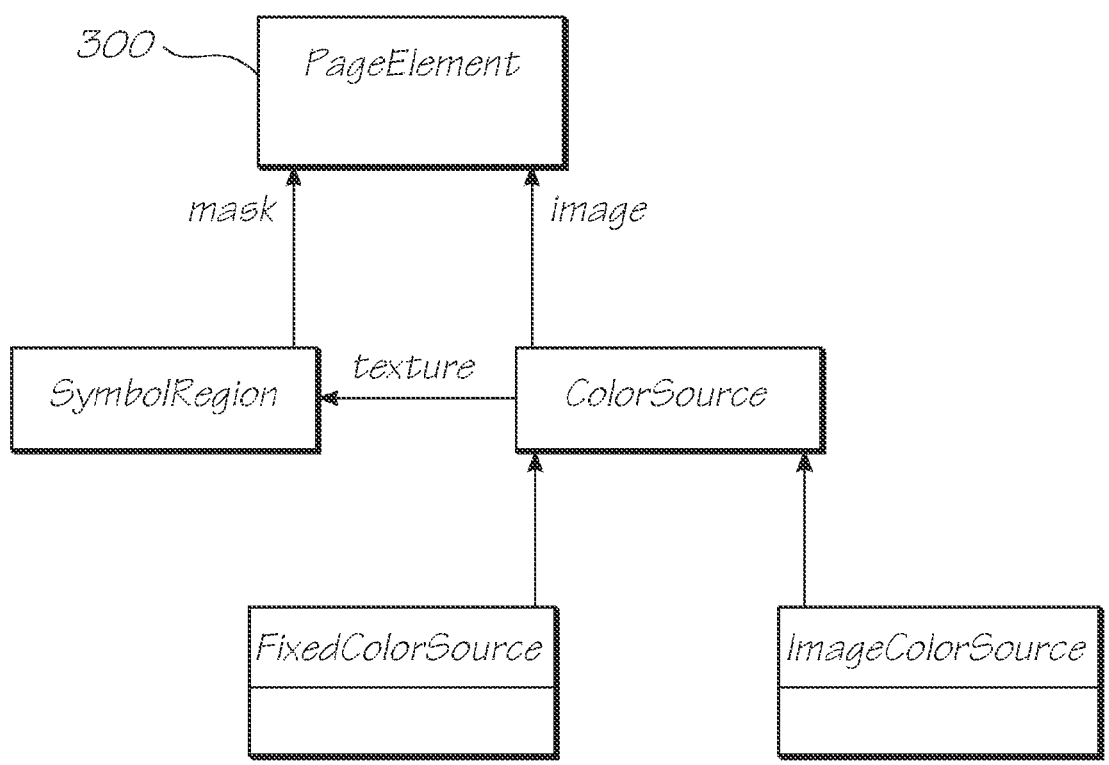
FIG. 18 shows a simplified UML diagram of a page element.

As shown in FIG. 18, the central data structure for the preferred printing architecture is a generalised representation of the three layers, called a page element. A page element can be used to represent units ranging from single rendered elements emerging from a rendering engine up to an entire page of a print job. FIG. 18 shows a simplified UML diagram of a page element 300. Conceptually, the bi-level symbol region selects between the two color sources.

MoPEC Device—Low Level

Figure 17:
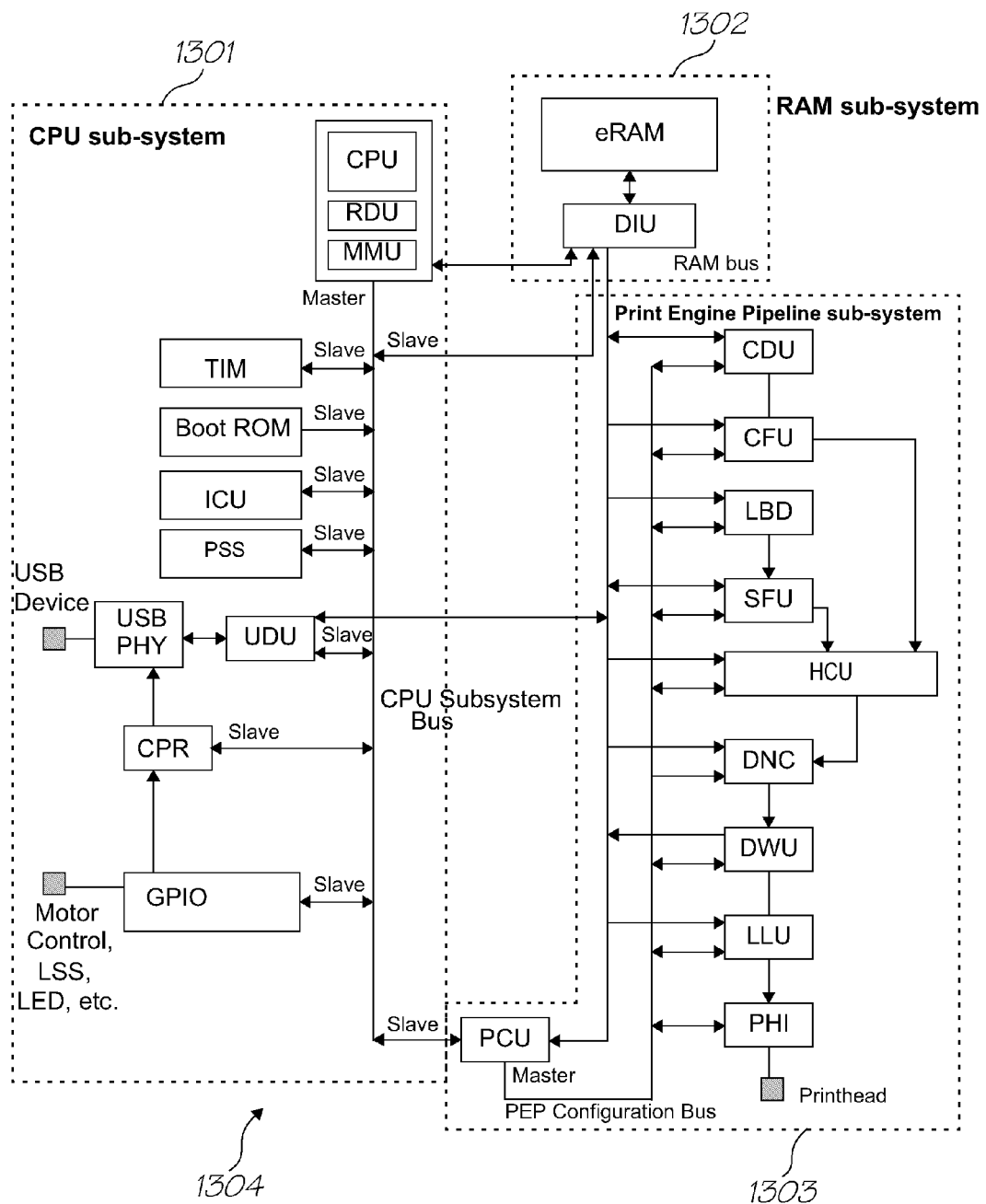
FIG. 17 is a schematic representation of the hardware components of a MoPEC device.

The hardware components of a preferred MoPEC device 326 are shown in FIG. 17 and described in more detail below.

Conceptually, a MoPEC device is simply a SoPEC device (ie, as described in cross-referenced application U.S. Ser. No. 10/727,181, filed on Dec. 2, 2003) that is optimized for use in a low-power, low print-speed environment of a mobile phone. Indeed, as long as power requirements are satisfied, a SoPEC device is capable of providing the functionality required of MoPEC. However, the limitations on battery power in a mobile device make it desirable to modify the SoPEC design.

As shown in FIG. 17, from the high level point of view a MoPEC consists of three distinct subsystems: a Central Processing Unit (CPU) subsystem 1301, a Dynamic Random Access Memory (DRAM) subsystem 1302 and a Print Engine Pipeline (PEP) subsystem 1303.

MoPEC has a much smaller eDRAM requirement than SoPEC. This is largely due to the considerably smaller print media for which MoPEC is designed to generate print data.

In one form, MoPEC can be provided in the form of a stand-alone ASIC designed to be installed in a mobile telecommunications device. Alternatively, it can be incorporated onto another ASIC that incorporates some or all of the other functionality required for the mobile telecommunications device.

The CPU subsystem 1301 includes a CPU that controls and configures all aspects of the other subsystems. It provides general support for interfacing and synchronizing the external printer with the internal print engine. It also controls low-speed communication to QA chips (which are described elsewhere in this specification) in cases where they are used. The preferred embodiment does not utilize QA chips in the cartridge or the mobile telecommunications device.

The CPU subsystem 1301 also contains various peripherals to aid the CPU, such as General Purpose Input Output (GPIO, which includes motor control), an Interrupt Controller Unit (ICU), LSS Master and general timers. The USB block provides an interface to the host processor in the mobile telecommunications device, as well as to external data sources where required. The selection of USB as a communication standard is a matter of design preference, and other types of communications protocols can be used, such as Firewire or SPI.

The DRAM subsystem 1302 accepts requests from the CPU, USB and blocks within the Print Engine Pipeline (PEP) subsystem. The DRAM subsystem 1302, and in particular the DRAM Interface Unit (DIU), arbitrates the various requests and determines which request should win access to the DRAM. The DIU arbitrates based on configured parameters, to allow sufficient access to DRAM for all requestors. The DIU also hides the implementation specifics of the DRAM such as page size, number of banks and refresh rates. It will be appreciated that the DRAM can be considerably smaller than in the original SoPEC device, because the pages being printed are considerably smaller. Also, if the host processor can supply decompressed print data at a high enough rate, the DRAM can be made very small (of the order of 128-256 kbytes), since there is no need to buffer an entire page worth of information before commencing printing.

The Print Engine Pipeline (PEP) subsystem 1303 accepts compressed pages from DRAM and renders them to bi-level dots for a given print line destined for a printhead interface that communicates directly with the printhead. The first stage of the page expansion pipeline is the Contone Decoder Unit (CDU) and Lossless Bi-level Decoder (LBD). The CDU expands the JPEG-compressed contone (typically CMYK) layers and the LBD expands the compressed bi-level layer (typically K). The output from the first stage is a set of buffers: the Contone FIFO unit (CFU) and the Spot FIFO Unit (SFU). The CFU and SFU buffers are implemented in DRAM.

The second stage is the Halftone Compositor Unit (HCU), which halftones and dithers the contone layer and composites the bi-level spot layer over the resulting bi-level dithered layer.

A number of compositing options can be implemented, depending upon the printhead with which the MoPEC device is used. Up to six channels of bi-level data are produced from this stage, although not all channels may be present on the printhead. For example, in the preferred embodiment, the printhead is configured to print only CMY, with K pushed into the CMY channels, and IR omitted.

In the third stage, a Dead Nozzle Compensator (DNC) compensates for dead nozzles in the printhead by color redundancy and error diffusing of dead nozzle data into surrounding dots.

The resultant bi-level dot-data (being CMY in the preferred embodiment) is buffered and written to a set of line buffers stored in DRAM via a Dotline Writer Unit (DWU).

Finally, the dot-data is loaded back from DRAM, and passed to the printhead interface via a dot FIFO. The dot FIFO accepts data from a Line Loader Unit (LLU) at the system clock rate, while the PrintHead Interface (PHI) removes data from the FIFO and sends it to the printhead.

The amount of DRAM required will vary depending upon the particular implementation of MoPEC (including the system in which it is implemented). In this regard, the preferred MoPEC design is capable of being configured to operate in any of three modes. All of the modes available under the preferred embodiment assume that the received image data will be preprocessed in some way. The preprocessing includes, for example, color space conversion and scaling, where necessary.

In the first mode, the image data is decompressed by the host processor and supplied to MoPEC for transfer directly to the HCU. In this mode, the CDU and LBD are effectively bypassed, and the decompressed data is provided directly to the CFU and SFU to be passed on to the HCU. Because decompression is performed outside MoPEC, and the HCU and subsequent hardware blocks are optimized for their jobs, the MoPEC device can be clocked relatively slowly, and there is no need for the MoPEC CPU to be particularly powerful. As a guide, a clock speed of 10 to 20 MHz is suitable.

In the second mode, the image data is supplied to MoPEC in compressed form. To begin with, this requires an increase in MoPEC DRAM, to a minimum of about 256 kbytes (although double that is preferable). In the second mode, the CDU and LBD (and their respective buffers) are utilized to perform hardware decompression of the compressed contone and bilevel image data. Again, since these are hardware units optimized to perform their jobs, the system can be clocked relatively slowly, and there is still no need for a particularly powerful MoPEC processor. A disadvantage with this mode, however, is that the CDU and LBD, being hardware, are somewhat inflexible. They are optimized for particular decompression jobs, and in the preferred embodiment, cannot be reconfigured to any great extent to perform different decompression tasks.

In the third mode, the CDU and LBD are again bypassed, but MoPEC still receives image data in compressed form. Decompression is performed in software by the MoPEC CPU. Given that the CPU is a general-purpose processor, it must be relatively powerful to enable it to perform acceptably quick decompression of the compressed contone and bilevel image data. A higher clock speed will also be required, of the order of 3 to 10 times the clock speed where software decompression is not required. As with the second mode, at least 256 kbytes of DRAM are required on the MoPEC device. The third mode has the advantage of being programmable with respect to the type of decompression being performed. However, the need for a more powerful processor clocked at a higher speed means that power consumption will be correspondingly higher than for the first two modes.

It will be appreciated that enabling all of these modes to be selected in one MoPEC device requires the worst case features for all of the modes to be implemented. So, for example, at least 256 kbytes of DRAM, the capacity for higher clock speeds, a relatively powerful processor and the ability to selectively bypass the CDU and LBD must all be implemented in MoPEC. Of course, one or more of the modes can be omitted for any particular implementation, with a corresponding removal of the limitations of the features demanded by the availability of that mode.

In the preferred form, the MoPEC device is color space agnostic. Although it can accept contone data as CMYX or RGBX, where X is an optional 4th channel, it also can accept contone data in any print color space. Additionally, MoPEC provides a mechanism for arbitrary mapping of input channels to output channels, including combining dots for ink optimization and generation of channels based on any number of other channels. However, inputs are preferably CMY for contone input and K (pushed into CMY by MoPEC) for the bi-level input.

In the preferred form, the MoPEC device is also resolution agnostic. It merely provides a mapping between input resolutions and output resolutions by means of scale factors. The preferred resolution is 1600 dpi, but MoPEC actually has no knowledge of the physical resolution of the printhead to which it supplies dot data.

| Subsystem | Unit Acronym | Unit Name | Description |
|---|---|---|---|
| DRAM | DIU | DRAM interface unit | Provides interface for DRAM read and write access for the various MoPEC units, CPU and the USB block. The DIU provides arbitration between competing units and controls DRAM access. |
|  | DRAM | Embedded DRAM | 128 kbytes (or greater, depending upon implementation) of embedded DRAM. |
| CPU | CPU | Central Processing Unit | CPU for system configuration and control |
|  | MMU | Memory Management Unit | Limits access to certain memory address areas in CPU user mode |
|  | RDU | Real-time Debug Unit | Facilitates the observation of the contents of most of the CPU addressable registers in MoPEC, in addition to some pseudo-registers in real time |
|  | TIM | General Timer | ontains watchdog and general system timers |
|  | LSS | Low Speed Serial Interface | Low level controller for interfacing with QA chips |
|  | GPIO | General Purpose IOs | General IO controller, with built-in motor control unit, LED pulse units and de-glitch circuitry |
|  | ROM | Boot ROM | 16 KBytes of System Boot ROM code |
|  | ICU | Interrupt Controller Unit | General Purpose interrupt controller with configurable priority, and masking. |
|  | CPR | Clock, Power and Reset block | Central Unit for controlling and generating the system clocks and resets and powerdown mechanisms |
|  | PSS | Power Save Storage | Storage retained while system is powered down |
|  | USB | Universal Serial Bus Device | USB device controller for interfacing with the host USB. |

| Subsystem | Unit Acronym | Unit Name | Description |
|---|---|---|---|
| Print Engine Pipeline (PEP) | PCU | PEP controller | Provides external CPU with the means to read and write PEP Unit registers, and read and write DRAM in single 32-bit chunks. |
| | CDU | Contone Decoder Unit | Expands JPEG compressed contone layer and writes decompressed contone to DRAM |
| | CFU | Contone FIFO Unit | Provides line buffering between CDU and HCU |
| | LBD | Lossless Bi-level Decoder | Expands compressed bi-level layer. |
| | SFU | Spot FIFO Unit | Provides line buffering between LBD and HCU |
| | HCU | Halftoner Compositor Unit | Dithers contone layer and composites the bi-level spot and position tag dots. |
| | DNC | Dead Nozzle Compensator | Compensates for dead nozzles by color redundancy and error diffusing dead nozzle data into surrounding dots. |
| | DWU | Dotline Writer Unit | Writes out dot data for a given printline to the line store DRAM |
| | LLU | Line Loader Unit | Reads the expanded page image from line store, formatting the data appropriately for the bi-lithic printhead. |
| | PHI | PrintHead Interface | Responsible for sending dot data to the printhead and for providing line synchronization between multiple MoPECs. Also provides test interface to printhead such as temperature monitoring and Dead Nozzle Identification. |

Software Dot Generation

Whilst speed and power consumption considerations make hardware acceleration desirable, it is also possible for some, most or all of the functions performed by the MoPEC integrated circuit to be performed by a general purpose processor programmed with suitable software routines. Whilst power consumption will typically increase to obtain similar performance with a general purpose processor (due to the higher overheads associated with having a general purpose processor perform highly specialized tasks such as decompression and compositing), this solution also has the advantage of easy customization and upgrading. For example, if a new or updated JPEG standard becomes widely used, it may be desirable to simply update the decompression algorithm performed by a general purpose processor. The decision to move some or all of the MoPEC integrated circuit's functionality into software needs to be made commercially on a case by case basis.

QA Chips

The preferred form of the invention does not use QA chips to authenticate the cartridge when it is inserted. However, in alternative embodiments, the print cartridge has a QA chip 82 that can be interrogated by a master QA chip 80 installed in the mobile device (see FIG. 6). These are described in detail in the Applicant's co-pending application temporarily identified by Ser. No. 11/124,167 until its serial number is assigned. In the interests of brevity, the disclosure of Ser. No. 11/124,167 has been incorporated herein by cross reference (see list of cross referenced documents above).

Piezoelectric Drive System

Figure 19:
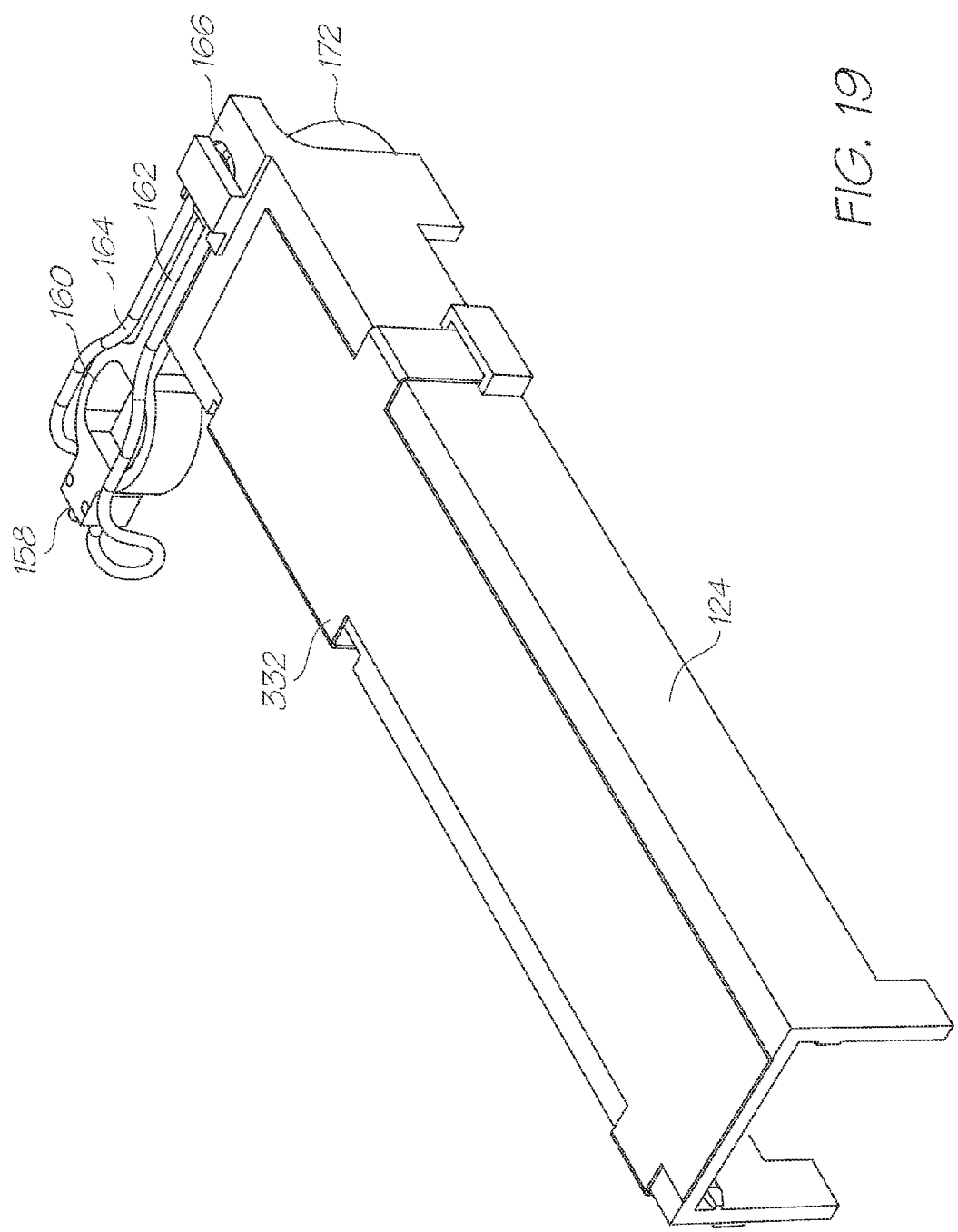
FIG. 19 is a top perspective of the cradle assembly and piezoelectric drive system.
Figure 20:
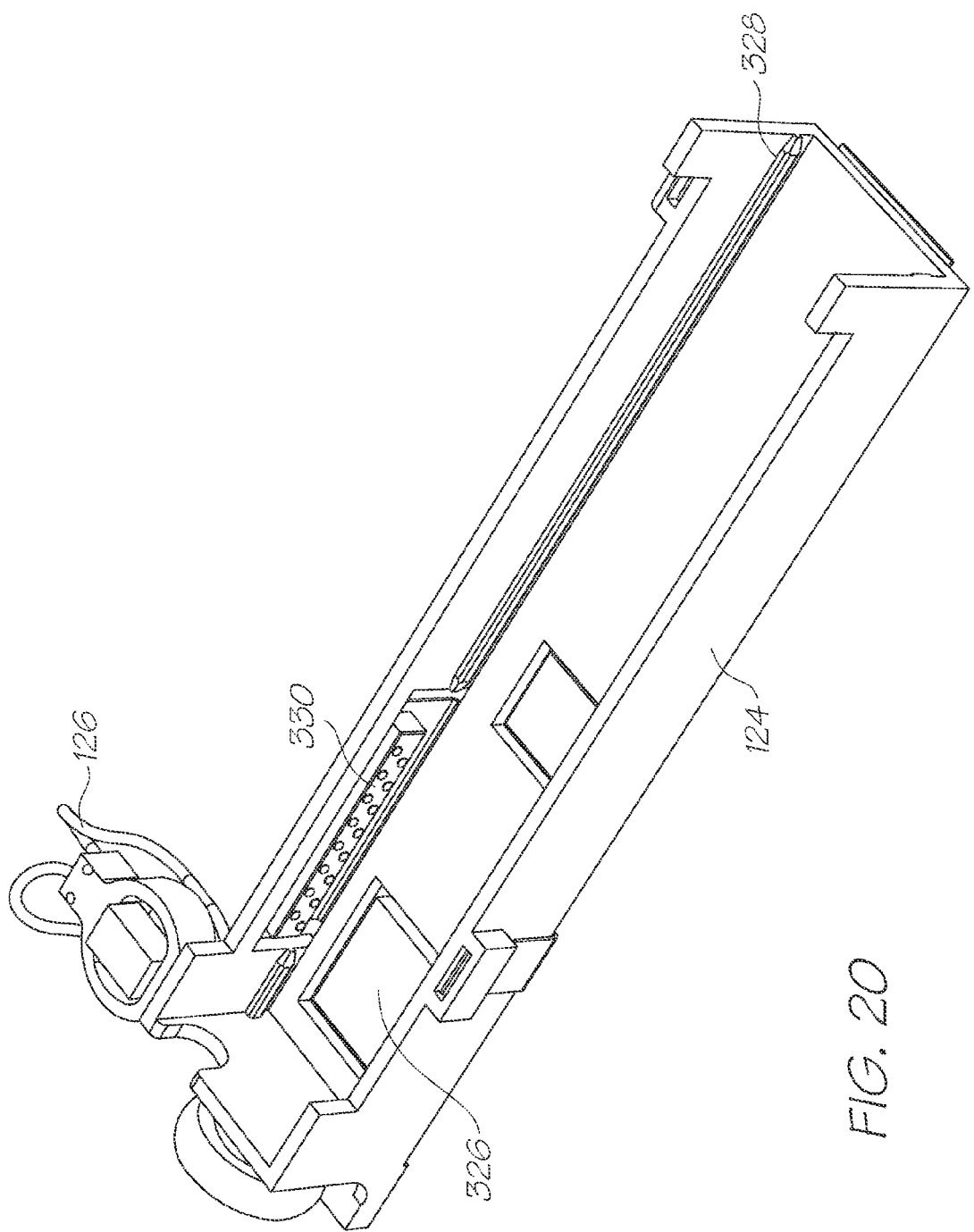
FIG. 20 is a bottom perspective of the cradle assembly and piezoelectric drive system.
Figure 21:
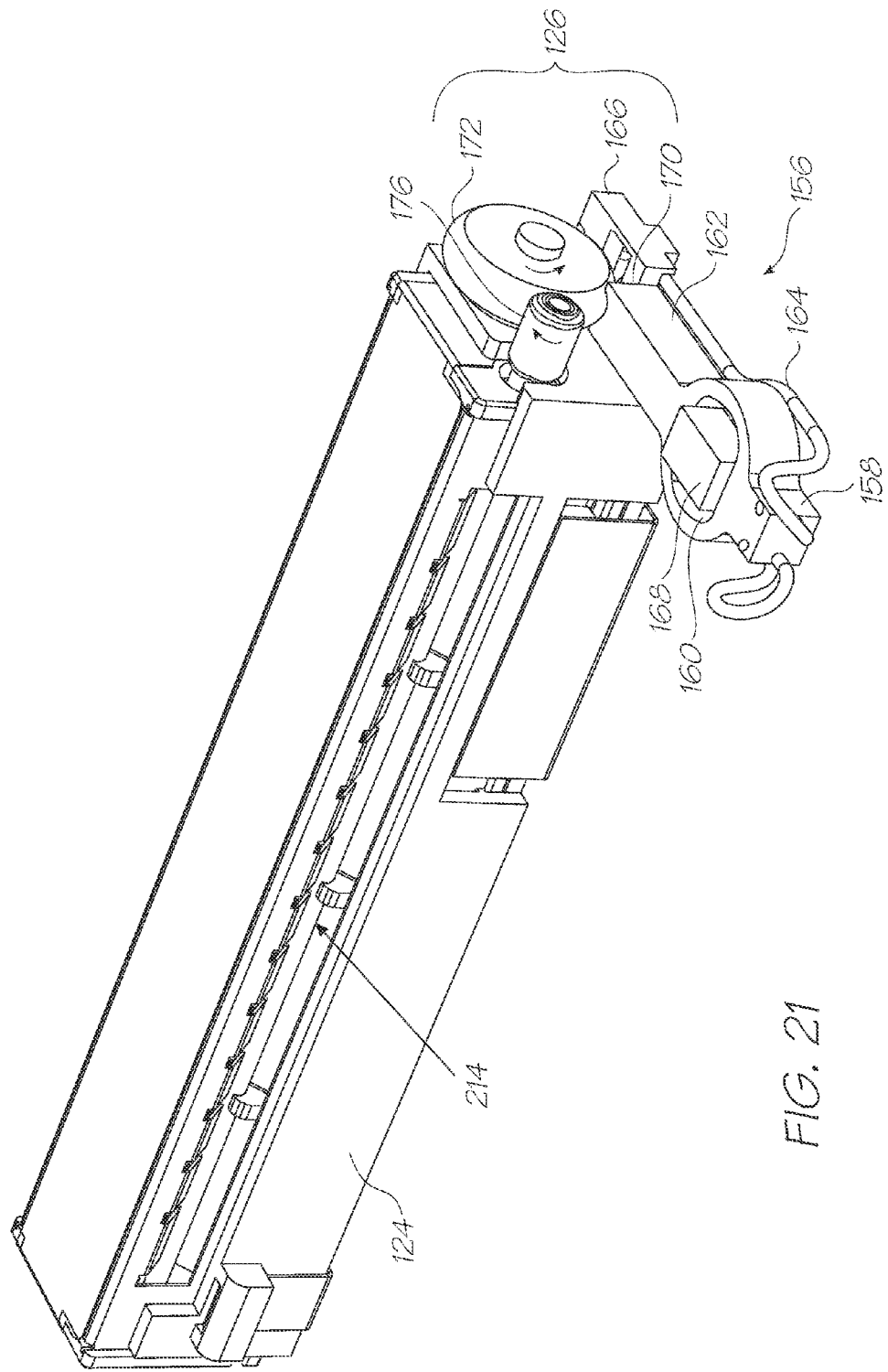
FIG. 21 is a bottom perspective of the print cartridge installed in the cradle assembly.
Figure 22:
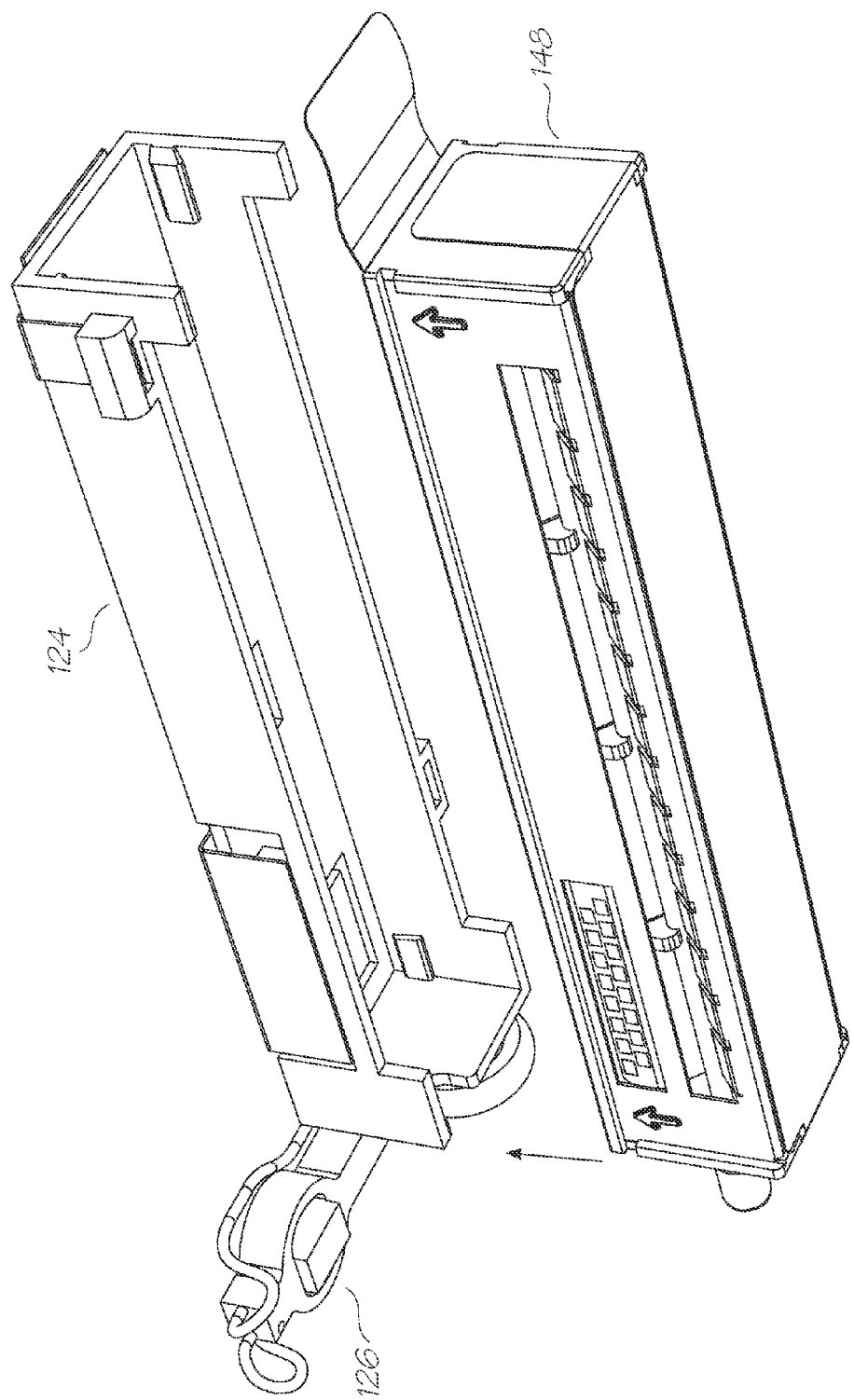
FIG. 22 is a bottom perspective of the print cartridge removed from the cradle assembly.

FIGS. 19 to 22 show a piezoelectric drive system 126 for driving print media past the printhead. As best shown in FIG. 21, the drive system 126 includes a resonator 156 that includes a support end 158, a through hole 160, a cantilever 162 and a spring 164. The support 158 is attached to the spring 164, which in turn is attached to a mounting point 166 on the cradle 124. A piezoelectric element 168 is disposed within the through hole 160, extending across the hole to link the support end 158 with the cantilever 162. The element 168 is positioned adjacent one end of the hole so that when it deforms, the cantilever 162 deflects from its quiescent position by a minute amount.

A tip 170 of the cantilever 162 is urged into contact with a rim of a drive wheel 172 at an angle of about 50 degrees. In turn, the drive wheel 172 engages a rubber roller 176 at the end of the drive shaft 178. The drive shaft 178 engages and drives the print media past the printhead (described below with reference to FIGS. 12 and 14).

Drive wires (not shown) are attached to opposite sides of the piezoelectric element 168 to enable supply of a drive signal. The spring, piezo and cantilever assembly is a structure with a set of resonant frequencies. A drive signal excites the structure to one of the resonant modes of vibration and causes the tip of the cantilever 162 to move in such a way that the drive wheel 172 rotates. In simple terms, when piezoelectric element expands, the tip 170 of the cantilever pushes into firmer contact with the rim of the drive wheel. Because the rim and the tip are relatively stiff, the moving tip causes slight rotation of the drive wheel in the direction shown. During the rest of the resonant oscillation, the tip 170 loses contact with the rim and withdraws slightly back towards the starting position. The subsequent oscillation then pushes the tip 170 down against the rim again, at a slightly different point, to push the wheel through another small rotation. The oscillatory motion of the tip 170 repeats in rapid succession and the drive wheel is moved in a series of small angular displacements. However, as the resonant frequency is high (of the order of kHz), the wheel 172, for all intents and purposes, has a constant angular velocity.

In the embodiment shown, a drive signal at about 85 kHz rotates the drive wheel in the anti-clockwise direction (as shown in FIG. 21).

Although the amount of movement per cycle is relatively small (of the order of a few micrometres), the high rate at which pulses are supplied means that a linear movement (i.e. movement of the rim) of up to 300 mm per second can be achieved. A different mode of oscillation can be caused by increasing the drive signal frequency to 95 kHz, which causes the drive wheel to rotate in the reverse direction. However, the preferred embodiment does not take advantage of the reversibility of the piezoelectric drive.

Precise details of the operation of the piezoelectric drive can be obtained from the manufacturer, Elliptec AG of Dortmund, Germany.

Other embodiments use various types of DC motor drive systems for feeding the media passed the printhead. These are described in detail in the Applicant's co-pending application temporarily identified by Ser. No. 11/124,167 until its serial number is assigned. In the interests of brevity, the disclosure of Ser. No. 11/124,167 has been incorporated herein by cross reference (see list of cross referenced documents above).

Print Cartridge

Figure 23:
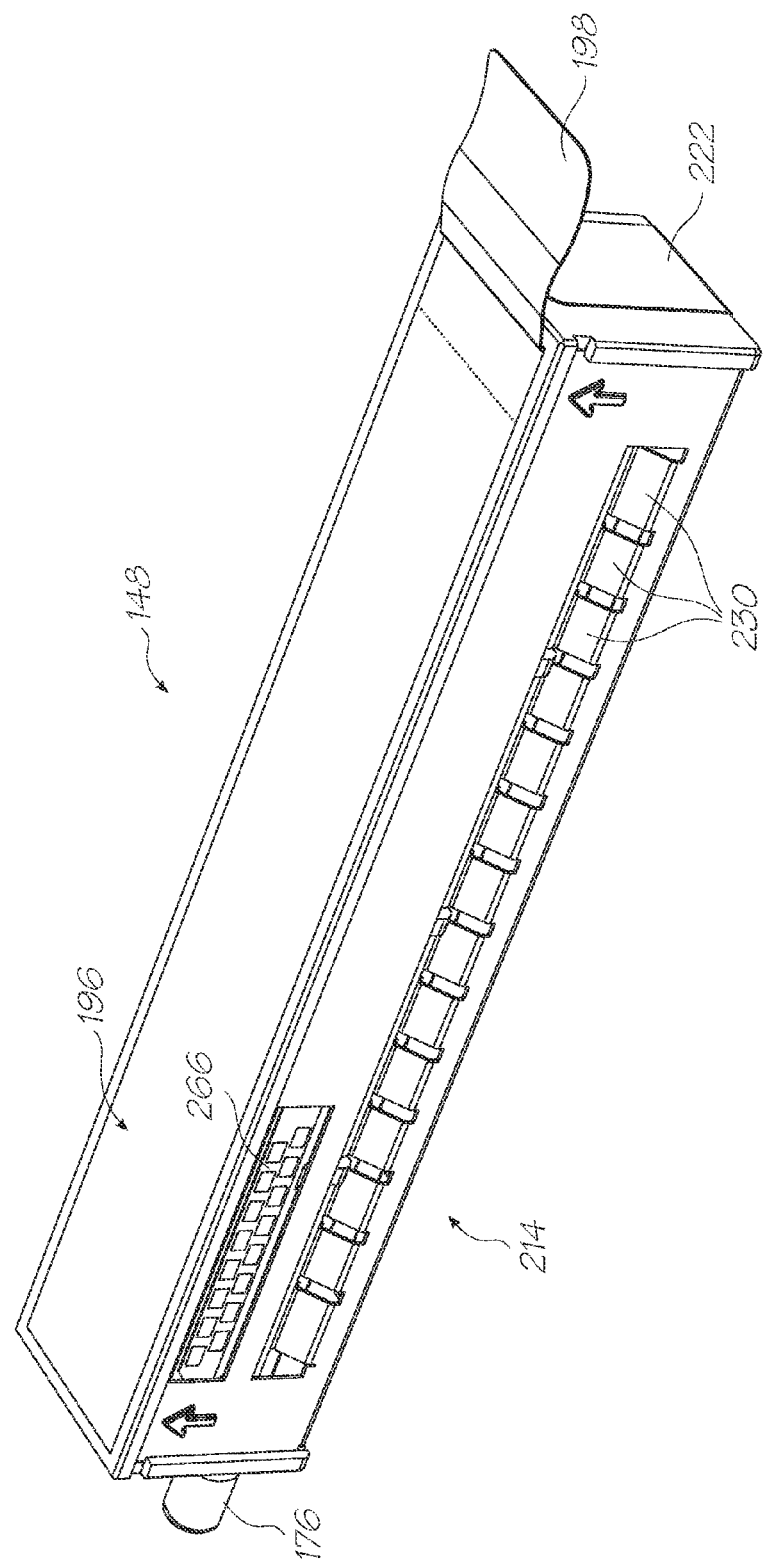
FIG. 23 is a perspective view of a print cartridge for an M-Print device.
Figure 24:
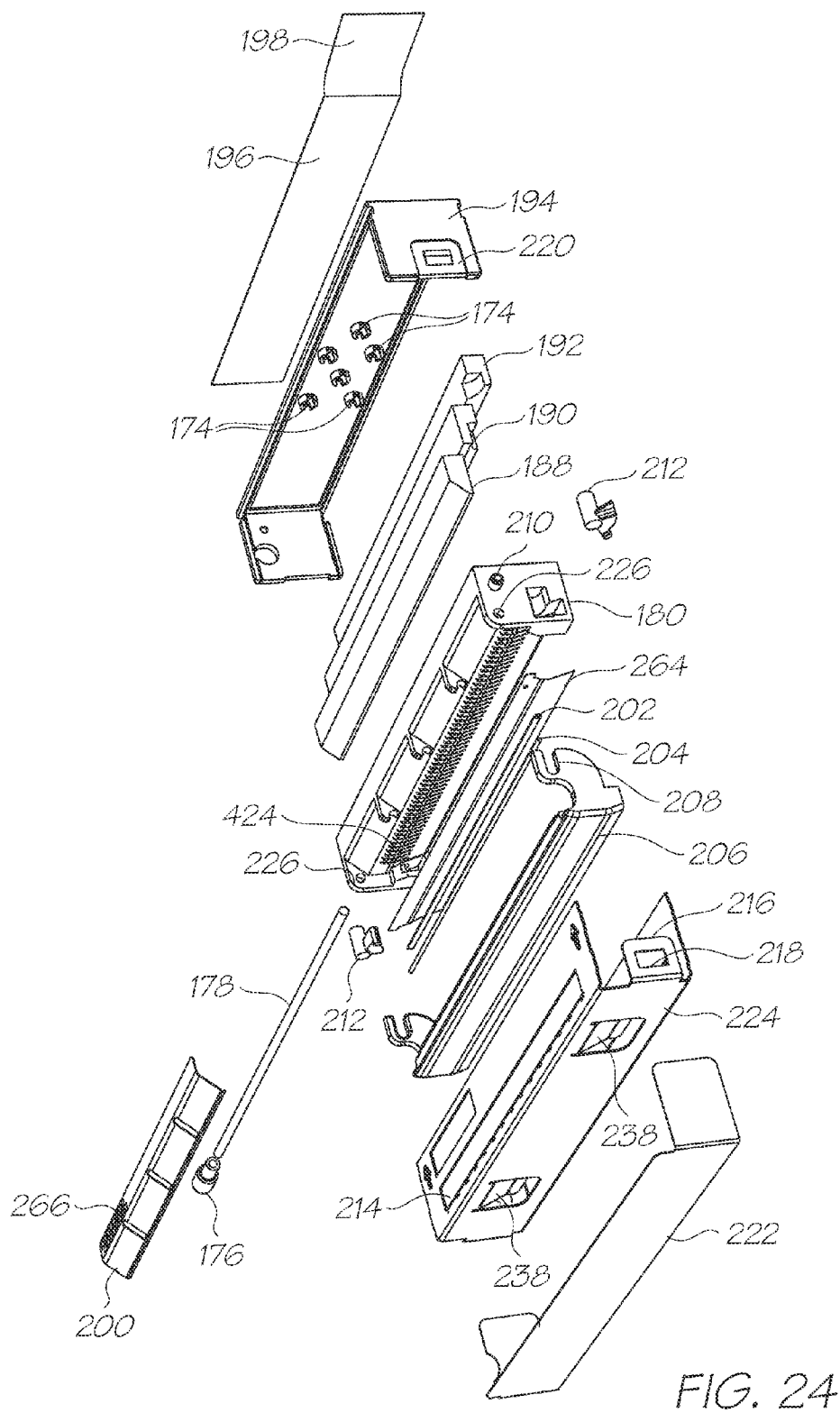
FIG. 24 is an exploded perspective of the print cartridge shown in FIG. 23.

The print cartridge 148 is best shown in FIGS. 23 and 24, and takes the form of an elongate, generally rectangular box. The cartridge is based around a moulded housing 180 that includes three elongate slots 182, 184 and 186 configured to hold respective ink-bearing structures 188, 190, and 192. Each ink-bearing structure is typically a block of sponge-like material or laminated fibrous sheets. For example, these structures can be foam, a fibre and perforated membrane laminate, a foam and perforated membrane laminate, a folded perforated membrane, or sponge wrapped in perforated membrane. The ink bearing structures 188, 190 and 192 contain substantial void regions that contain ink, and are configured to prevent the ink moving around when the cartridge (or mobile telecommunications device in which it is installed) is shaken or otherwise moved. The amount of ink in each reservoir is not critical, but a typical volume per color would be of the order of 0.5 to 1.0 mL.

The porous material also has a capillary action that establishes a negative pressure at the in ejection nozzles (described in detail below). During periods of inactivity, the ink is retained in the nozzle chambers by the surface tension of the ink meniscus that forms across the nozzle. If the meniscus bulges outwardly, it can 'pin' itself to the nozzle rim to hold the ink in the chamber. However, if it contacts paper dust or other contaminants on the nozzle rim, the meniscus can be unpinned from the rim and ink will leak out of the printhead through the nozzle.

To address this, many ink cartridges are designed so that the hydrostatic pressure of the ink in the chambers is less than atmospheric pressure. This causes the meniscus at the nozzles to be concave or drawn inwards. This stops the meniscus from touching paper dust on the nozzle rim and removes the slightly positive pressure in the chamber that would drive the ink to leak out.

A housing lid 194 fits onto the top of the print cartridge to define ink reservoirs in conjunction with the ink slots 182, 184 and 186. The lid can be glued, ultra-sonically welded, or otherwise form a seal with the upper edges of the ink slots to prevent the inks from moving between reservoirs or exiting the print cartridge. Ink holes 174 allow the reservoirs to be filled with ink during manufacture. Microchannel vents 140 define tortuous paths along the lid 196 between the ink holes 174 and the breather holes 154. These vents allow pressure equalisation within the reservoirs when the cartridge 148 is in use while the tortuous path prevents ink leakage when the mobile phone 100 is moved through different orientations. A label 196 covers the vents 140, and includes a tear-off portion 198 that is removed before use to expose breather holes 154 to vent the slots 182, 184 and 186 to atmosphere.

A series of outlets (not shown) in the bottom of each of the slots 182, 184 and 186, lead to ink ducts 262 formed in the housing 180. The ducts are covered by a flexible sealing film 264 that directs ink to a printhead IC 202. One edge of the printhead IC 202 is bonded to the conductors on a flexible TAB film 200. The bonds are covered and protected by an encapsulant strip 204. Contacts 266 are formed on the TAB film 200 to enable power and data to be supplied to the printhead IC 202 via the conductors on the TAB film. The printhead IC 202 is mounted to the underside of the housing 180 by the polymer sealing film 264. The film is laser drilled so that ink in the ducts 262 can flow to the printhead IC 202. The sealing and ink delivery aspects of the film as discussed in greater detail below.

A capper 206 is attached to the chassis 180 by way of slots 208 that engage with corresponding moulded pins 210 on the housing. In its capped position, the capper 206 encloses and protects exposed ink in the nozzles (described below) of the printhead 202. A pair of co-moulded elastomeric seals 240 on either side of the printhead IC 202 reduces its exposure to dust and air that can cause drying and clogging of the nozzles.

A metal cover 224 snaps into place during assembly to cover the capper 206 and hold it in position. The metal cover is generally U-shaped in cross section, and includes entry and exit slots 214 and 152 to allow media to enter and leave the print cartridge. Tongues 216 at either end of the metal cover 224 includes holes 218 that engages with complementary moulded pawls 220 in the lid 194. A pair of capper leaf springs 238 are pressed from the bottom of the U-shape to bias the capper 206 against the printhead 202. A tamper resistant label 222 is applied to prevent casual interference with the print cartridge 148.

As discussed above, the media drive shaft 178 extends across the width of the housing 180 and is retained for rotation by corresponding holes 226 in the housing. The elastomeric drive wheel 176 is mounted to one end of the drive shaft 178 for engagement with the linear drive mechanism 126 when the print cartridge 148 is inserted into the mobile telecommunications device prior to use.

Alternative cartridge designs may have collapsible ink bags for inducing a negative ink pressure at the printhead nozzles. These and other alternatives, are described in detail in the Applicant's co-pending application temporarily identified by Ser. No. 11/124,167 until its serial number is assigned. In the interests of brevity, the disclosure of Ser. No. 11/124,167 has been incorporated herein by cross reference (see list of cross referenced documents above).

Printhead Mechanical

In the preferred form, a Memjet printer includes a monolithic pagewidth printhead. The printhead is a three-color 1600 dpi monolithic chip with an active print length of 2.165" (55.0 mm). The printhead chip is about 800 microns wide and about 200 microns thick.

Power and ground are supplied to the printhead chip via two copper busbars approximately 200 microns thick, which are electrically connected to contact points along the chip with conductive adhesive. One end of the chip has several data pads that are wire bonded or ball bonded out to a small flex PCB and then encapsulated, as described in more detail elsewhere.

In alternative embodiments, the printhead can be constructed using two or more printhead chips, as described in relation to the SoPEC-based bilithic printhead arrangement described in U.S. Ser. No. 10/754,536 filed on Jan. 12, 2004, the contents of which are incorporated herein by cross-reference. In yet other embodiments, the printhead can be formed from one or more monolithic printheads comprising linking printhead modules as described in U.S. Ser. No. 10/754,536 filed on Jan. 12, 2004 the contents of which are incorporated herein by cross-reference.

In the preferred form, the printhead is designed to at least partially self-destruct in some way to prevent unauthorized refilling with ink that might be of questionable quality. Self-destruction can be performed in any suitable way, but the preferred mechanism is to include at least one fusible link within the printhead that is selectively blown when it is determined that the ink has been consumed or a predetermined number of prints has been performed.

Alternatively or additionally, the printhead can be designed to enable at least partial re-use of some or all of its components as part of a remanufacturing process.

Fusible links on the printhead integrated circuit (or on a separate integrated circuit in the cartridge) can also be used to store other information that the manufacturer would prefer not to be modified by end-users. A good example of such information is ink-remaining data. By tracking ink usage and selectively blowing fusible links, the cartridge can maintain an unalterable record of ink usage. For example, ten fusible links can be provided, with one of the fusible links being blown each time it is determined that a further 10% of the total remaining ink has been used. A set of links can be provided for each ink or for the inks in aggregate. Alternatively or additionally, a fusible link can be blown in response to a predetermined number of prints being performed.

Fusible links can also be provided in the cartridge and selectively blown during or after manufacture of the cartridge to encode an identifier (unique, relatively unique, or otherwise) in the cartridge.

The fusible links can be associated with one or more shift register elements in the same way as data is loaded for printing (as described in more detail below). Indeed, the required shift register elements can form part of the same chain of register elements that are loaded with dot data for printing. In this way, the MoPEC chip is able to control blowing of fusible links simply by changing data that is inserted into the stream of data loaded during printing. Alternatively or additionally, the data for blowing one or more fusible links can be loaded during a separate operation to dot-data loading (ie, dot data is loaded as all zeros). Yet another alternative is for the fusible links to be provided with their own shift register which is loaded independently of the dot data shift register.

Figure 25:
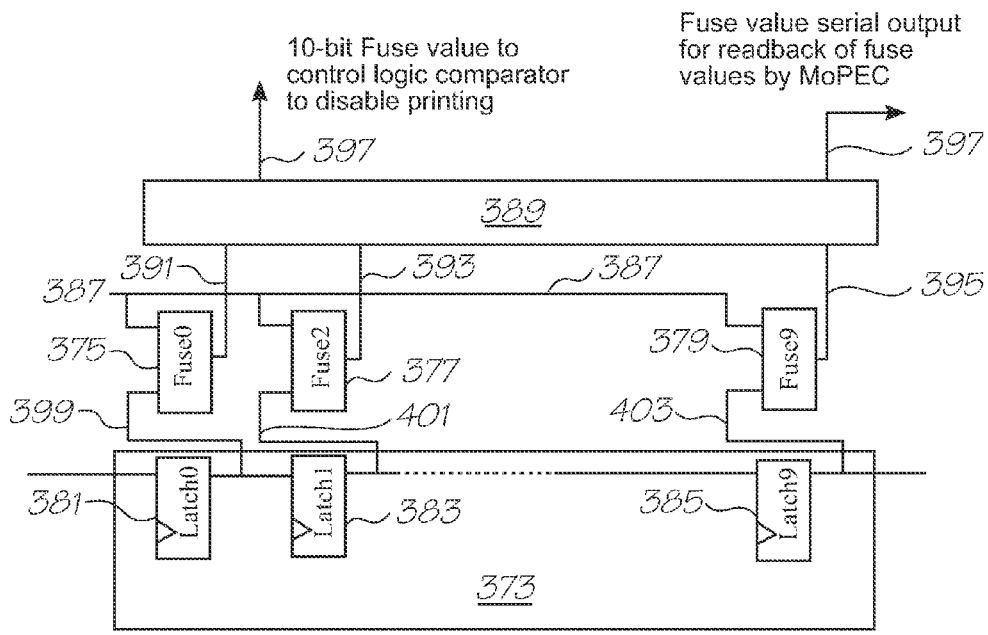
FIG. 25 is a circuit diagram of a fusible link on the printhead IC.
Figure 26:
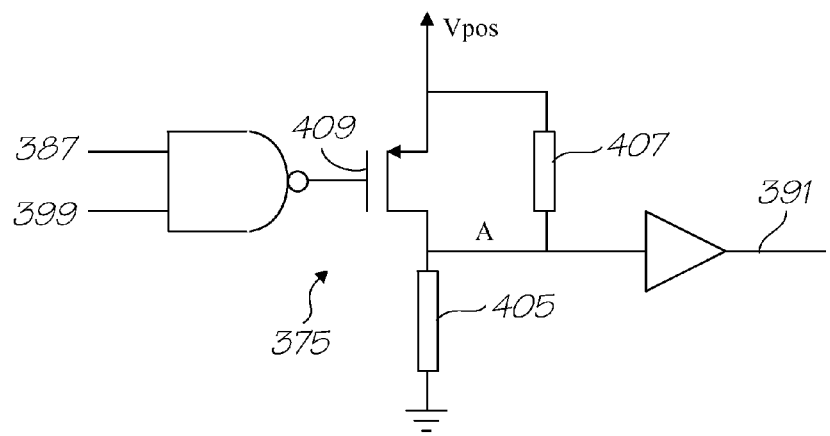
FIG. 26 is a circuit diagram of a single fuse cell.

FIGS. 25 and 26 show basic circuit diagrams of a 10-fuse link and a single fuse cell respectively. FIG. 25 shows a shift register 373 that can be loaded with values to be programmed into the 1-bit fuse cells 375, 377 and 379. Each shift register latch 381, 383 and 385 connects to a 1-bit fuse cell respectively, providing the program value to its corresponding cell. The fuses are programmed by setting the fuse_program_enable signal 387 to 1. The fuse cell values 391, 393 and 395 are loaded into a 10-bit register 389. This value 389 can be accessed by the printhead IC control logic, for example to inhibit printing when the fuse value is all ones. Alternatively or additionally, the value 397 can be read serially by MoPEC, to see the state of the fuses 375, 377 and 379 after MoPEC is powered up.

A possible fuse cell 375 is shown in FIG. 26. Before being blown, the fuse element structure itself has a electrical resistance 405, which is substantially lower than the value of the pullup resistor 407. This pulls down the node A, which is buffered to provide the fuse-value output 391, initially a zero. A fuse is blown when fuse_program_enable 387 and fuse_program value 399 are both 1. This causes the PFET 409 connecting node A to Vpos is turn on, and current flows that causes the fuse element to go open circuit, i.e. resistor 405 becomes infinite. Now the fuse value output 391 will read back as a one.

Sealing the Printhead

As briefly mentioned above, the printhead IC 202 is mounted to the underside of the housing 180 by the polymer sealing film 264 (see FIG. 24). This film may be a thermoplastic film such as a PET or Polysulphone film, or it may be in the form of a thermoset film, such as those manufactured by AL technologies and Rogers Corporation. The polymer sealing film 264 is a laminate with adhesive layers on both sides of a central film, and laminated onto the underside of the moulded housing 180. A plurality of holes (not shown) are laser drilled through the sealing film 264 to coincide with ink delivery points in the ink ducts 262 (or in the case of the alternative cartridge, the ink ducts 320 in the film layer 318) so that the printhead IC 202 is in fluid communication with the ink ducts 262 and therefore the ink retaining structures 188, 190 and 192.

The thickness of the polymer sealing film 264 is critical to the effectiveness of the ink seal it provides. The film seals the ink ducts 262 on the housing 180 (or the ink ducts 320 in the film layer 318) as well as the ink conduits (not shown) on the reverse side of the printhead IC 202. However, as the film 264 seals across the ducts 262, it can also bulge into one of conduits on the reverse side of the printhead IC 202. The section of film bulging into the conduit, may run across several of the ink ducts 262 in the printhead IC 202. The sagging may cause a gap that breaches the seal and allows ink to leak from the printhead IC 202 and or between the conduits on its reverse side.

To guard against this, the polymer sealing film 264 should be thick enough to account for any bulging into the ink ducts 262 (or the ink ducts 320 in the film layer 318) while maintaining the seal on the back of the printhead IC 202. The minimum thickness of the polymer sealing film 264 will depend on:

the width of the conduit into which it sags;
the thickness of the adhesive layers in the film's laminate structure;
the 'stiffness' of the adhesive layer as the printhead IC 202 is being pushed into it; and,
the modulus of the central film material of the laminate.

A polymer sealing film 264 thickness of 25 microns is adequate for the printhead IC and cartridge assembly shown. However, increasing the thickness to 50, 100 or even 200 microns will correspondingly increase the reliability of the seal provided.

Printhead CMOS

Turning now to FIGS. 27 to 46, a preferred embodiment of the printhead 420 (comprising printhead IC 425) will be described.

Figure 27:
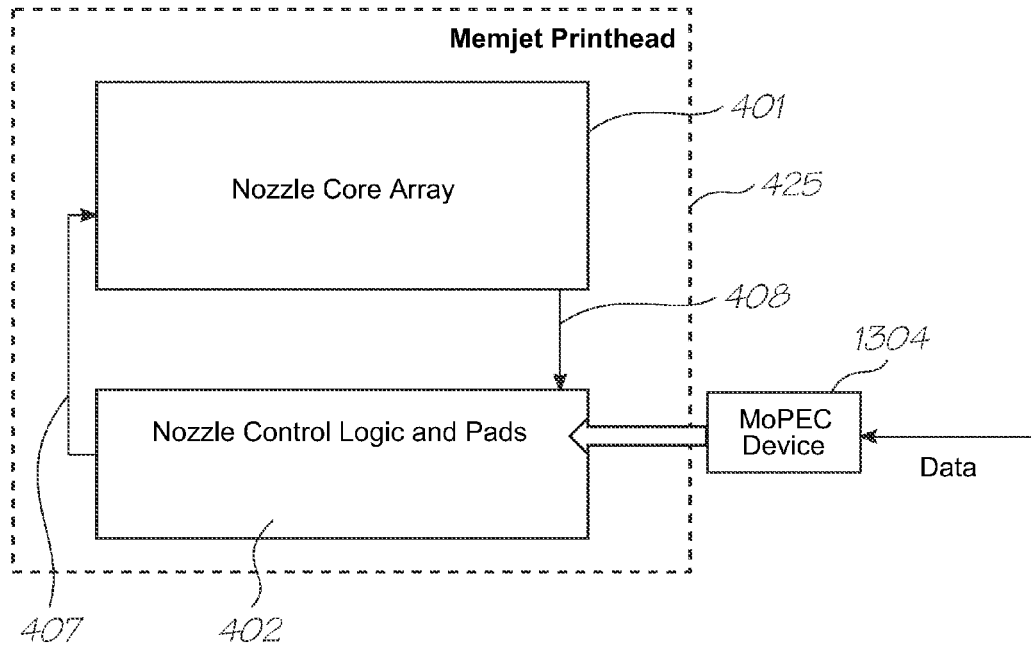
FIG. 27 is a schematic overview of the printhead IC and its connection to MoPEC.

FIG. 27 shows an overview of printhead IC 425 and its connections to the MoPEC device 166. Printhead IC 425 includes a nozzle core array 401 containing the repeated logic to fire each nozzle, and nozzle control logic 402 to generate the timing signals to fire the nozzles. The nozzle control logic 402 receives data from the MoPEC chip 166 via a high-speed link. In the preferred form, a single MoPEC chip 166 feeds the two printhead ICs 425 and 426 with print data.

The nozzle control logic is configured to send serial data to the nozzle array core for printing, via a link 407, which for printhead 425 is the electrical connector 428. Status and other operational information about the nozzle array core 401 is communicated back to the nozzle control logic via another link 408, which is also provided on the electrical connector 428.

Figure 28:
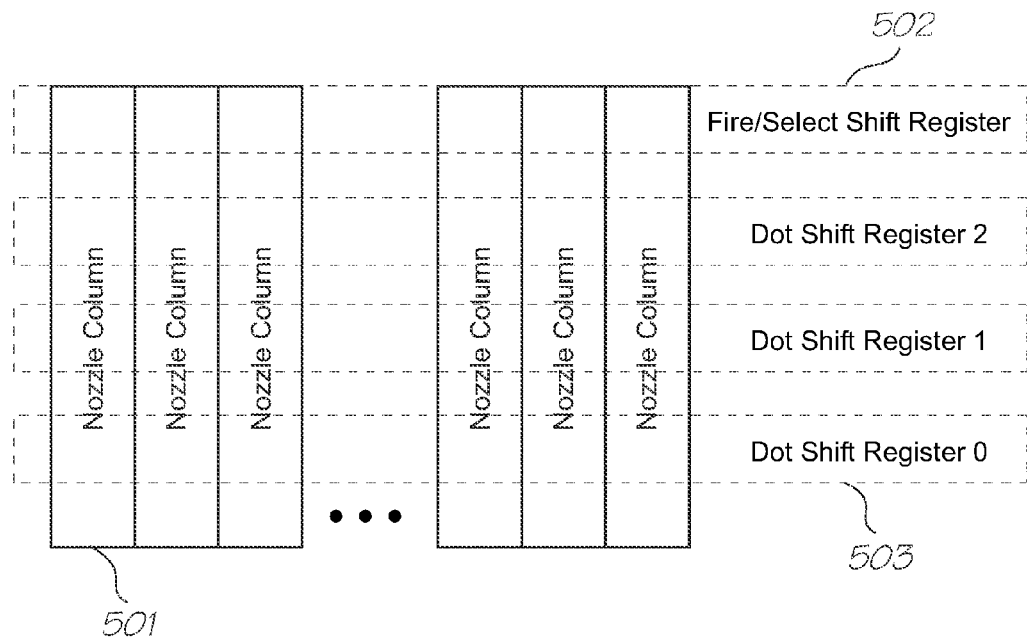
FIG. 28 is a schematic representation showing the relationship between nozzle columns and dot shift registers in the CMOS blocks of FIG. 27.
Figure 29:
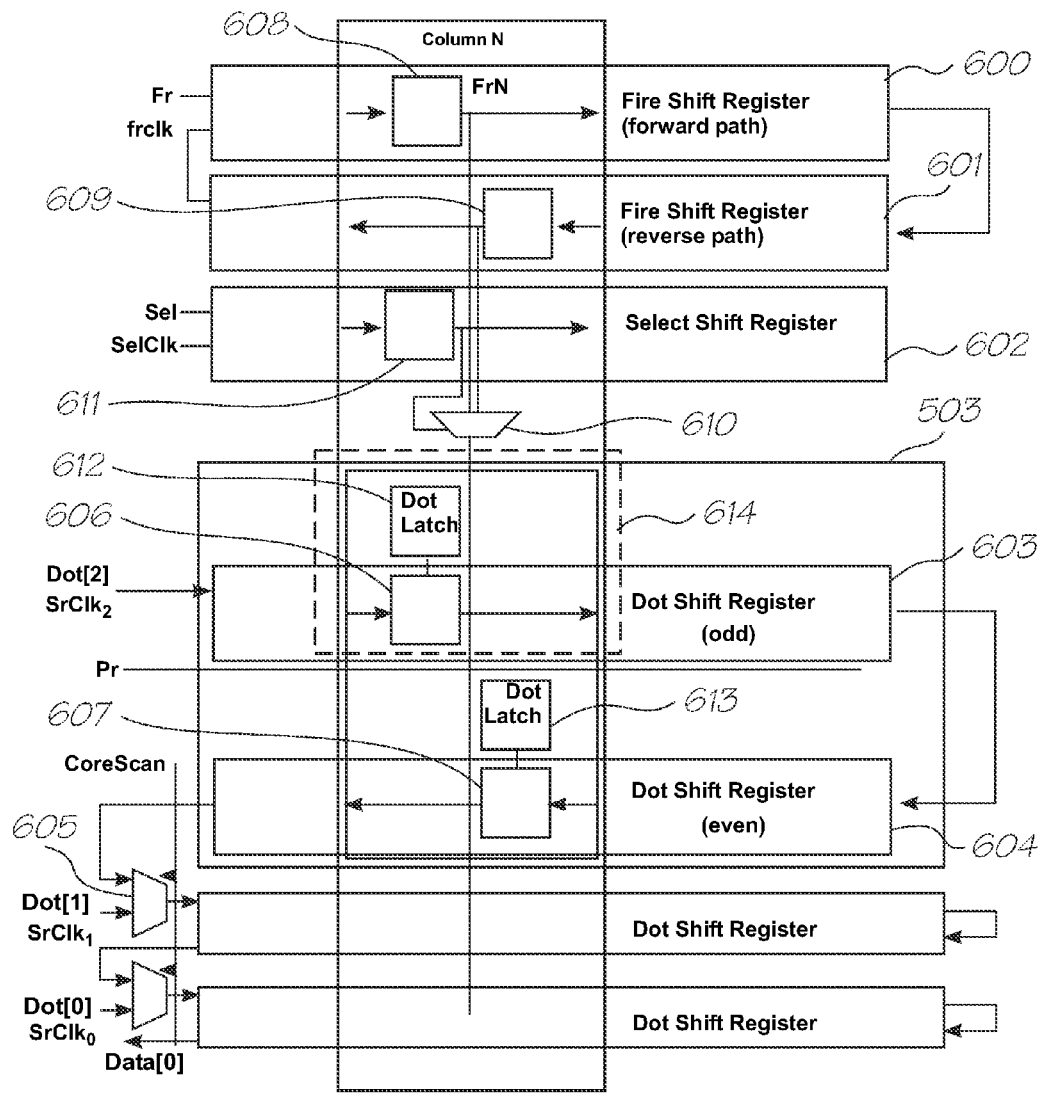
FIG. 29 shows a more detailed schematic showing a unit cell and its relationship to the nozzle columns and dot shift registers of FIG. 28.

The nozzle array core 401 is shown in more detail in FIGS. 28 and 29. In FIG. 28, it will be seen that the nozzle array core comprises an array of nozzle columns 501. The array includes a fire/select shift register 502 and three color channels, each of which is represented by a corresponding dot shift register 503.

As shown in FIG. 29, the fire/select shift register 502 includes a forward path fire shift register 600, a reverse path fire shift register 601 and a select shift register 602. Each dot shift register 503 includes an odd dot shift register 603 and an even dot shift register 604. The odd and even dot shift registers 603 and 604 are connected at one end such that data is clocked through the odd shift register 603 in one direction, then through the even shift register 604 in the reverse direction. The output of all but the final even dot shift register is fed to one input of a multiplexer 605. This input of the multiplexer is selected by a signal (corescan) during post-production testing. In normal operation, the corescan signal selects dot data input Dot[x] supplied to the other input of the multiplexer 605. This causes Dot[x] for each color to be supplied to the respective dot shift registers 503.

A single column N will now be described with reference to FIG. 29. In the embodiment shown, the column N includes six data values, comprising an odd data value held by an element 606 of the odd shift register 603, and an even data value held by an element 607 of the even shift register 604, for each of the three dot shift registers 503. Column N also includes an odd fire value 608 from the forward fire shift register 600 and an even fire value 609 from the reverse fire shift register 601, which are supplied as inputs to a multiplexer 610. The output of the multiplexer 610 is controlled by the select value 611 in the select shift register 602. When the select value is zero, the odd fire value is output, and when the select value is one, the even fire value is output.

The values from the shift register elements 606 and 607 are provided as inputs to respective odd and even dot latches 612 and 613 respectively.

Figure 30:
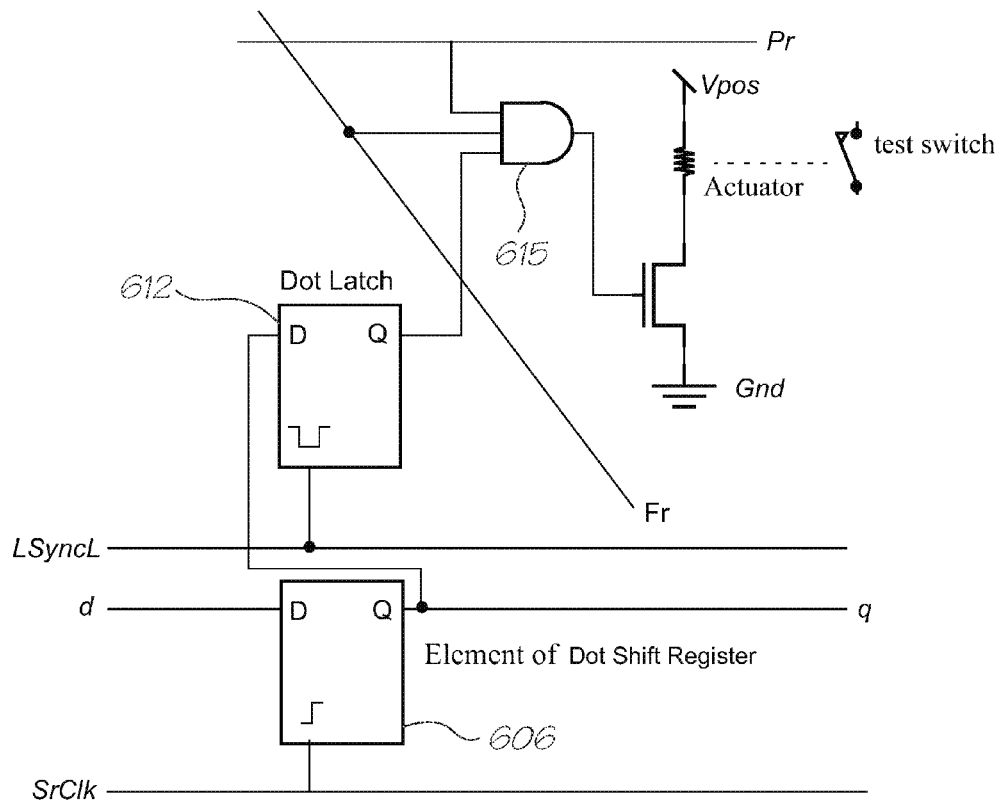
FIG. 30 shows a circuit diagram showing logic for a single printhead nozzle.

Each of dot latch 612 and 613 and their respective associated shift register elements form a unit cell 614, which is shown in more detail in FIG. 30. The dot latch 612 is a D-type flip-flop that accepts the output of the shift register element 606. The data input d to the shift register element 606 is provided from the output of a previous element in the odd dot shift register (unless the element under consideration is the first element in the shift register, in which case its input is the Dot[x] value). Data is clocked from the output of flip-flop 606 into latch 612 upon receipt of a negative pulse provided on LsyncL.

The output of latch 612 is provided as one of the inputs to a three-input AND gate 65. Other inputs to the AND gate 615 are the Fr signal (from the output of multiplexer 610) and a pulse profile signal Pr. The firing time of a nozzle is controlled by the pulse profile signal Pr, and can be, for example, lengthened to take into account a low voltage condition that arises due to low battery (in a battery-powered embodiment). This is to ensure that a relatively consistent amount of ink is efficiently ejected from each nozzle as it is fired. In the embodiment described, the profile signal Pr is the same for each dot shift register, which provides a balance between complexity, cost and performance. However, in other embodiments, the Pr signal can be applied globally (ie, is the same for all nozzles), or can be individually tailored to each unit cell or even to each nozzle.

Once the data is loaded into the latch 612, the fire enable Fr and pulse profile Pr signals are applied to the AND gate 615, combining to the trigger the nozzle to eject a dot of ink for each latch 612 that contains a logic 1.

The signals for each nozzle channel are summarized in the following table:

| Name | Direction | Description |
|---|---|---|
| d | Input | Input dot pattern to shift register bit |
| q | Output | Output dot pattern from shift register bit |
| SrClk | Input | Shift register clock in - d is captured on rising edge of this clock |
| LsyncL | Input | Fire enable - needs to be asserted for nozzle to fire |
| Pr | Input | Profile - needs to be asserted for nozzle to fire |

As shown in FIG. 30, the fire signals Fr are routed on a diagonal, to enable firing of one color in the current column, the next color in the following column, and so on. This averages the current demand by spreading it over the three nozzle columns in time-delayed fashion.

The dot latches and the latches forming the various shift registers are fully static in this embodiment, and are CMOS-based. The design and construction of latches is well known to those skilled in the art of integrated circuit engineering and design, and so will not be described in detail in this document.

Figure 31:
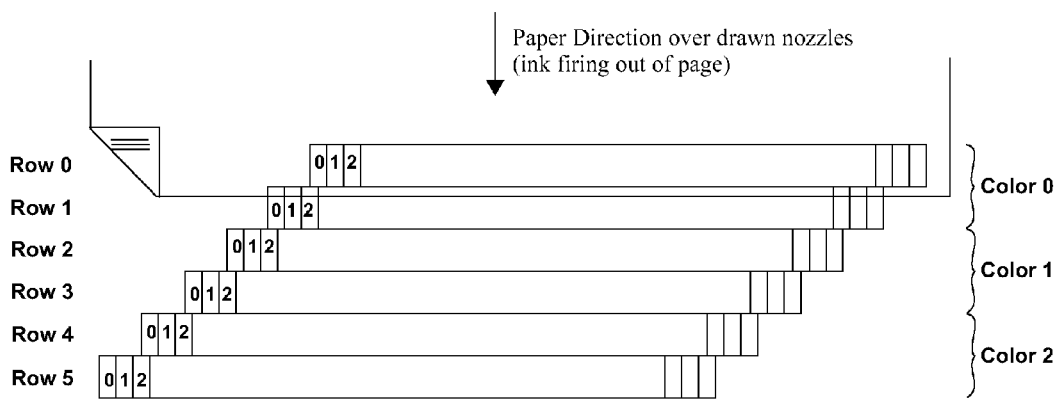
FIG. 31 is a schematic representation of the physical positioning of the odd and even nozzle rows.

The combined printhead ICs define a printhead having 13824 nozzles per color. The circuitry supporting each nozzle is the same, but the pairing of nozzles happens due to physical positioning of the MEMS nozzles; odd and even nozzles are not actually on the same horizontal line, as shown in FIG. 31.

Nozzle Design—Thermal Actuator

An alternative nozzle design utilises a thermal inkjet mechanism for expelling ink from each nozzle. The thermal nozzles are set out similarly to their mechanical equivalents, and are supplied by similar control signals by similar CMOS circuitry, albeit with different pulse profiles if required by any differences in drive characteristics need to be accounted for.

With reference to FIGS. 32 to 36, the nozzle of a printhead according to an embodiment of the invention comprises a nozzle plate 902 with nozzles 903 therein, the nozzles having nozzle rims 904, and apertures 905 extending through the nozzle plate. The nozzle plate 902 is plasma etched from a silicon nitride structure which is deposited, by way of chemical vapor deposition (CVD), over a sacrificial material which is subsequently etched.

The printhead also includes, with respect to each nozzle 903, side walls 906 on which the nozzle plate is supported, a chamber 907 defined by the walls and the nozzle plate 902, a multi-layer substrate 908 and an inlet passage 909 extending through the multi-layer substrate to the far side (not shown) of the substrate. A looped, elongate heater element 910 is suspended within the chamber 907, so that the element is in the form of a suspended beam. The printhead as shown is a microelectromechanical system (MEMS) structure, which is formed by a lithographic process which is described in more detail below.

Figure 32:
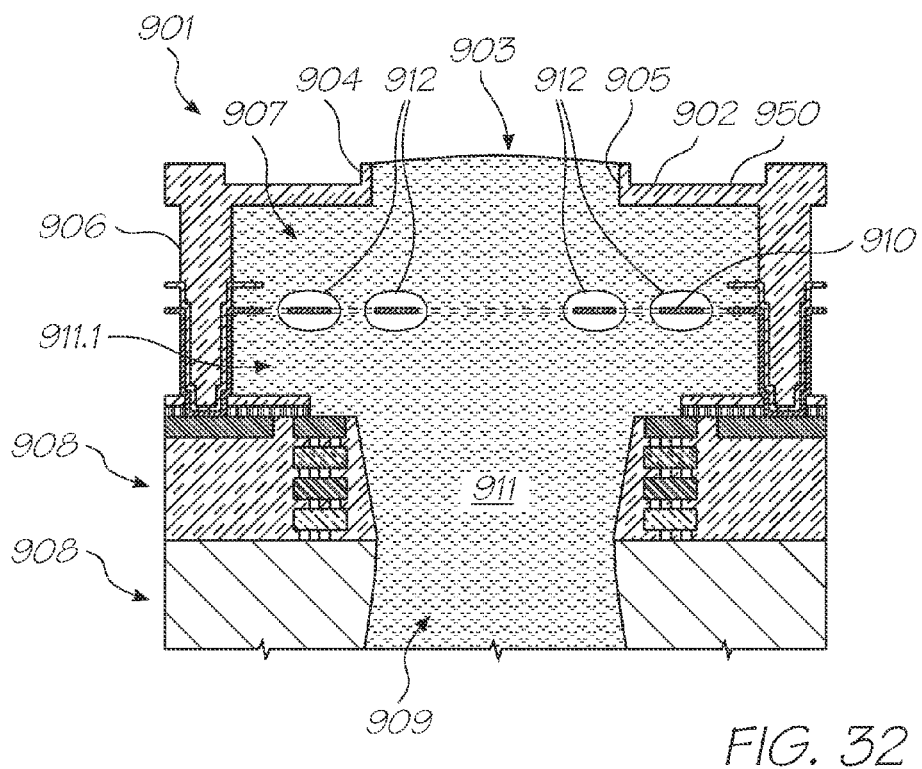
FIG. 32 shows a schematic cross-sectional view through an ink chamber of a single bubble forming type nozzle with a bubble nucleating about heater element.

When the printhead is in use, ink 911 from a reservoir (not shown) enters the chamber 907 via the inlet passage 909, so that the chamber fills to the level as shown in FIG. 32. Thereafter, the heater element 910 is heated for somewhat less than 1 micro second, so that the heating is in the form of a thermal pulse. It will be appreciated that the heater element 910 is in thermal contact with the ink 911 in the chamber 907 so that when the element is heated, this causes the generation of vapor bubbles 912 in the ink. Accordingly, the ink 911 constitutes a bubble forming liquid. FIG. 32 shows the formation of a bubble 912 approximately 1 microsecond after generation of the thermal pulse, that is, when the bubble has just nucleated on the heater elements 910. It will be appreciated that, as the heat is applied in the form of a pulse, all the energy necessary to generate the bubble 12 is to be supplied within that short time.

In operation, voltage is applied across electrodes (not shown) to cause current to flow through the elements 910. The electrodes 915 are much thicker than the element 910 so that most of the electrical resistance is provided by the element. Thus, nearly all of the power consumed in operating the heater 914 is dissipated via the element 910, in creating the thermal pulse referred to above.

When the element 910 is heated as described above, the bubble 912 forms along the length of the element, this bubble appearing, in the cross-sectional view of FIG. 32, as four bubble portions, one for each of the element portions shown in cross section.

The bubble 912, once generated, causes an increase in pressure within the chamber 97, which in turn causes the ejection of a drop 916 of the ink 911 through the nozzle 903. The rim 904 assists in directing the drop 916 as it is ejected, so as to minimize the chance of drop misdirection.

The reason that there is only one nozzle 903 and chamber 907 per inlet passage 909 is so that the pressure wave generated within the chamber, on heating of the element 910 and forming of a bubble 912, does not affect adjacent chambers and their corresponding nozzles.

The advantages of the heater element 910 being suspended rather than being embedded in any solid material, is discussed below.

Figure 33:
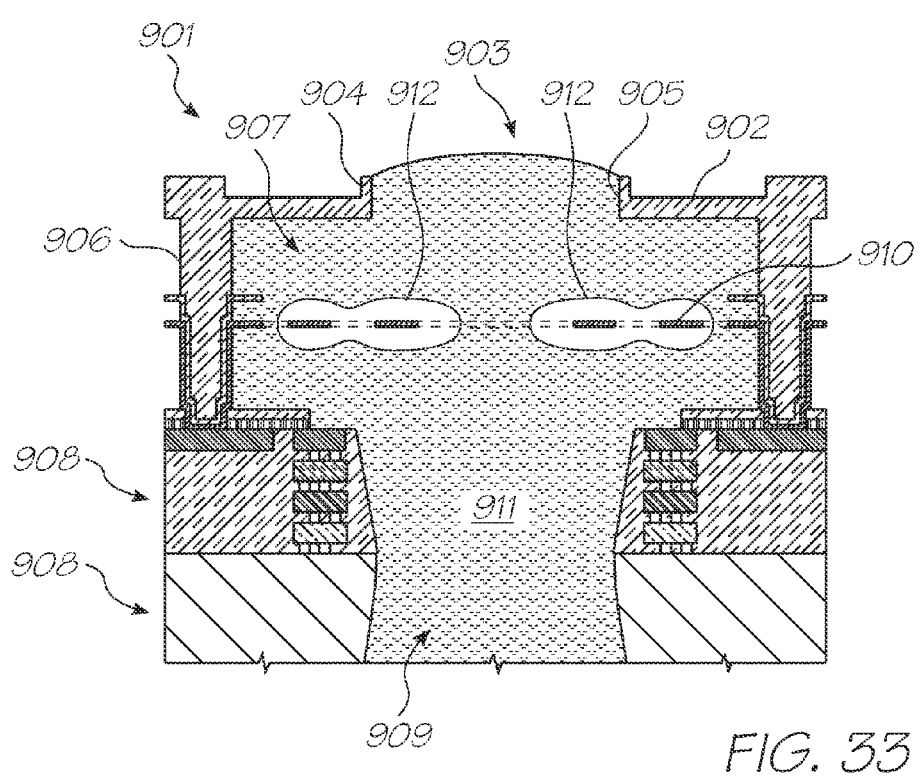
FIG. 33 shows the bubble growing in the nozzle of FIG. 32.
Figure 34:
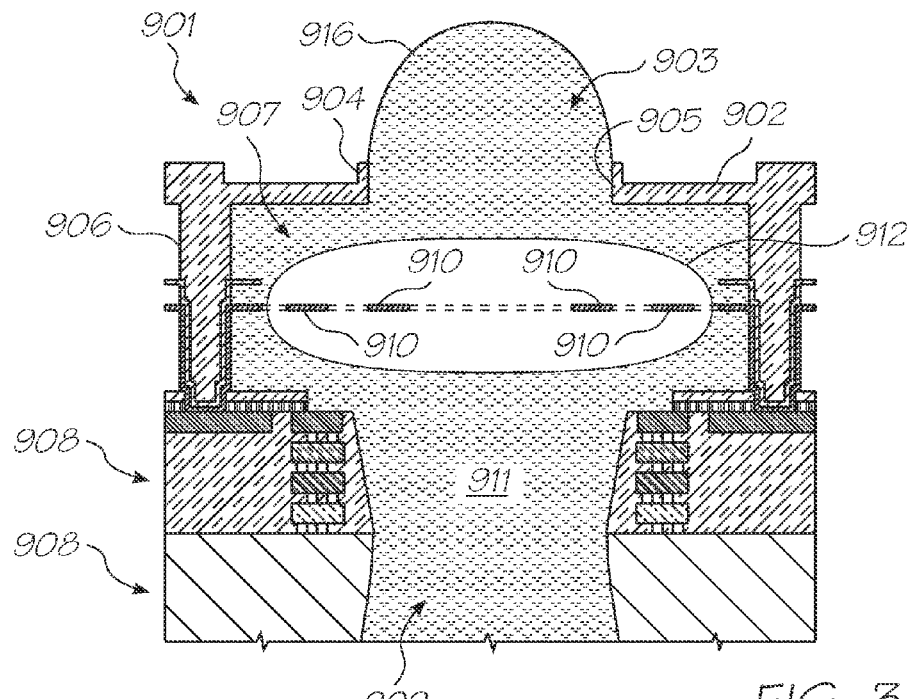
FIG. 34 shows further bubble growth within the nozzle of FIG. 32.

FIGS. 33 and 34 show the unit cell 901 at two successive later stages of operation of the printhead. It can be seen that the bubble 912 generates further, and hence grows, with the resultant advancement of ink 911 through the nozzle 903. The shape of the bubble 912 as it grows, as shown in FIG. 34, is determined by a combination of the inertial dynamics and the surface tension of the ink 911. The surface tension tends to minimize the surface area of the bubble 912 so that, by the time a certain amount of liquid has evaporated, the bubble is essentially disk-shaped.

The increase in pressure within the chamber 907 not only pushes ink 911 out through the nozzle 903, but also pushes some ink back through the inlet passage 909. However, the inlet passage 909 is approximately 200 to 300 microns in length, and is only approximately 16 microns in diameter. Hence there is a substantial viscous drag. As a result, the predominant effect of the pressure rise in the chamber 907 is to force ink out through the nozzle 903 as an ejected drop 916, rather than back through the inlet passage 909.

Figure 35:
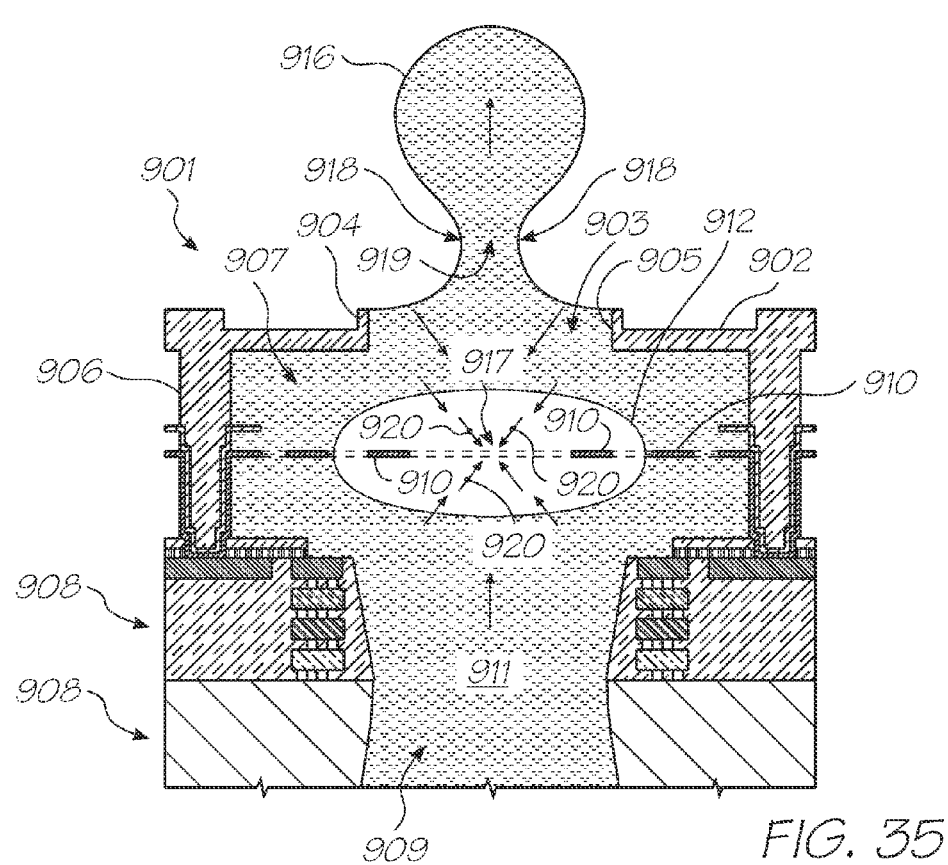
FIG. 35 shows the formation of the ejected ink drop from the nozzle of FIG. 32.
Figure 36:
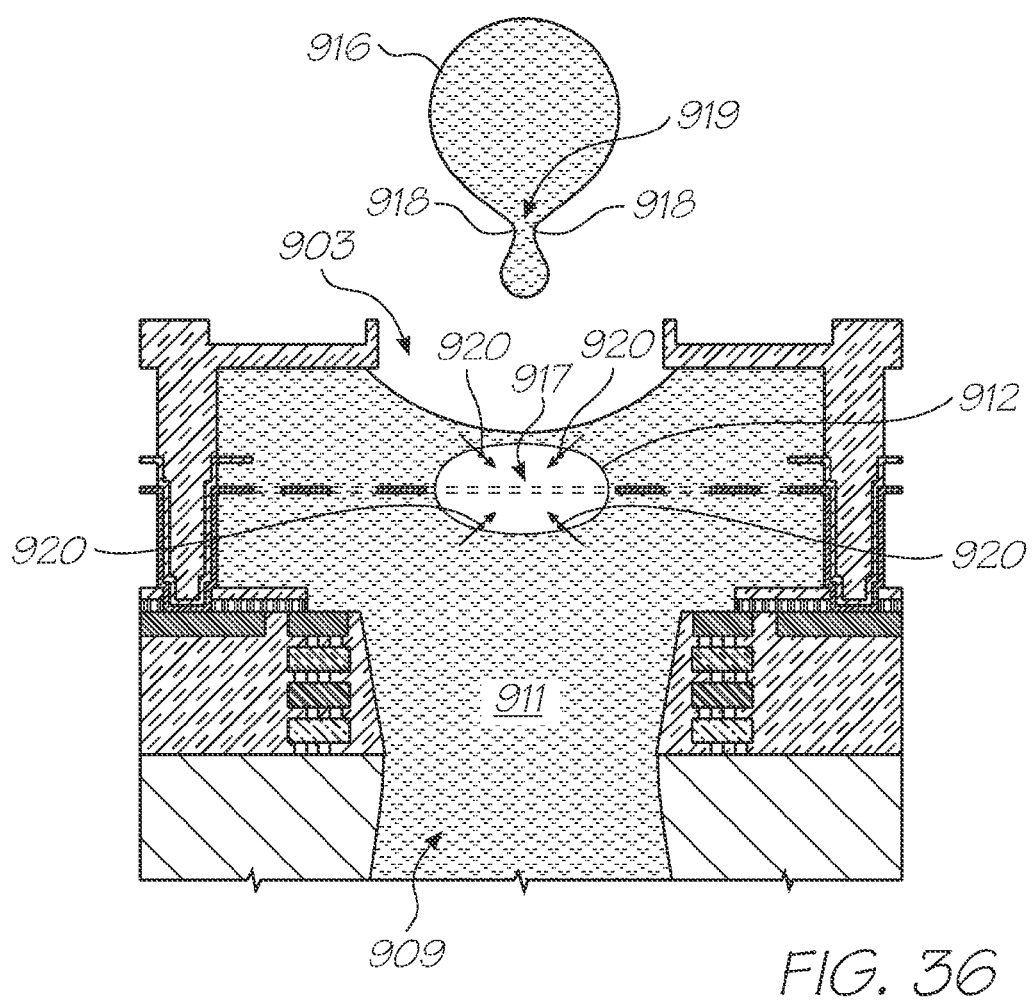
FIG. 36 shows the detachment of the ejected ink drop and the collapse of the bubble in the nozzle of FIG. 32.

Turning now to FIG. 35, the printhead is shown at a still further successive stage of operation, in which the ink drop 916 that is being ejected is shown during its "necking phase" before the drop breaks off. At this stage, the bubble 912 has already reached its maximum size and has then begun to collapse towards the point of collapse 917, as reflected in more detail in FIG. 36.

The collapsing of the bubble 912 towards the point of collapse 917 causes some ink 911 to be drawn from within the nozzle 903 (from the sides 918 of the drop), and some to be drawn from the inlet passage 909, towards the point of collapse. Most of the ink 911 drawn in this manner is drawn from the nozzle 903, forming an annular neck 919 at the base of the drop 916 prior to its breaking off.

The drop 916 requires a certain amount of momentum to overcome surface tension forces, in order to break off. As ink 911 is drawn from the nozzle 903 by the collapse of the bubble 912, the diameter of the neck 919 reduces thereby reducing the amount of total surface tension holding the drop, so that the momentum of the drop as it is ejected out of the nozzle is sufficient to allow the drop to break off.

When the drop 916 breaks off, cavitation forces are caused as reflected by the arrows 920, as the bubble 912 collapses to the point of collapse 917. It will be noted that there are no solid surfaces in the vicinity of the point of collapse 917 on which the cavitation can have an effect.

The nozzles may also use a bend actuated arm to eject ink drops. These so called 'thermal bend' nozzles are set out similarly to their bubble forming thermal element equivalents, and are supplied by similar control signals by similar CMOS circuitry, albeit with different pulse profiles if required by any differences in drive characteristics need to be accounted for. A thermal bend nozzle design is described in detail in the Applicant's co-pending application temporarily identified by Ser. No. 11/124,167 until its serial number is assigned. In the interests of brevity, the disclosure of Ser. No. 11/124,167 has been incorporated herein by cross reference (see list of cross referenced documents above).

Cradle

The various cartridges described above are used in the same way, since the mobile device itself cannot tell which ink supply system is in use. Hence, the cradle will be described with reference to the cartridge 148 only.

Figure 37:
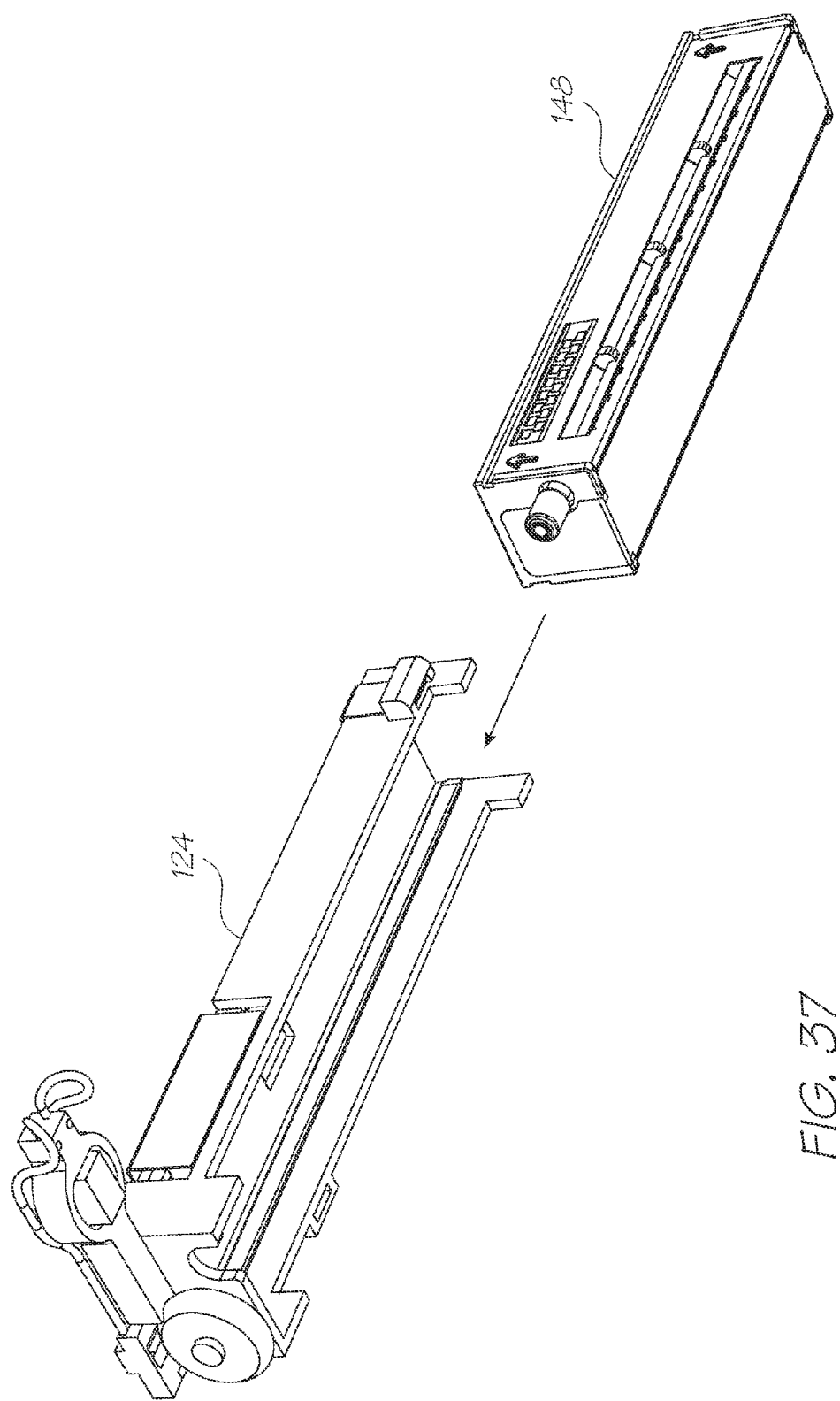
FIG. 37 is a perspective showing the longitudinal insertion of the print cartridge into the cradle assembly.
Figure 36:
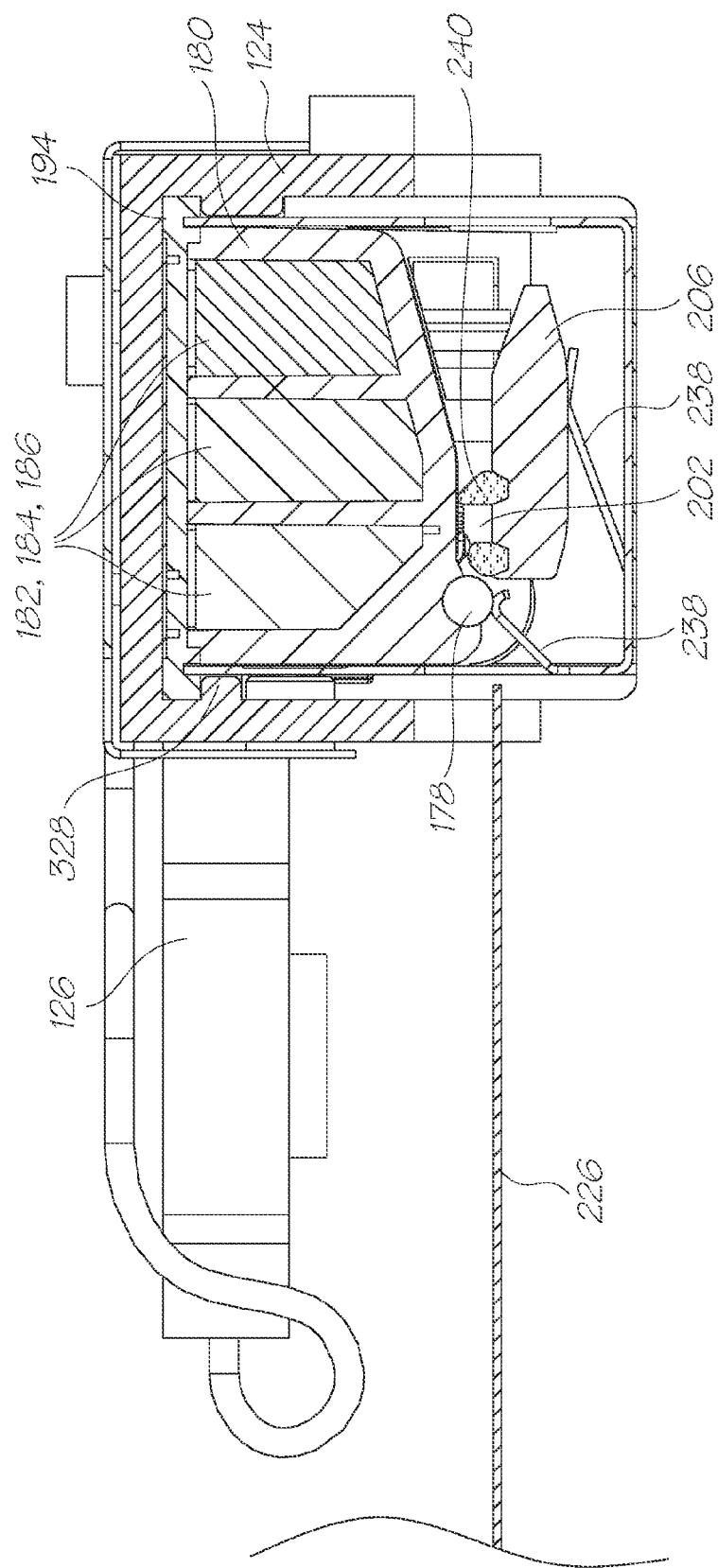

Referring to FIG. 37, the cartridge 148 is inserted axially into the mobile phone 100 via the access cover 282 and into engagement with the cradle 124. As previously shown in FIGS. 19 and 21, the cradle 124 is an elongate U-shaped moulding defining a channel that is dimensioned to closely correspond to the dimensions of the print cartridge 148. Referring now to FIG. 38, the cartridge 148 slides along the rail 328 upon insertion into the mobile phone 100. The edge of the lid moulding 194 fits under the rail 328 for positional tolerance control. As shown in FIGS. 19 to 21 the contacts 266 on the cartridge TAB film 200 are urged against the data/power connector 330 in the cradle. The other side of the data/power connector 330 contacts the cradle flex PCB 332. This PCB connects the cartridge and the MoPEC chip to the power and the host electronics (not shown) of the mobile phone, to provide power and dot data to the printhead to enable it to print. The interaction between the MoPEC chip and the host electronics of the mobile telecommunications device is described in the Netpage and Mobile Telecommunications Device Overview section above.

Media Feed

Figure 12:
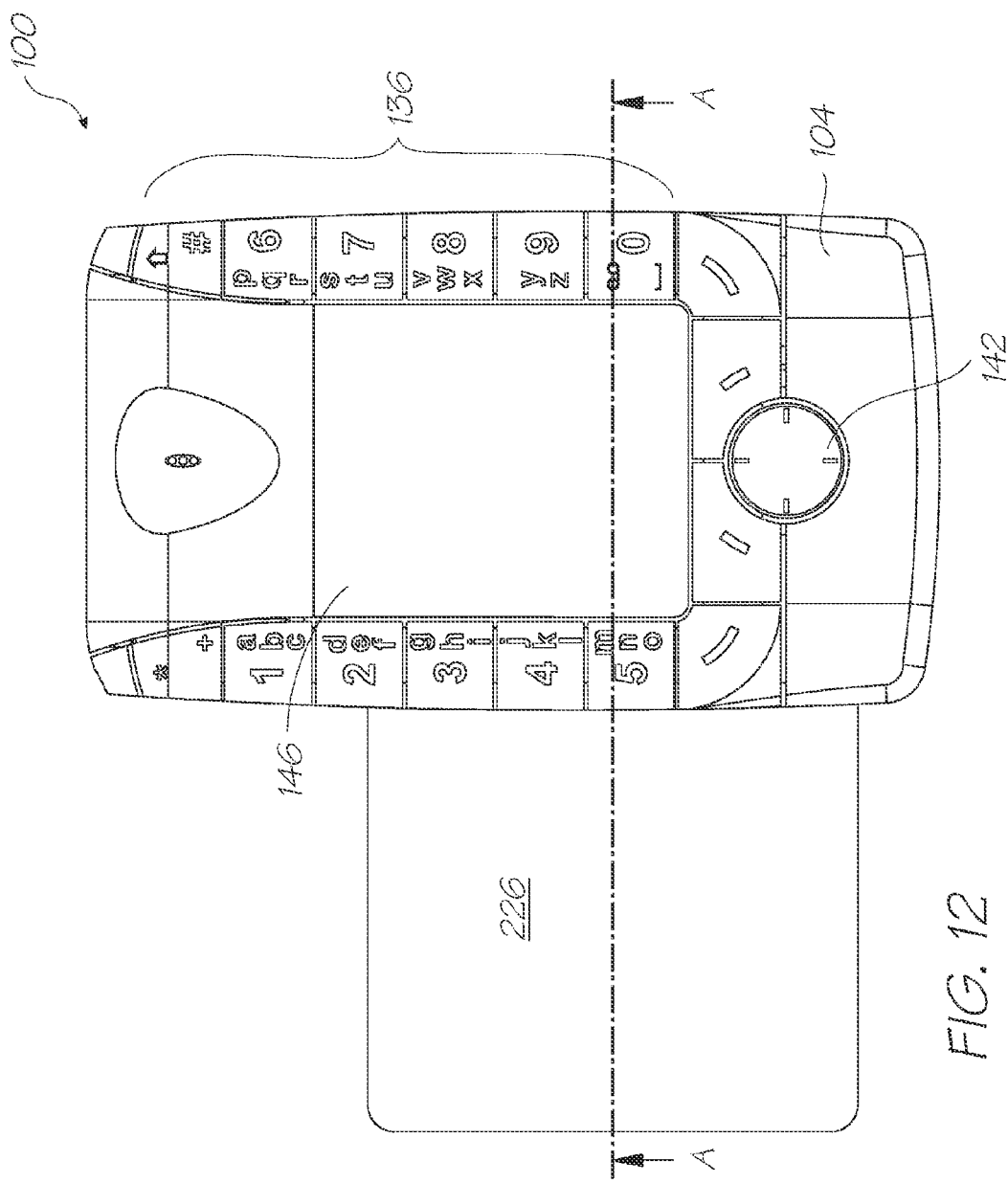
FIG. 12 is a front elevation of the embodiment shown in FIG. 9 with a card being fed into its media entry slot.
Figure 13:
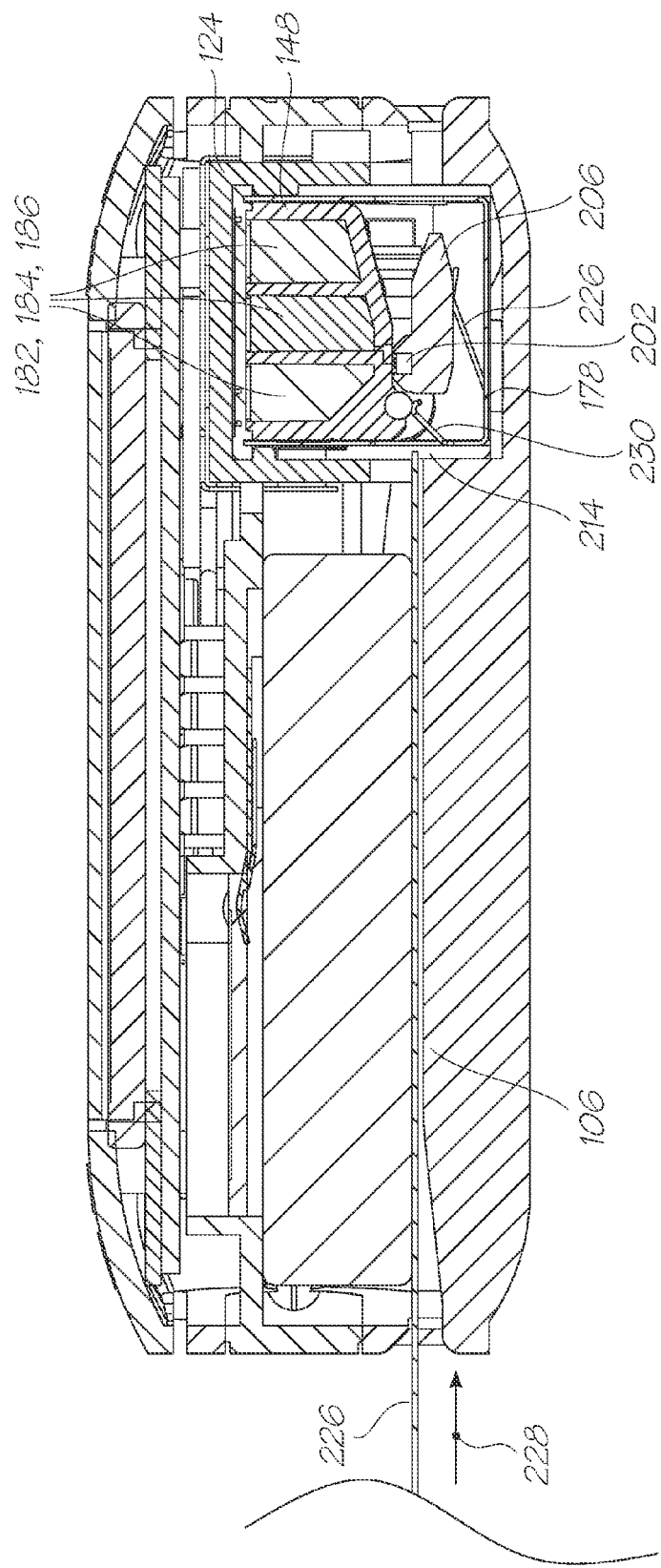
FIG. 13 is a cross section view taken along line A-A of FIG. 12.
Figure 14:
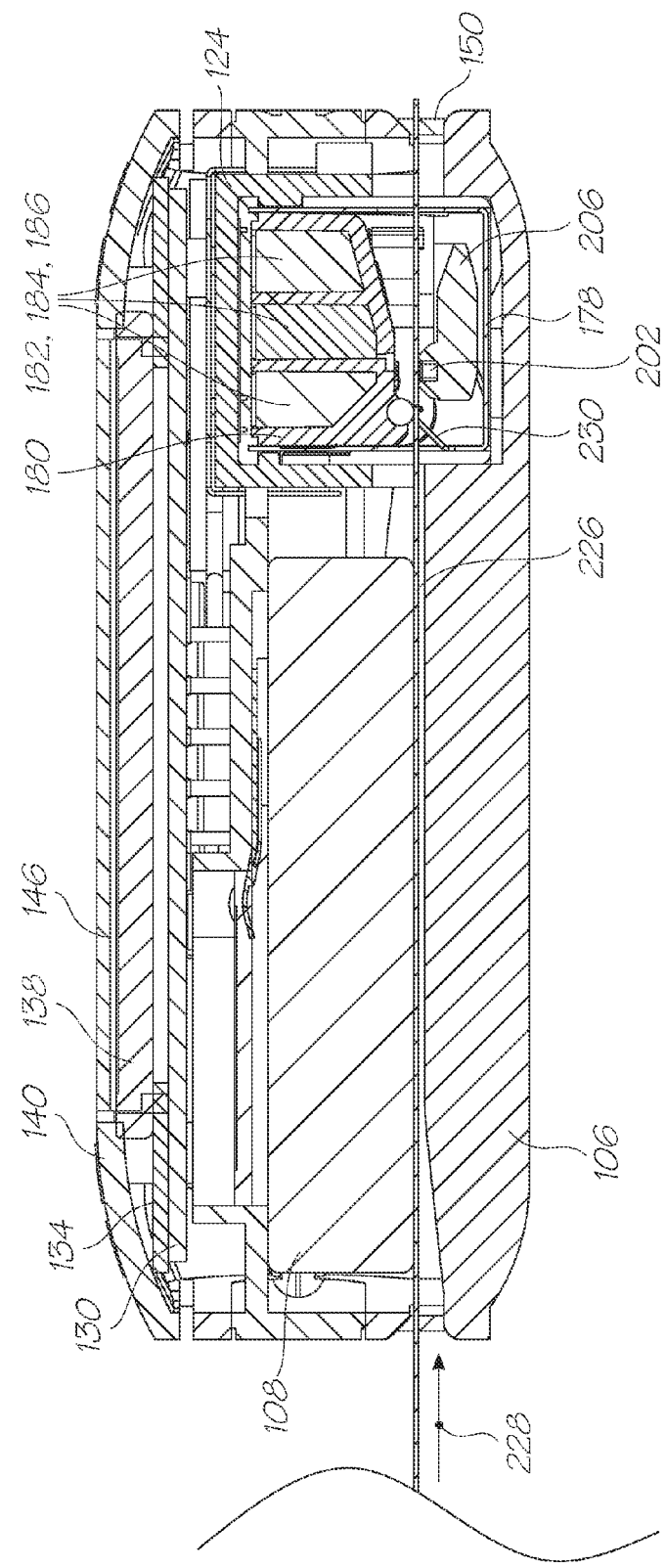
FIG. 14 is a cross section view taken along line A-A of FIG. 12 with the card emerging from the media exit slot of the mobile phone.

FIGS. 12 to 14 show the medium being fed through the mobile telecommunications device and printed by the printhead. FIG. 12 shows the blank medium 226, in this case a card, being fed into the left side of the mobile phone 100. FIG. 13 is section view taken along A-A of FIG. 12. It shows the card 226 entering the mobile telecommunications device through a card insertion slot 228 and into the media feed path leading to the print cartridge 148 and print cradle 124. The rear cover moulding 106 has guide ribs that taper the width of the media feed path into a duct slightly thicker than the card 226. In FIG. 13 the card 226 has not yet entered the print cartridge 148 through the slot 214 in the metal cover 224. The metal cover 224 has a series of spring fingers 230 (described in more detail below) formed along one edge of the entry slot 214. These fingers 230 are biased against the drive shaft 178 so that when the card 226 enters the slot 214, as shown in FIG. 14, the fingers guide it to the drive shaft 178. The nip between the drive shaft 178 and the fingers 230 engages the card 226 and it is quickly drawn between them. The fingers 230 press the card 226 against the drive shaft 178 to drive it past the printhead 202 by friction. The drive shaft 178 has a rubber coating to enhance its grip on the medium 226. Media feed during printing is described in a later section.

It is preferred that the drive mechanism be selected to print the print medium in about 2 to 4 seconds. Faster speeds require relatively higher drive currents and impose restrictions on peak battery output, whilst slower speeds may be unacceptable to consumers. However, faster or slower speeds can certainly be catered for where there is commercial demand.

Decapping

Figure 39:
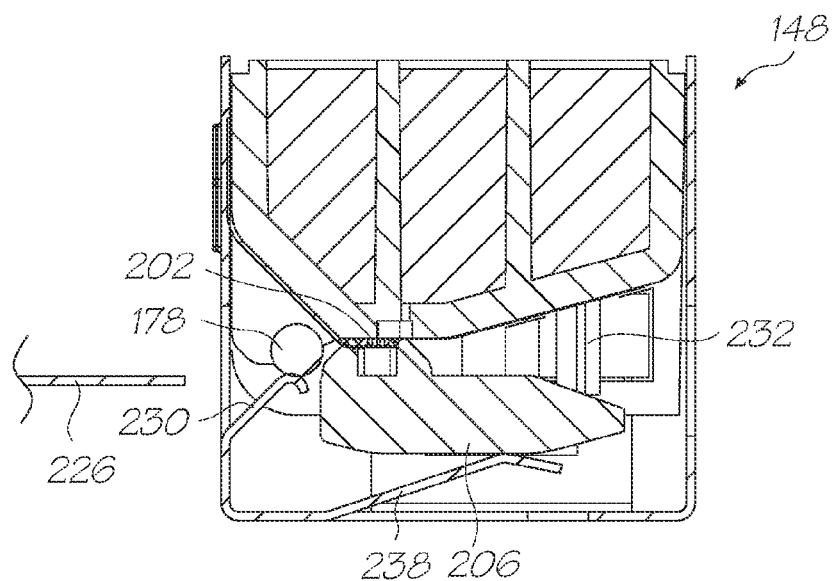
FIGS. 39 to 48 are lateral cross sections through the print cartridge showing the decapping and capping of the printhead.
Figure 40:
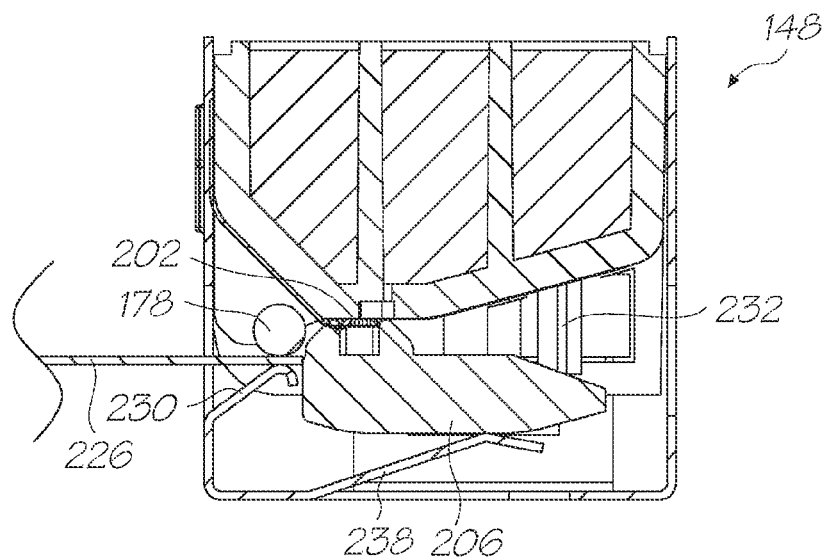
Figure 41:
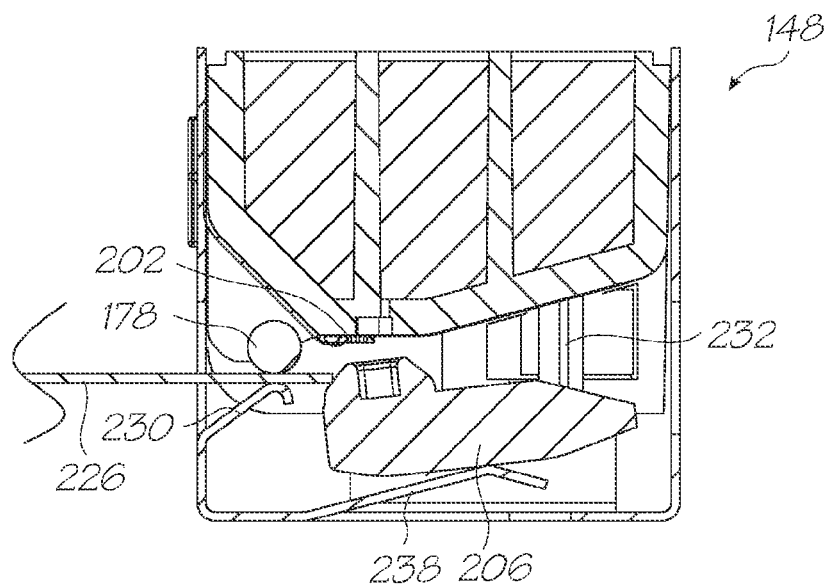

The decapping of the printhead 202 is shown in FIGS. 39 to 48. FIG. 39 shows print cartridge 148 immediately before the card 226 is fed into the entry slot 214. The capper 206 is biased into the capped position by the capper leaf springs 238. The capper's elastomeric seal 240 protects the printhead from paper dust and other contaminants while also stopping the ink in the nozzles from drying out when the printhead is not in use.

Figure 42:
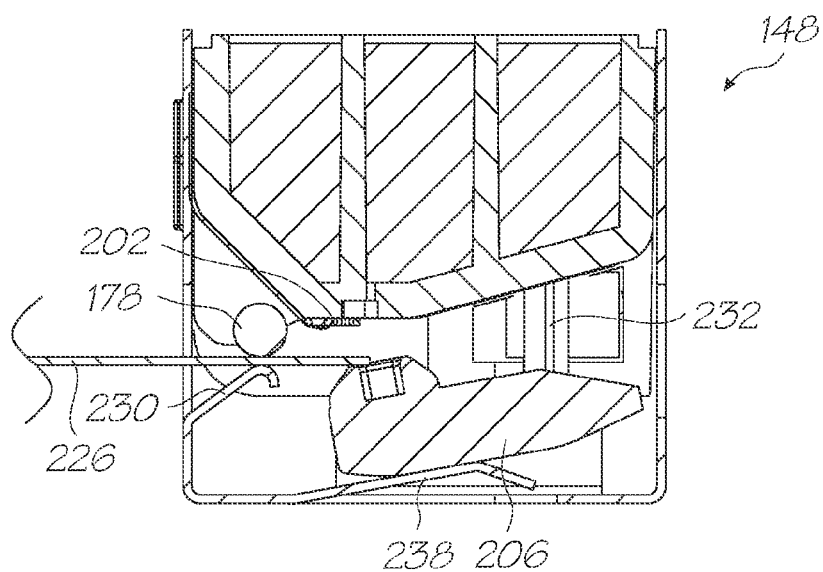
Figure 43:
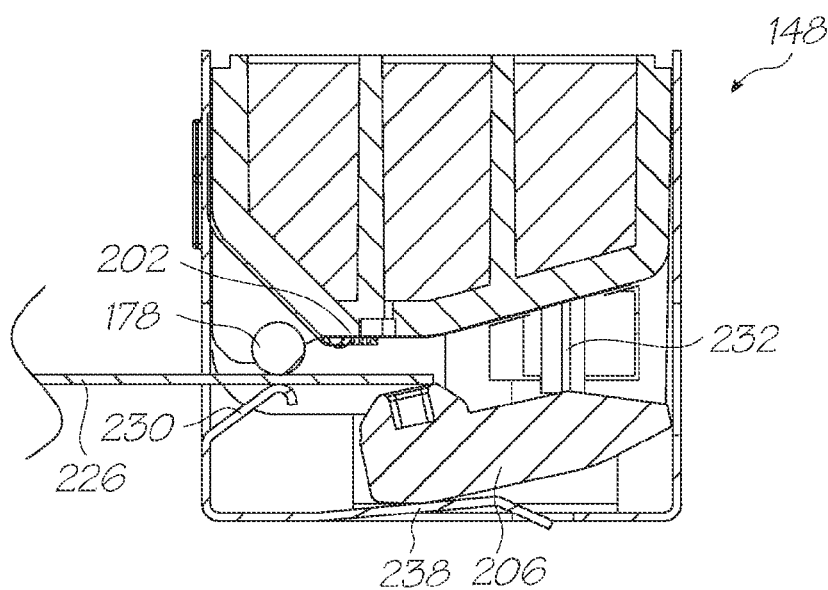
Figure 44:
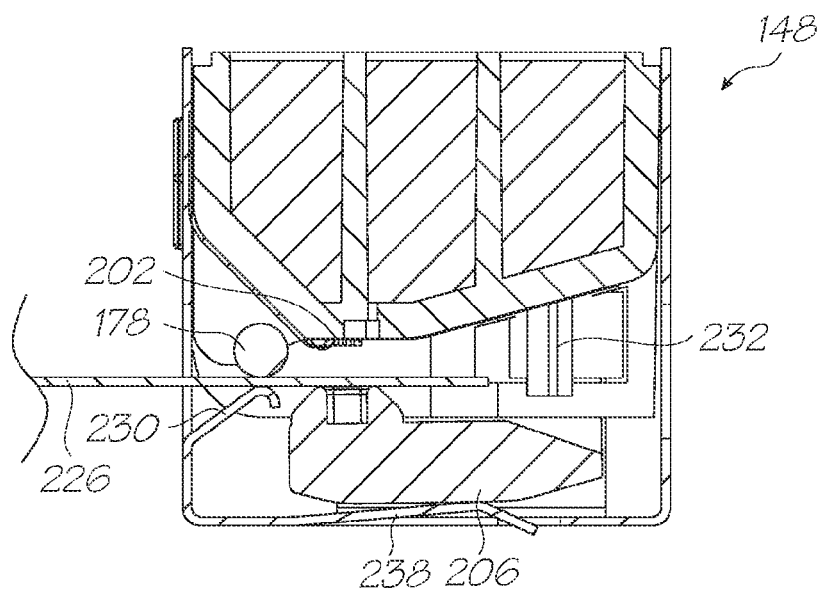
Figure 45:
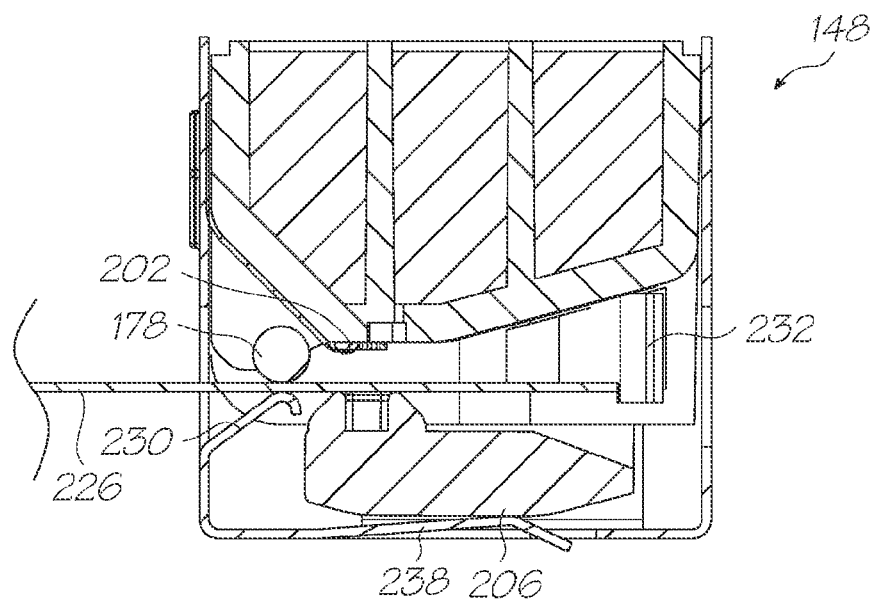

Referring to FIGS. 39 and 42, the card 226 has been fed into the print cartridge 148 via the entry slot 214. The spring fingers 230 urge the card against the drive shaft 178 as it driven past the printhead. Immediately downstream of the drive shaft 178, the leading edge of the card 226 engages the inclined front surface of the capper 206 and pushes it to the uncapped position against the bias of the capper leaf springs 238. The movement of the capper is initially rotational, as the linear movement of the card causes the capper 206 to rotate about the pins 210 that sit in its slots 208 (see FIG. 24). However, as shown in FIGS. 43 to 45, the capper is constrained such that further movement of the card begins to cause linear movement of the capper directly down and away from the printhead chip 202, against the biasing action of spring 238. Ejection of ink from the printhead IC 202 onto the card commences as the leading edge of the card reaches the printhead.

As best shown in FIG. 45, the card 226 continues along the media path until it engages the capper lock actuating arms 232. This actuates the capper lock to hold the capper in the uncapped position until printing is complete. This is described in greater detail below.

Capping

Figure 46:
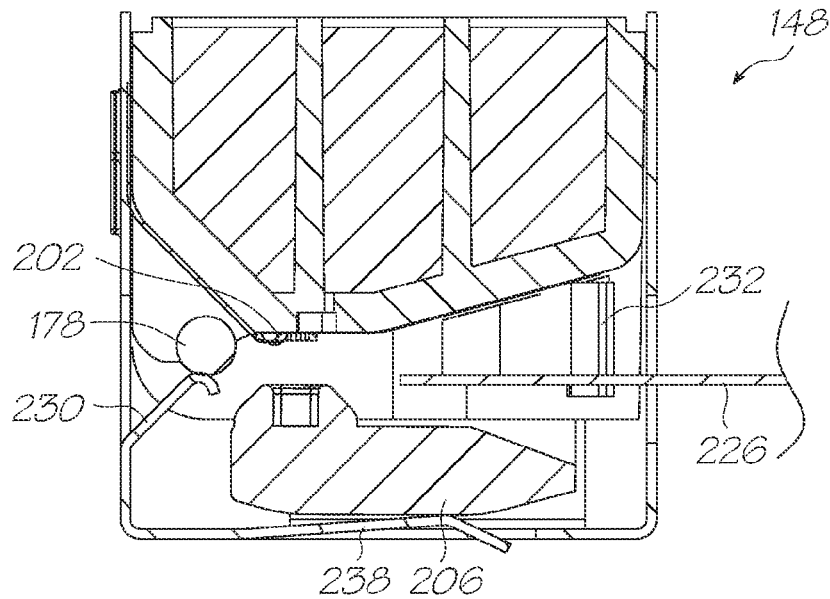
Figure 47:
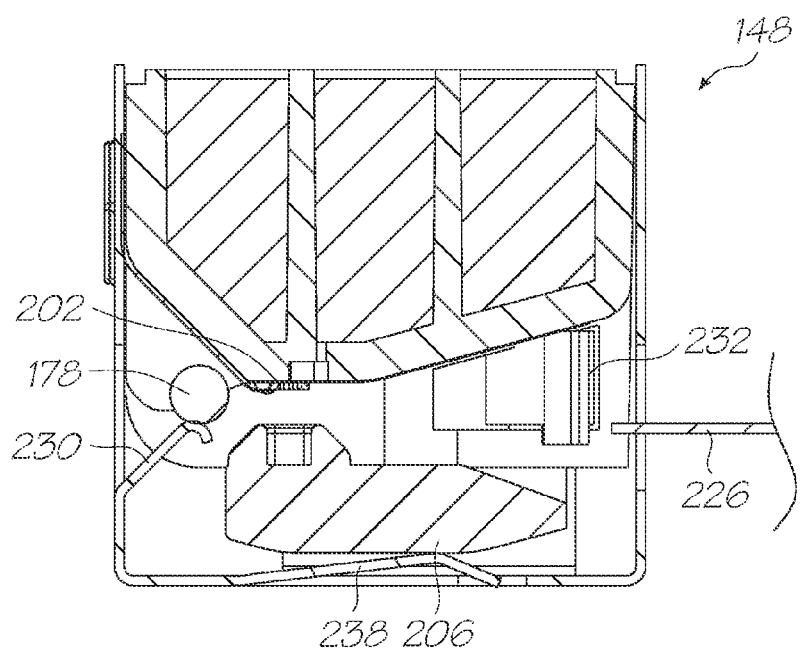
Figure 48:
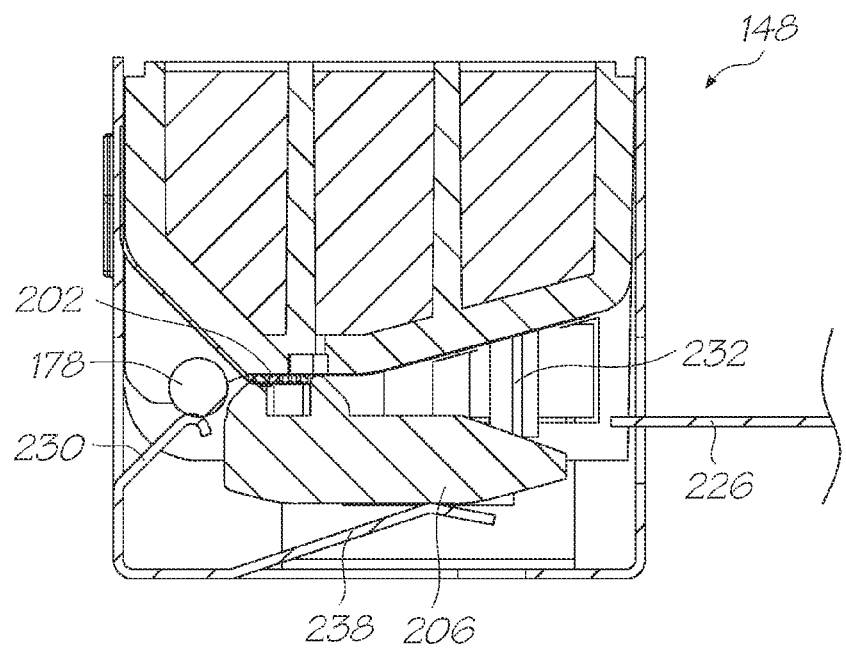

As shown in FIGS. 46 to 48, the capper remains in the uncapped position until the card 226 disengages from the actuation arms 232. At this point the capper 206 is unlocked and returns to its capped position by the leaf spring 230.

Capper Locking and Unlocking

Referring to FIGS. 49 to 53, the card 226 slides over the elastomeric seal 240 as it is driven past the printhead 202. The leading edge of the card 226 then engages the pair of capper locking mechanisms 212 at either side of the media feed path. The capper locking mechanisms 212 are rotated by the card 226 so that its latch surfaces 234 engage lock engagement faces 236 of the capper 206 to hold it in the uncapped position until the card is removed from the print cartridge 148.

Figure 49:
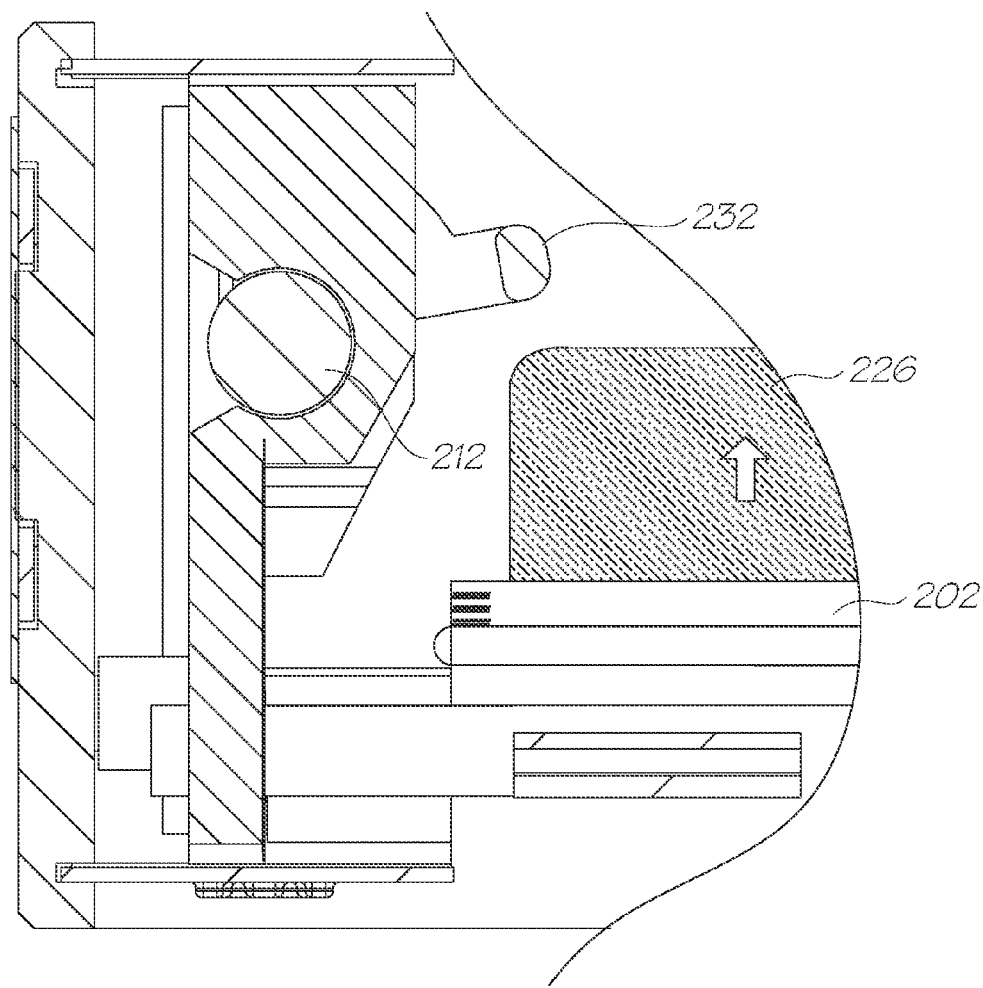
FIG. 49 is an enlarged partial sectional view of the end of the print cartridge indicated by the dotted line in FIG. 51B.
Figure 50:
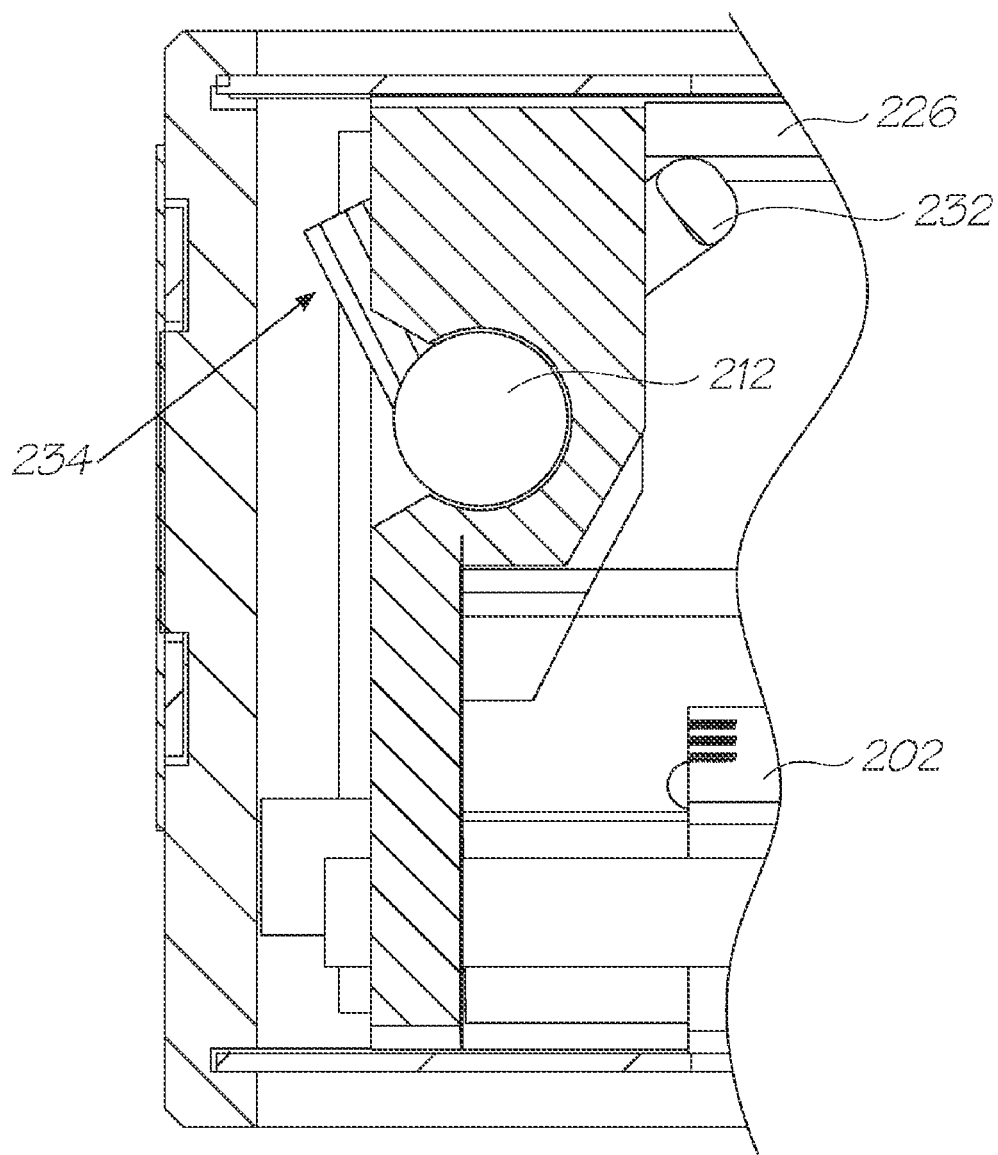
FIG. 50 is a similar sectional view with the locking mechanism rotated to the locked position.
Figure 51:
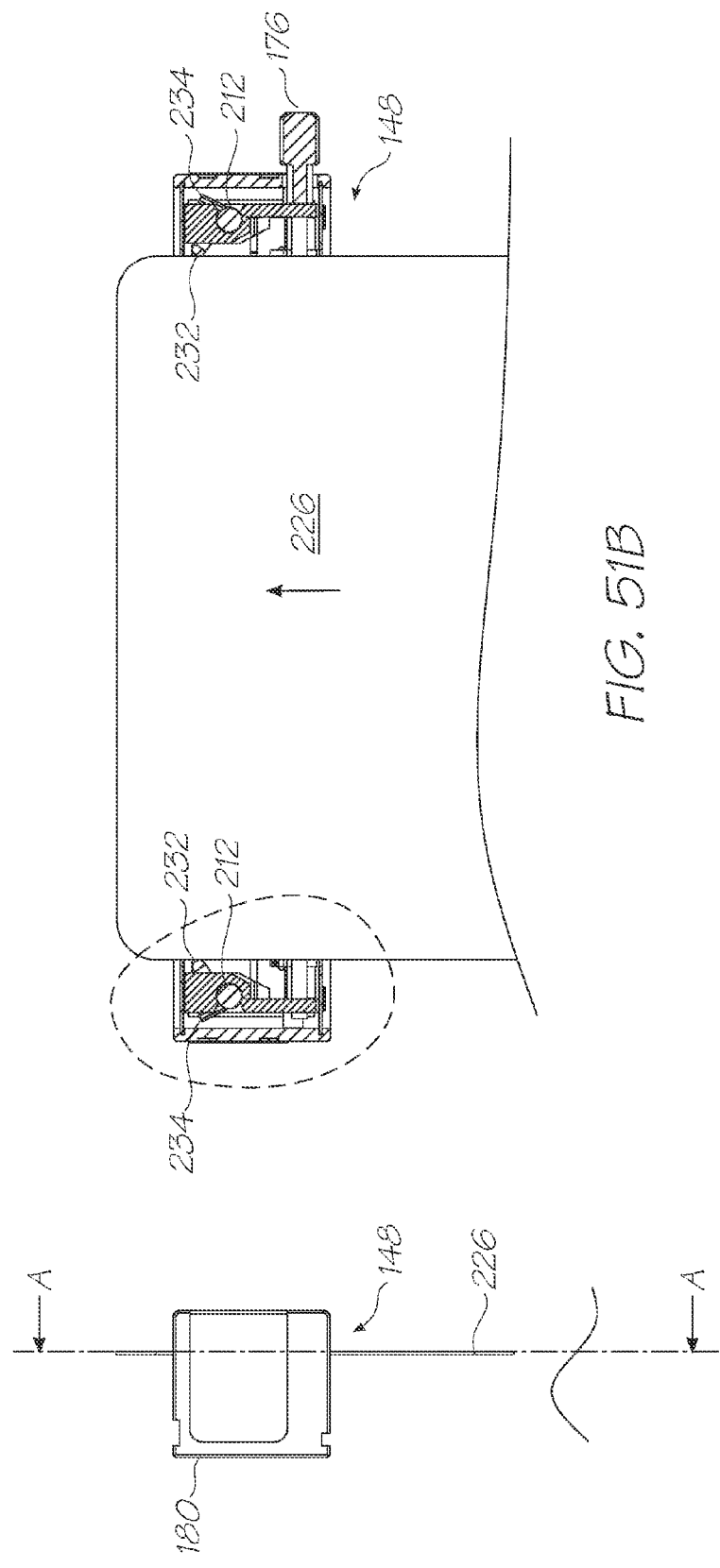
FIG. 51A is an end view of the print cartridge with a card partially along the feed path.
FIG. 51B is a longitudinal section of the print cartridge through A-A of FIG. 51A.
Figure 52:
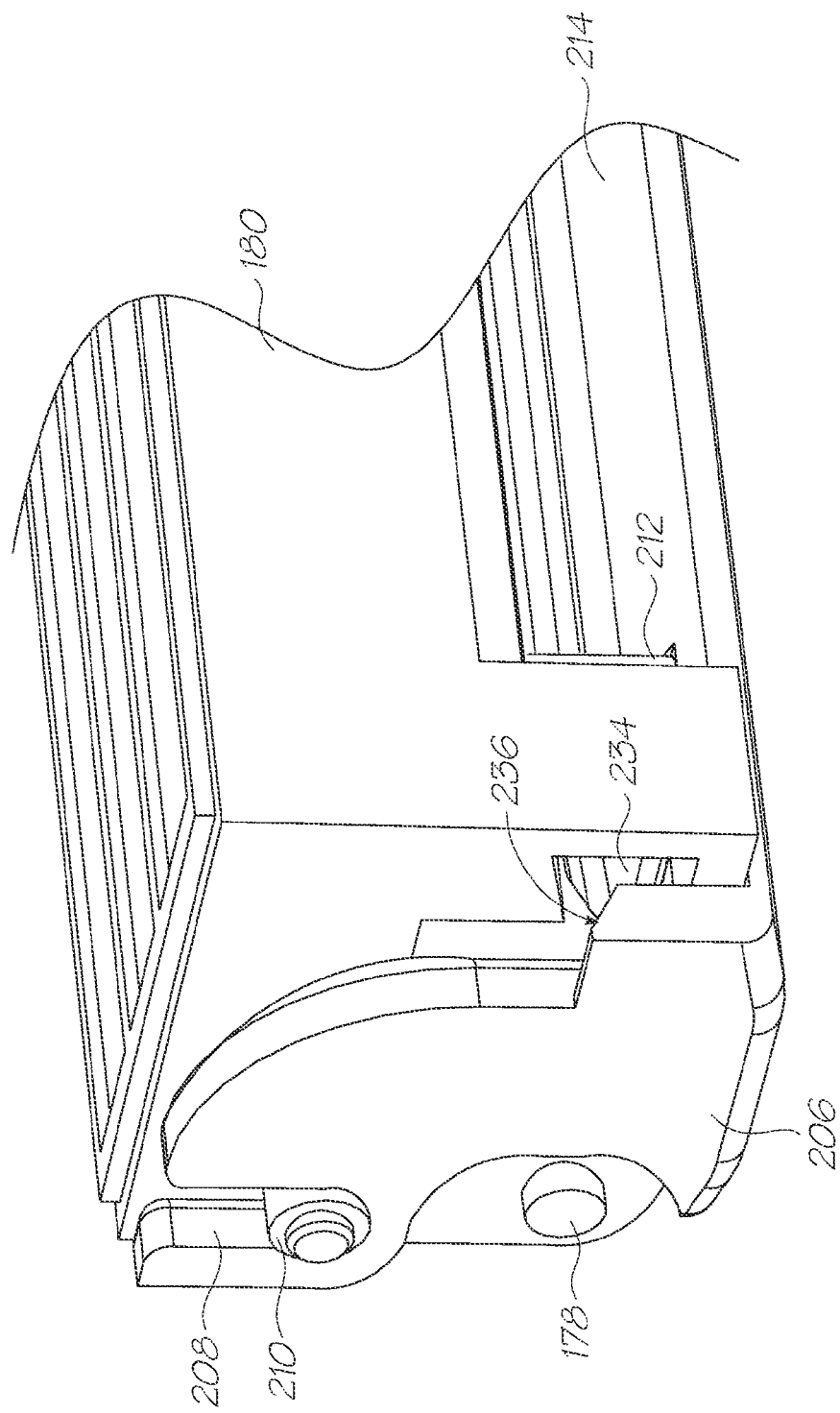
FIG. 52 is a partial enlarged perspective of one end the print cartridge with the capper in the capped position.
Figure 53:
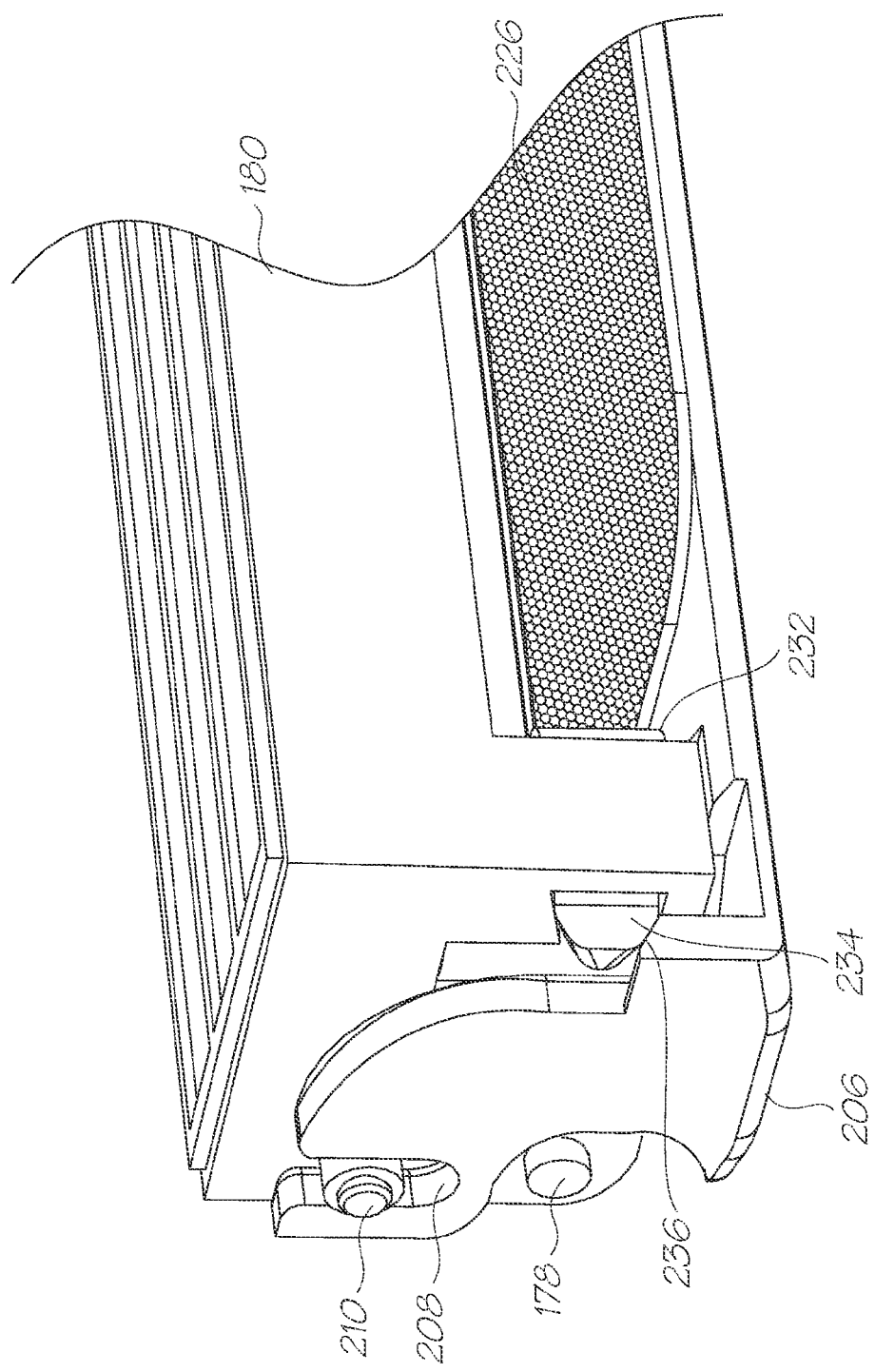
FIG. 53 is a partial enlarged perspective of one end the print cartridge with the capper in the uncapped position.

FIGS. 49 and 52 show the locking mechanisms 212 in their unlocked condition and the capper 206 in the capped position. The actuation arms 232 of each capper lock mechanism 212 protrude into the media path. The sides of the capper 206 prevent the actuation arms from rotating out of the media feed path. Referring to FIGS. 50, 51A, 51B and 53, the leading edge of the card 226 engages the arms 232 of the capper lock mechanisms 212 protruding into the media path from either side. When the leading edge has reached the actuation arms 232, the card 226 has already pushed the capper 206 to the uncapped position so the locking mechanisms 212 are now free to rotate. As the card pushes past the arms 232, the lock mechanisms 212 rotate such that their respective chamfered latch surfaces 234 slidingly engage the angled lock engagement face 238 on either side of the capper 206. The sliding engagement of between these faces pushes the capper 206 clear of the card 226 so that it no longer touches the elastomeric seals 240. This reduces the drag retarding the media feed. The sides of the card 226 sliding against the actuation arms 232 prevent the locking mechanisms 212 from rotating so the capper 206 is locked in the uncapped position by the latch surfaces 234 pressing against the lock engagement face 238.

When the printed card 226 is retrieved by the user (described in more detail below), the actuation arms 232 are released and free to rotate. The capper leaf springs 238 return the capper 206 to the capped position, and in so doing, the latch surfaces 234 slide over the lock engagement faces 236 so that the actuation arms 232 rotate back out into the media feed path.

Alternative capping mechanisms are possible and a selection of these have been described in detail in the Applicant's co-pending application temporarily identified by Ser. No. 11/124,167 until its serial number is assigned. In the interests of brevity, the disclosure of Ser. No. 11/124,167 has been incorporated herein by cross reference (see list of cross referenced documents above).

Print Media and Printing

A Netpage printer normally prints the tags which make up the surface coding on demand, i.e. at the same time as it prints graphic page content. As an alternative, in a Netpage printer not capable of printing tags such as the preferred embodiment, pre-tagged but otherwise blank Netpages can be used. The printer, instead of being capable of tag printing, typically incorporates a Netpage tag sensor. The printer senses the tags and hence the region ID of a blank either prior to, during, or after the printing of the graphic page content onto the blank. It communicates the region ID to the Netpage server, and the server associates the page content and the region ID in the usual way.

A particular Netpage surface coding scheme allocates a minimum number of bits to the representation of spatial coordinates within a surface region. If a particular media size is significantly smaller than the maximum size representable in the minimum number of bits, then the Netpage code space may be inefficiently utilised. It can therefore be of interest to allocate different sub-areas of a region to a collection of blanks. Although this makes the associations maintained by the Netpage server more complex, and makes subsequent routing of interactions more complex, it leads to more efficient code space utilisation. In the limit case the surface coding may utilise a single region with a single coordinate space, i.e. without explicit region IDs.

If regions are sub-divided in this way, then the Netpage printer uses the tag sensor to determine not only the region ID but also the surface coding location of a known physical position on the print medium, i.e. relative to two edges of the medium. From the surface coding location and its corresponding physical position on the medium, and the known (or determined) size of the medium, it then determines the spatial extent of the medium in the region's coordinate space, and communicates both the region ID and the spatial extent to the server. The server associates the page content with the specified sub-area of the region.

A number of mechanisms can be used to read tag data from a blank. A conventional Netpage tag sensor incorporating a two-dimensional image sensor can be used to capture an image of the tagged surface of the blank at any convenient point in the printer's paper path. As an alternative, a linear image sensor can be used to capture successive line images of the tagged surface of the blank during transport. The line images can be used to create a two-dimensional image which is processed in the usual way. As a further alternative, region ID data and other salient data can be encoded linearly on the blank, and a simple photodetector and ADC can be used to acquire samples of the linear encoding during transport.

One important advantage of using a two-dimensional image sensor is that tag sensing can occur before motorised transport of the print medium commences. I.e. if the print medium is manually inserted by the user, then tag sensing can occur during insertion. This has the further advantage that if the tag data is validated by the device, then the print medium can be rejected and possibly ejected before printing commences. For example, the print medium may have been pre-printed with advertising or other graphic content on the reverse side from the intended printing side. The device can use the tag data to detect incorrect media insertion, i.e. upside-down or back-to-front. The device can also prevent accidental overprinting of an already-printed medium. And it can detect the attempted use of an invalid print medium and refuse printing, e.g. to protect print quality. The device can also derive print medium characteristics from the tag data, to allow it to perform optimal print preparation.

If a linear image sensor is used, or if a photodetector is used, then image sensing must occur during motorised transport of the print medium to ensure accurate imaging. Unless there are at least two points of contact between the transport mechanism and the print medium in the printing path, separated by a minimum distance equal to the tag data acquisition distance, tag data cannot be extracted before printing commences, and the validation advantages discussed above do not obtain. In the case of a linear image sensor, the tag data acquisition distance equals the diameter of the normal tag imaging field of view. In the case of a photodetector, the tag data acquisition distance is as long as the required linear encoding.

If the tag sensor is operable during the entire printing phase at a sufficiently high sampling rate, then it can also be used to perform accurate motion sensing, with the motion data being used to provide a line synchronisation signal to the print engine. This can be used to eliminate the effects of jitter in the transport mechanism.

FIGS. 54 to 60 show one embodiment of the encoded medium and the media sensing and printing system within the mobile telecommunications device. While the encoding of the cards is briefly discussed here, it is described in detail in the Coded Media sub-section of this specification. Likewise, the optical sensing of the encoded data is described elsewhere in the specification and a comprehensive understanding of the M-Print media and printing system requires the specification to be read in its entirety.

Figure 54:
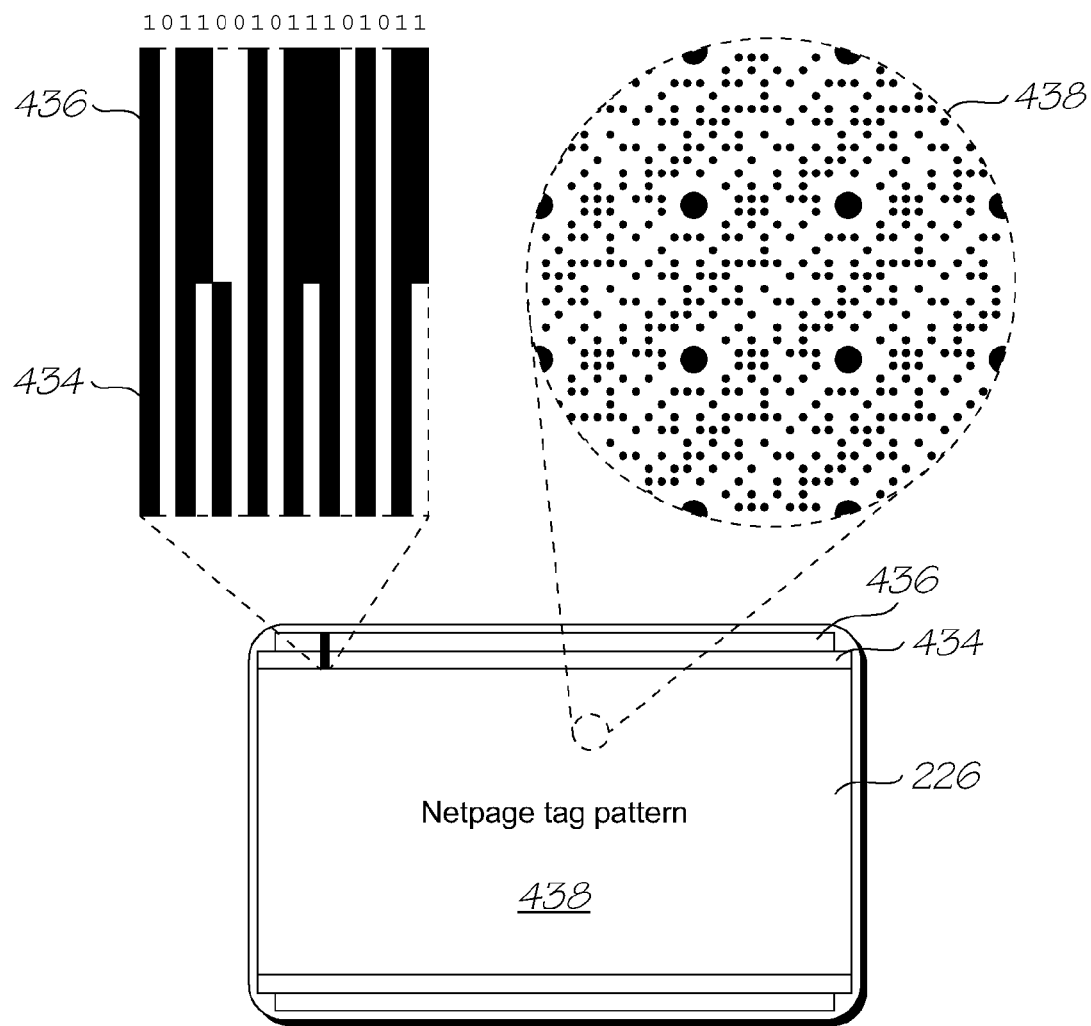
FIG. 54 shows the media coding on the 'back-side' of the card with separate clock and data tracks.

Referring to FIG. 54, the 'back-side' of one of the cards 226 is shown. The back-side of the card has two coded data tracks: a 'clock track' 434 and a 'data track' 436 running along the longitudinal sides of the cards. The cards are encoded with data indicating, inter alia:
   the orientation of the card;
   the media type and authenticity;
   the longitudinal size;
   the pre-printed side;
   detection of prior printing on the card; and,
   the position of the card relative to the printhead IC.

Ideally, the encoded data is printed in IR ink so that it is invisible and does not encroach on the space available for printing visible images.

In a basic form, the M-Print cards 226 are only encoded with a data track and clocking (as a separate clock track or a self-clocking data track). However, in the more sophisticated embodiment shown in the figures, the cards 226 have a pre-printed Netpage tag pattern 438 covering the majority of the back-side. The front side may also have a pre-printed tag pattern. In these embodiments, it is preferable that the data track encodes first information that is at least indicative of second information encoded in the tags. Most preferably, the first information is simply the document identity that is encoded in each of the tags.

The clock track 434 allows the MoPEC 326 (see FIG. 55) to determine, by its presence, that the front of the card 226 is facing the printhead 202, and allows the printer to sense the motion of the card 226 during printing. The clock track 434 also provides a clock for the densely coded data track 436.

The data track 436 provides the Netpage identifier and optionally associated digital signatures (as described elsewhere in the specification) which allows MoPEC 326 to reject fraudulent or un-authorised media 226, and to report the Netpage identifier of the front-side Netpage tag pattern to a Netpage server.

Figure 55:
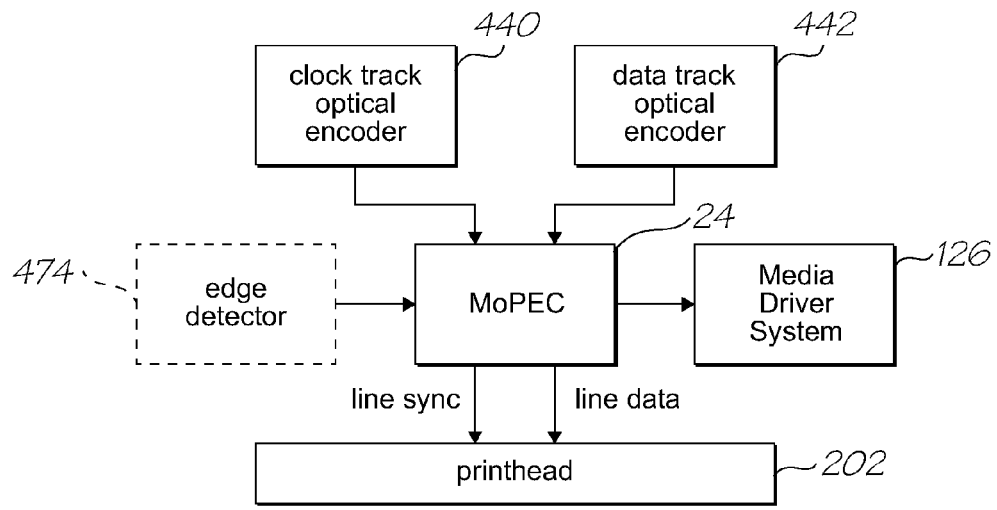
FIG. 55 is a block diagram of an M-Print system that uses media with separate clock and data tracks.

FIG. 55 shows a block diagram of an M-Print system that uses media encoded with separate clock and data tracks. The clock and data tracks are read by separate optical encoders. The system may optionally have an explicit edge detector 474 which is discussed in more detail below in relation to FIG. 58.

Figure 56:
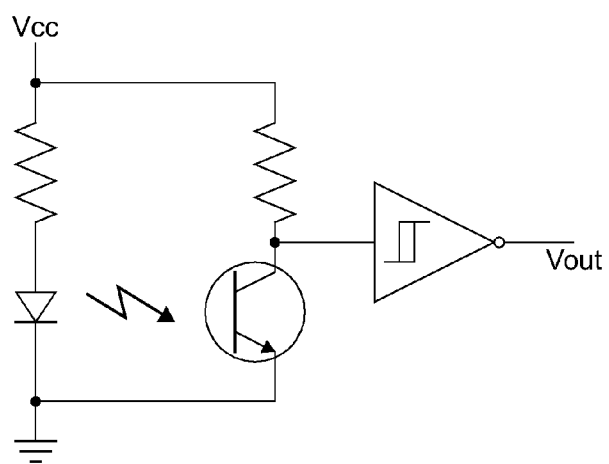
FIG. 56 is a simplified circuit diagram for an optical encoder.

FIG. 56 shows a simplified circuit for an optical encoder which may be used as the clock track or data track optical encoder. It incorporates a Schmitt trigger 466 to provide the MoPEC 326 with an essentially binary signal representative of the marks and spaces encountered by the encoder in the clock or data track. An IR LED 472 is configured to illuminate a mark-sized area of the card 226 and a phototransistor 468 is configured to capture the light 470 reflected by the card. The LED 472 has a peak wavelength matched to the peak absorption wavelength of the infrared ink used to print the media coding.

As an alternative, the optical encoders can sense the direction of media movement by configuring them to be 'quadrature encoders'. A quadrature encoder contains a pair of optical encoders spatially positioned to read the clock track 90 degrees out of phase. Its in-phase and quadrature outputs allow the MoPEC 326 to identify not just the motion of the clock track 434 but also the direction of the motion. A quadrature encoder is generally not required, since the media transport direction is known a priori because the printer controller also controls the transport motor. However, the use of a quadrature encoder can help decouple a bi-directional motion sensing mechanism from the motion control mechanism.

Figure 57:
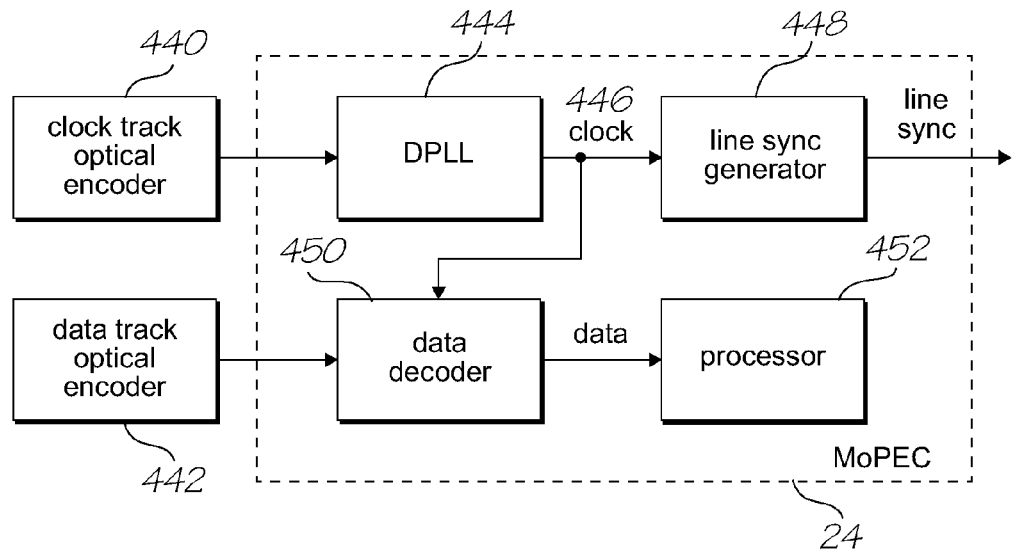
FIG. 57 is a block diagram of the MoPEC with the clock and data inputs.

FIG. 57 shows a block diagram of the MoPEC 326. It incorporates a digital phase lock loop (DPLL) 444 to track the clock inherent in the clock track 434 (see FIG. 54), a line sync generator 448 to generate the line sync signal 476 from the clock 446, and a data decoder 450 to decode the data in the data track 436. De-framing, error detection and error correction may be performed by software running on MoPEC's general-purpose processor 452, or it may be performed by dedicated hardware in MoPEC.

The data decoder 450 uses the clock 446 recovered by the DPLL 444 to sample the signal from the data track optical encoder 442. It may either sample the continuous signal from the data track optical encoder 442, or it may actually trigger the LED of the data track optical encoder 442 for the duration of the sample period, thereby reducing the total power consumption of the LED.

The DPLL 444 may be a PLL, or it may simply measure and filter the period between successive clock pulses.

The line sync generator 456 consists of a numerically-controlled oscillator which generates line sync pulses 476 at a rate which is a multiple of the rate of the clock 446 recovered from the clock track 434.

Figure 58:
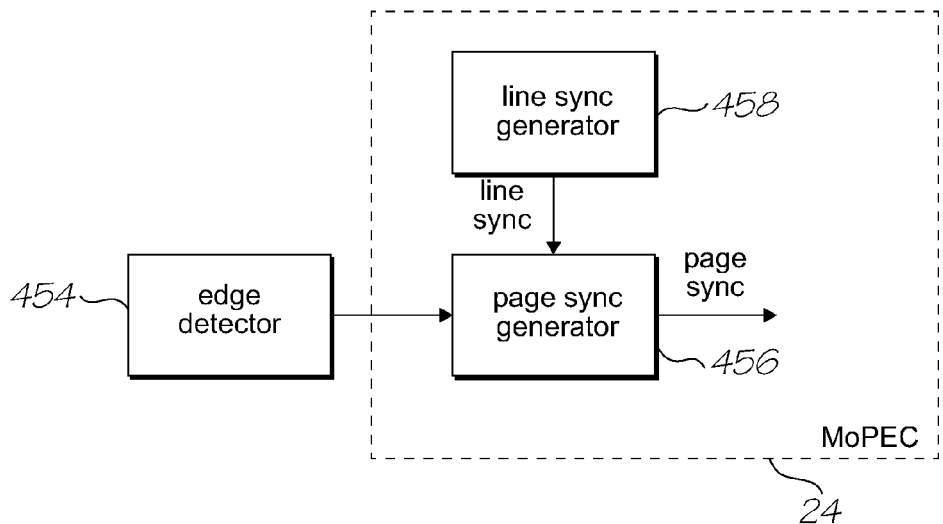
FIG. 58 is a block diagram of the optional edge detector and page sync generator for the M-Print system of FIG. 55.

As shown in FIG. 55, the print engine may optionally incorporate an explicit edge detector 474 to provide longitudinal registration of the card 226 with the operation of the printhead 202. In this case, as shown in FIG. 58, it generates a page sync signal 478 to signal the start of printing after counting a fixed number of line syncs 476 after edge detection. Longitudinal registration may also be achieved by other card-in detection mechanisms ranging from opto-sensors, decapping mechanical switches, drive shaft/tension spring contact switch and motor load detection.

Figure 59:
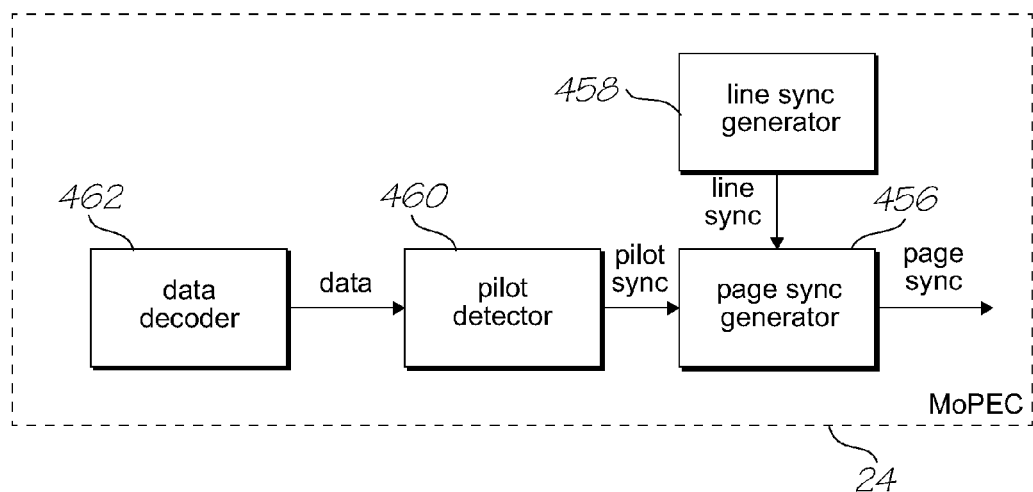
FIG. 59 is a block diagram of a MoPEC that uses media with a pilot sequence in the data track to generate a page sync signal.
Figure 60:
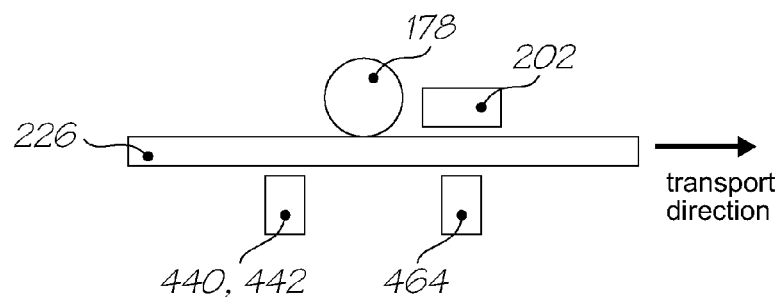
FIG. 60 is a schematic representation of the position of the encoders along media feed path.
Figure 61:
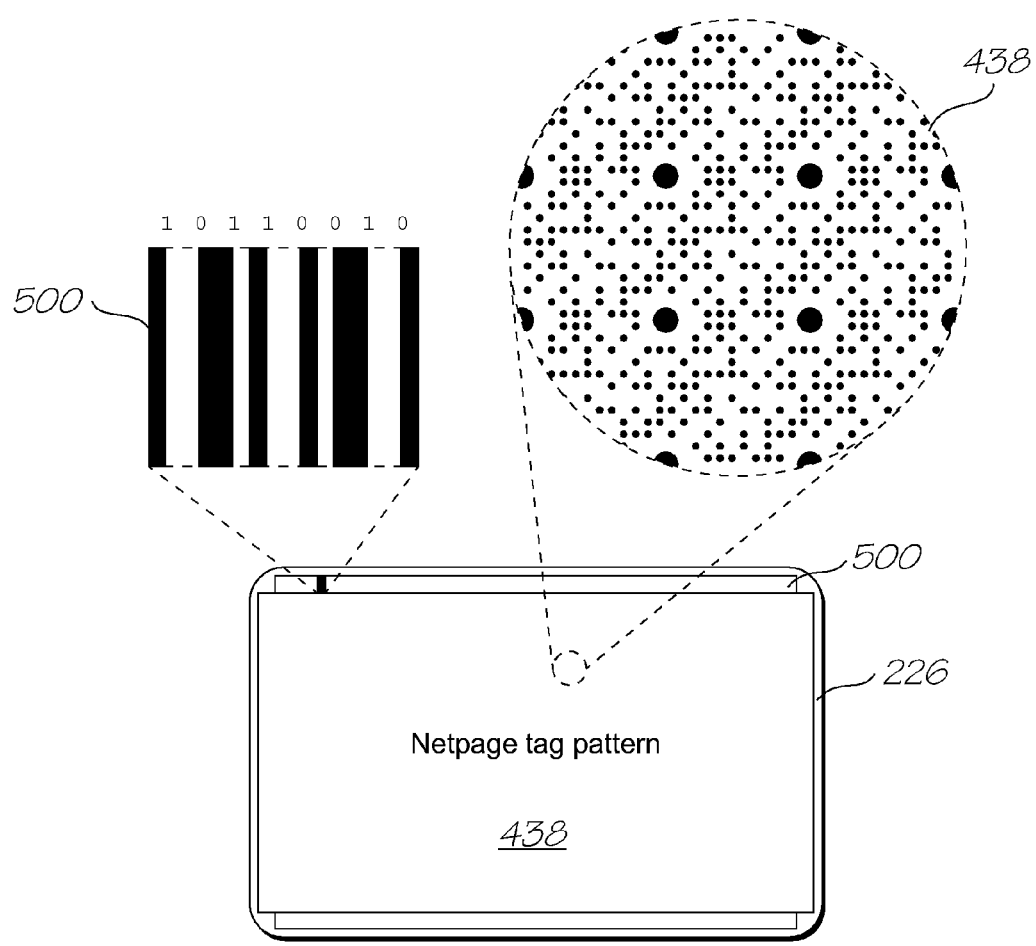
FIG. 61 shows the 'back-side' of a card with a self clocking data track.

Optionally, the printer can rely on the media coding itself to obtain longitudinal registration. For example, it may rely on acquisition of a pilot sequence on the data track 436 to obtain registration. In this case, as shown in FIG. 59, it generates a page sync signal 478 to signal the start of printing after counting a fixed number of line syncs 476 after pilot detection. The pilot detector 460 consists of a shift register and combinatorial logic to recognise the pilot sequence 480 provided by the data decoder 450, and generate the pilot sync signal 482. Relying on the media coding itself can provide superior information for registering printed content with the Netpage tag pattern 438 (see FIG. 54). As shown in FIG. 60, the data track optical encoder 442 is positioned adjacent to the first clock data encoder 440, so that the data track 436 (see FIG. 54) can be decoded as early as possible and using the recovered clock signal 446. The clock must be acquired before printing can commence, so a first optical encoder 440 is positioned before the printhead 202 in the media feed path. However, as the clock needs to be tracked throughout the print, a second clock optical encoder 464 is positioned coincident with or downstream of the printhead 202. This is described in more detail below.

FIG. 47 shows the printed card 226 being withdrawn from the print cartridge 148. It will be appreciated that the printed card 226 needs to be manually withdrawn by the user. Once the trailing edge of the card 226 has passed between the drive shaft 178 and the spring fingers 238, it is no longer driven along the media feed path. However, as the printhead 202 is less than 2 mm from the drive shaft 178, the momentum of the card 226 projects the trailing edge of past the printhead 202.

While the momentum of the card is sufficient to carry the trailing edge past the printhead, it is not enough to fling it out of the exit slot 150 (FIG. 14). Instead, the card 226 is lightly gripped by the opposed lock actuator arms 232 as it protrudes from the exit slot 150 in the side of the mobile phone 100. This retains the card 226 so it does not simply fall from exit slot 150, but rather allows users to manually remove the printed card 226 from the mobile phone 100 at their convenience. This is important to the practicality of the mobile telecommunications device because the card 226 is fed into one side of the mobile telecommunications device and retrieved from the other, so users will typically want to swap the hand that holds the mobile telecommunications device when collecting the printed card. By lightly retaining the printed card, users do not need to swap hands and be ready to collect the card before completion of the print job (approximately 1-2 secs).

Alternatively, the velocity of the card as it leaves the roller can be made high enough that the card exits the outlet slot 123 under its own inertia.

Dual Clock Sensor Synchronization

For full bleed printing, the decoder needs to generate a line sync signal for the entire longitudinal length of the card. Unless the card has a detachable strip (described elsewhere in the specification), the print engine will need two clock track sensors; one either side of printhead. Initially the line sync signal is generated from the clock signal from the pre-printhead sensor and then, before the trailing edge of the card passes the pre-printhead sensor, the line sync signal needs to be generated by the post-printhead sensor. In order to switch from the first clock signal to the second, the second needs to be synchronized with the first to avoid any discontinuity in the line sync signal (which cause artefacts in the print).

Figure 62:
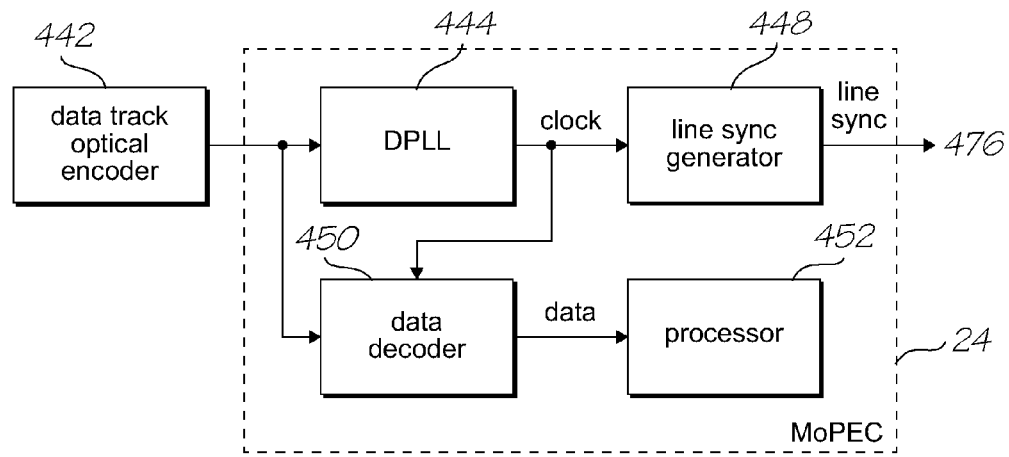
FIG. 62 is a block diagram of the decoder for a self clocking data track.
Figure 63:
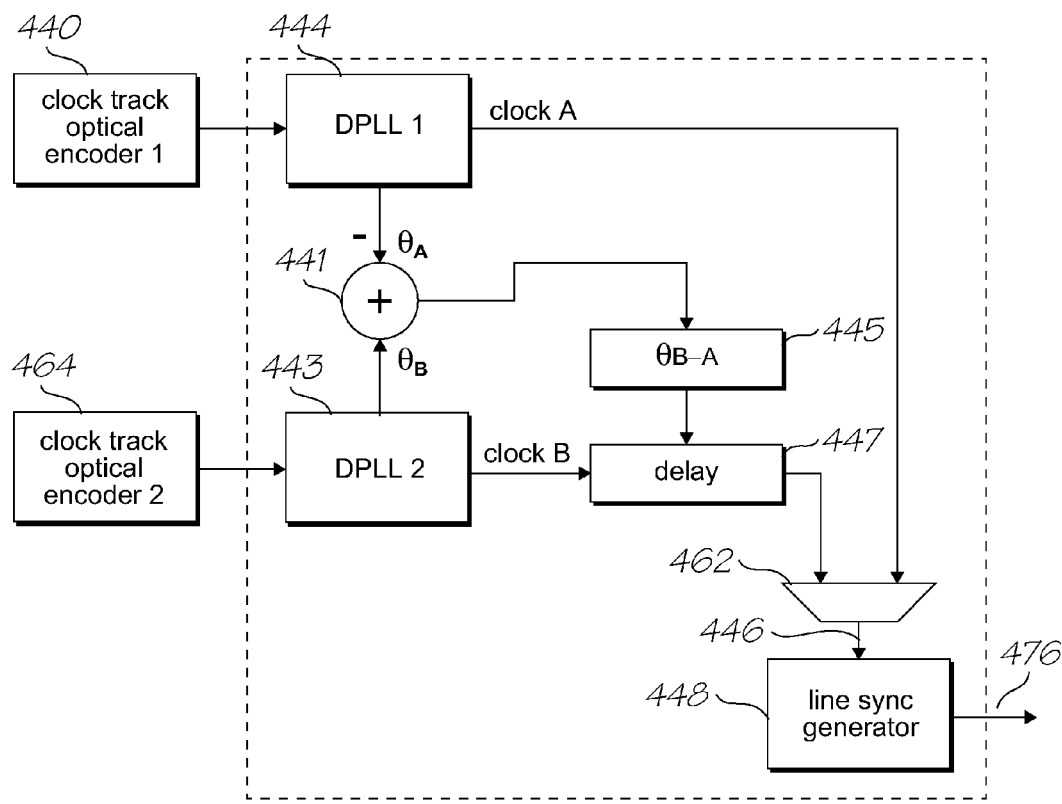
FIG. 63 is a block diagram of the phase lock loop synchronization of the dual clock track sensors.

Referring to FIG. 62, a pair of DPLL's 443 and 444 track the clock inherent in the clock track, via respective first and second clock track optical encoders 440 and 464. During the initial phase of the print only the first encoder 440 will be seeing the clock track and only the first PLL 443 will be locked. The card is printed as it passes the printhead and then the second clock track optical encoder 464 sees the clock track. At this stage, both encoders will be seeing the clock track and both DPLL's will be locked. During the final phase of the print only the second encoder will be seeing the clock track and only the second DPLL 443 will be locked.

During the initial phase the output from the first DPLL 440 must be used to generate the line sync signal 476, but before the end of the middle phase the decoder must start using the output from the second DPLL 444 to generate the line sync signal 476. Since it is not generally practical to space the encoders an integer number of clock periods apart, the output from the second DPLL 444 must be phase-aligned with the output of the first DPLL 443 before the transition occurs.

For the purposes of managing the transition, there are four clock tracking phases of interest. During the first phase, when only the first DPLL 443 is locked, the clock from the first DPLL 443 is selected via a multiplexer 462 and fed to the line sync generator 448. During the second phase, which starts when the second DPLL 444 locks, the phase difference between the two DPLLs is computed 441 and latched into a phase difference register 445. During the third phase, which starts a fixed time after the start of the second phase, the signal from the second DPLL 444, is fed through a delay 447 set by the latched phase difference in the latch register 445. During the fourth phase, which starts a fixed time after the start of the third phase, the delayed clock from the second DPLL 447 is selected via the multiplexer 462 and fed to the line sync generator 448.

Figure 64:
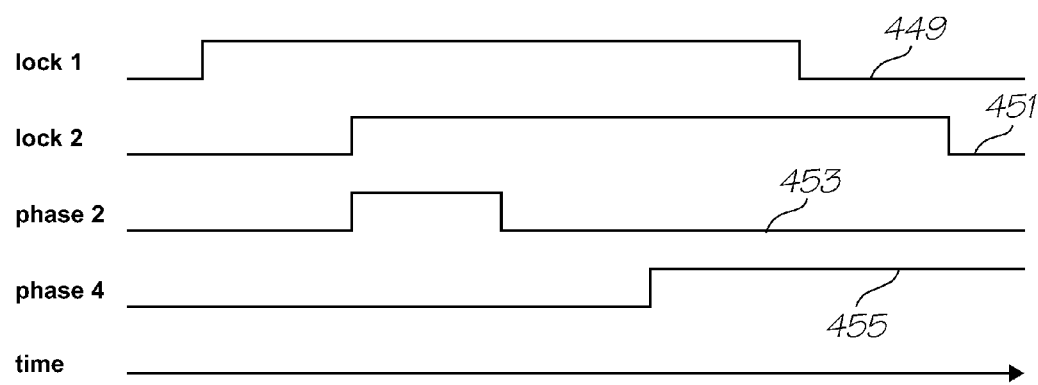
FIG. 64 shows the dual phase lock loop signals at different phases of the media feed.

FIG. 64 shows the signals which control the clock tracking phases. The lock signals 449 and 451 are generated using lock detection circuits in the DPLL's 443 and 444. Alternatively, PLL lock is assumed according to approximate knowledge of the position of the card relative to the two encoders 440 and 464. The two phase control signals 453 and 455 are triggered by the lock signals 449 and 451 and controlled by timers.

Note that in practice, rather than explicitly delaying the second PLL's clock, the delayed clock can be generated directly by a digital oscillator which takes into account the phase difference. Projecting the card 226 past the printhead 202 by momentum, permits a compact single drive shaft design. However, the deceleration of the card 226 once it disengages from the drive shaft 178 makes the generation of an accurate line sync signal 476 for the trailing edge much more difficult. If the compactness of the device is not overly critical, a second drive shaft after the printhead can keep the speed of the card constant until printing is complete. A drive system of this type is described in detail in the Applicant's co-pending application temporarily identified by Ser. No.

11/124,167 until its serial number is assigned. In the interests of brevity, the disclosure of Ser. No. 11/124,167 has been incorporated herein by cross reference (see list of cross referenced documents above).

Media Coding

The card 226 shown in FIG. 54 has coded data in the form of the clock track 434, the data track 436 and the Netpag tag pattern 438. This coded data can serve a variety of functions and these are described below. However, the functions listed below are not exhaustive and the coded media (together with the appropriate mobile telecommunications device) can implement many other functions as well. Similarly, it is not necessary for all of these features to be incorporated into the coded data on the media. Any one or more can be combined to suit the application or applications for which a particular print medium and/or system is designed.

Side

The card can be coded to allow the printer to determine, prior to commencing printing, which side of the card is facing the printhead, i.e. the front or the back. This allows the printer to reject the card if it is inserted back-to-front, in case the card has been pre-printed with graphics on the back (e.g. advertising), or in case the front and the back have different surface treatments (e.g. to protect the graphics pre-printed on the back and/or to facilitate high-quality printing on the front). It also allows the printer to print side-dependent content (e.g. a photo on the front and corresponding photo details on the back).

Orientation

The card can be coded to allow the printer to determine, prior to commencing printing, the orientation of the card in relation to the printhead. This allows the printhead to print graphics rotated to match the rotation of pre-printed graphics on the back. It also allows the printer to reject the card if it is inserted with the incorrect orientation (with respect to pre-printed graphics on the back). Orientation can be determined by detecting an explicit orientation indicator, or by using the known orientation of information printed for another purpose, such as Netpage tags or even pre-printed user information or advertising.

Media Type/Size

The card can be coded to allow the printer to determine, prior to commencing printing, the type of the card. This allows the printer to prepare print data or select a print mode specific to the media type, for example, color conversion using a color profile specific to the media type, or droplet size modulation according to the expected absorbance of the card. The card can be coded to allow the printer to determine, prior to commencing printing, the longitudinal size of the card. This allows the printer to print graphics formatted for the size of the card, for example, a panoramic crop of a photo to match a panoramic card.

Prior Printing

The card can be coded to allow the printer to determine, prior to commencing printing, if the side of the card facing the printhead is pre-printed. The printer can then reject the card, prior to commencing printing, if it is inserted with the pre-printed side facing the printhead. This prevents over-printing. It also allows the printer to prepare, prior to commencing printing, content which fits into a known blank area on an otherwise pre-printed side (for example, photo details on the back of a photo, printed onto a card with pre-printed advertising on the back, but with a blank area for the photo details).

The card can be coded to allow the printer to detect, prior to commencing printing, whether the side facing the printhead has already been printed on demand (as opposed to pre-printed). This allows the printer to reject the card, prior to commencing printing, if the side facing the printhead has already been printed on demand, rather than overprinting the already-printed graphics.

The card can be coded to allow the printer to determine, ideally prior to commencing printing, if it is an authorised card. This allows the printer to reject, ideally prior to commencing printing, an un-authorised card, as the quality of the card will then be unknown, and the quality of the print cannot be guaranteed.

Position

The card can be coded to allow the printer to determine, prior to commencing printing, the absolute longitudinal position of the card in relation to the printhead. This allows the printer to print graphics in registration with the card. This can also be achieved by other means, such as by directly detecting the leading edge of the card.

The card can be coded to allow the printer to determine, prior to commencing printing, the absolute lateral position of the card in relation to the printhead. This allows the printer to print graphics in registration with the card. This can also be achieved by other means, such as by providing a snug paper path, and/or by detecting the side edge(s) of the card.

The card can be coded to allow the printer to track, during printing, the longitudinal position of the card in relation to the printhead, or the longitudinal speed of the card in relation to the printhead. This allows the printer to print graphics in registration with the card. This can also be achieved by other means, such as by coding and tracking a moving part in the transport mechanism.

The card can be coded to allow the printer to track, during printing, the lateral position of the card in relation to the printhead, or the lateral speed of the card in relation to the printhead. This allows the printer to print graphics in registration with the card. This can also be achieved by other means, such as by providing a snug paper path, and/or by detecting the side edge(s) of the card.

Invisibility

The coding can be disposed on or in the card so as to render it substantially invisible to an unaided human eye. This prevents the coding from detracting from printed graphics.

Fault Tolerance

The coding can be sufficiently fault-tolerant to allow the printer to acquire and decode the coding in the presence of an expected amount of surface contamination or damage. This prevents an expected amount of surface contamination or damage from causing the printer to reject the card or from causing the printer to produce a sub-standard print.

In light of the broad ranging functionality that a suitable M-Print printer with compatible cards can provide, several design alternatives for the printer, the cards and the coding are described in detail in the Applicant's co-pending application Ser. No. 11/124,167. In the interests of brevity, the disclosure of Ser. No. 11/124,167 has been incorporated herein by cross reference (see list of cross referenced documents above).

Linear Encoding

Kip is the assignee's internal name for a template for a class of robust one-dimensional optical encoding schemes for storing small quantities of digital data on physical surfaces. It optionally incorporates error correction to cope with real-world surface degradation.

A particular encoding scheme is defined by specializing the Kip template described below. Parameters include the data capacity, the clocking scheme, the physical scale, and the level of redundancy. A Kip reader is typically also specialized for a particular encoding scheme.

A Kip encoding is designed to be read via a simple optical detector during transport of the encoded medium past the detector. The encoding therefore typically runs parallel to the transport direction of the medium. For example, a Kip encoding may be read from a print medium during printing. In the preferred embodiment, Kip encoded data is provided along at least one (and preferably two or more) of the longitudinal edges of the print media to be printed in a mobile device, as described above. In the preferred form, the Kip encoded data is printed in infrared ink, rendering it invisible or at least difficult to see with the unaided eye.

A Kip encoding is typically printed onto a surface, but may be disposed on or in a surface by other means.

Summary of Kip Parameters

The following tables summarize the parameters required to specialize Kip. The parameters should be understood in the context of the entire document.

The following table summarizes framing parameters:

| parameter | units | description |
| --- | --- | --- |
| $L_{data}$ | bits | Length of bitstream data. |

The following table summarizes clocking parameters:

| parameter | units | description |
| --- | --- | --- |
| $b_{clock}$ | {0, 1} | Flag indicating whether the clock is implicit (0) or explicit (1). |
| $C_{clocksync}$ | clock periods | Length of clock synchronization interval required before data. |

The following table summarizes physical parameters:

| Parameter | Units | Description |
| --- | --- | --- |
| $l_{clock}$ | mm | Length of clock period. |
| $l_{mark}$ | mm | Length of mark. |
| $l_{preamble}$ | mm | Length of preamble. Equals or exceeds decoder's uncertainty in longitudinal position of strip. |
| $w_{mintrack}$ | mm | Minimum width of track. |
| $w_{misreg}$ | mm | Maximum lateral misregistration of strip with respect to reader. |
| $\alpha$ | radians | Maximum rotation of strip with respect to reader. |

The following table summarizes error correction parameters:

| Parameter | Units | Description |
| --- | --- | --- |
| m | bits | Size of Reed-Solomon symbol. |
| k | symbols | Size of Reed-Solomon codeword data. |
| t | symbols | Error-correcting capacity of Reed-Solomon code. |

KIP Encoding

Figure 65:
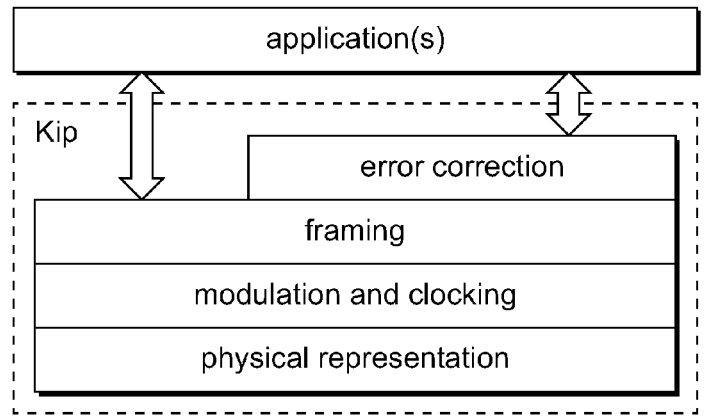
FIG. 65 is a block diagram of the Kip encoding layers.

A Kip encoding encodes a single bitstream of data, and includes a number of discrete and independent layers, as illustrated in FIG. 65. The framing layer frames the bitstream to allow synchronization and simple error detection. The modulation and clocking layer encodes the bits of the frame along with clocking information to allow bit recovery. The physical layer represents the modulated and clocked frame using optically-readable marks.

An optional error correction layer encodes the bitstream to allow error correction. An application can choose to use the error correction layer or implement its own.

A Kip encoding is designed to allow serial decoding and hence has an implied time dimension. By convention in this document the time axis points to the right. However, a particular Kip encoding may be physically represented at any orientation that suits the application.

Framing

Figure 66:
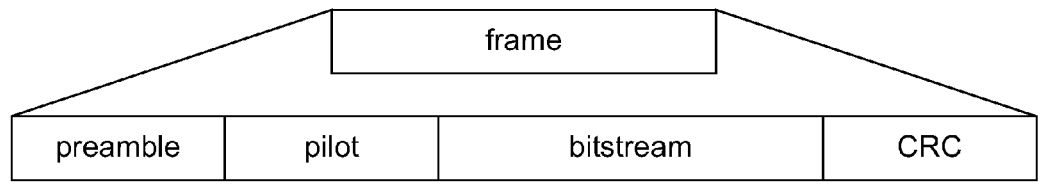
FIG. 66 is a schematic representation of the Kip frame structure.

A Kip frame consists of a preamble, a pilot, the bitstream data itself, and a cyclic redundancy check (CRC) word, as illustrated in FIG. 66.

The preamble consists of a sequence of zeros of length $L_{preamle}$. The preamble is long enough to allow the application to start the Kip decoder somewhere within the preamble, i.e. it is long enough for the application to know a priori the location of at least part of the preamble. The length of the preamble sequence in bits is therefore derived from an application-specific preamble length $l_{preamble}$ (see EQ8).

The pilot consists of a unique pattern that allows the decoder to synchronize with the frame. The pilot pattern is designed to maximize its binary Hamming distance from arbitrary shifts of itself prefixed by preamble bits. This allows the decoder to utilize a maximum-likelihood decoder to recognize the pilot, even in the presence of bit errors.

The preamble and pilot together guarantee that any bit sequence the decoder detects before it detects the pilot is maximally separated from the pilot.

The pilot sequence is 1110 1011 0110 0010. Its length $L_{Pilot}$ is 16. Its minimum distance from preamble-prefixed shifts of itself is 9. It can therefore be recognized reliably in the presence of up to 4 bit errors.

The length $L_{data}$ of the bitstream is known a priori by the application and is therefore a parameter. It is not encoded in the frame. The bitstream is encoded most-significant bit first, i.e. leftmost.

The CRC (cyclic redundancy code) is a CCITT CRC-16 (known to those skilled in the art, and so not described in detail here) calculated on the bitstream data, and allows the decoder to determine if the bitstream has been corrupted. The length $L_{CRC}$ of the CRC is 16. The CRC is calculated on the bitstream from left to right. The bitstream is padded with zero bits during calculation of the CRC to make its length an integer multiple of 8 bits. The padding is not encoded in the frame.

The length of a frame in bits is:

$$L_{frame}=L_{preamble}+L_{pilot}+L_{data}+L_{CRC} \quad \text{(EQ 1)}$$

$$L_{frame}=L_{preamble}+L_{data}+32 \quad \text{(EQ 2)}$$

Modulation and Clocking

The Kip encoding modulates the frame bit sequence to produce a sequence of abstract marks and spaces. These are realized physically by the physical layer.

Figure 67:
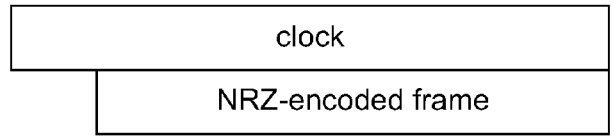
FIG. 67 is a schematic representation of an encoded frame with explicit clocking.
Figure 68:
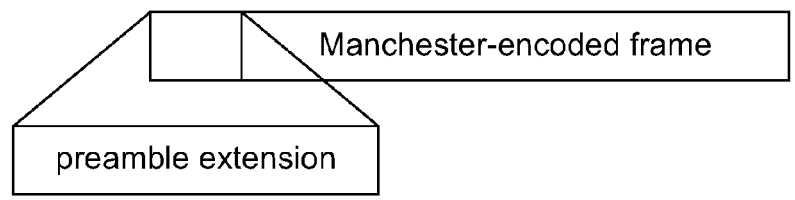
FIG. 68 is a schematic representation of an encoded frame with implicit clocking.

The Kip encoding supports both explicit and implicit clocking. When the frame is explicitly clocked, the encoding includes a separate clock sequence encoded in parallel with the frame, as illustrated in FIG. 67. The bits of the frame are then encoded using a conventional non-return-to-zero (NRZ) encoding. A zero bit is represented by a space, and a one bit is represented by a mark.

The clock itself consists of a sequence of alternating marks and spaces. The center of a clock mark is aligned with the center of a bit in the frame. The frame encodes two bits per clock period, i.e. the bitrate of the frame is twice the rate of the clock.

The clock starts a number of clock periods $C_{clocksync}$ before the start of the frame to allow the decoder to acquire clock synchronization before the start of the frame. The size of $C_{clocksync}$ depends on the characteristics of the PLL used by the decoder, and is therefore a reader-specific parameter.

When the encoding is explicitly clocked, the corresponding decoder incorporates an additional optical sensor to sense the clock.

When the frame is implicitly clocked, the bits of the frame are encoded using a Manchester phase encoding. A zero bit is represented by space-mark transition, and a one bit is represented by mark-space transition, with both transitions defined left-to-right. The Manchester phase encoding allows the decoder to extract the clock signal from the modulated frame.

In this case the preamble is extended by $C_{clocksync}$ bits to allow the decoder to acquire clock synchronization before searching for the pilot.

Assuming the same marking frequency, the bit density of the explicitly-clocked encoding is twice the bit density of the implicitly-clocked encoding.

The choice between explicit and implicit clocking depends on the application. Explicit clocking has the advantage that it provides greater longitudinal data density than implicit clocking. Implicit clocking has the advantage that it only requires a single optical sensor, while explicit clocking requires two optical sensors.

The parameter $b_{clock}$ indicates whether the clock is implicit ($b_{clock}=0$) or explicit ($b_{clock}=1$). The length, in clock periods, of the modulated and clocked Kip frame is:

$$C_{frame}=C_{clocksync}+L_{frame}/(1+b_{clock}) \quad \text{(EQ 3)}$$

Physical Representation

The Kip encoding represents the modulated and clocked frame physically as a strip that has both a longitudinal extent (i.e. in the coding direction) and a lateral extent.

A Kip strip always contains a data track. It also contains a clock track if it is explicitly clocked rather than implicitly clocked.

The clock period $l_{clock}$ within a Kip strip is nominally fixed, although a particular decoder will typically be able to cope with a certain amount of jitter and drift. Jitter and drift may also be introduced by the transport mechanism in a reader. The amount of jitter and drift supported by a decoder is decoder specific.

A suitable clock period depends on the characteristics of the medium and the marking mechanism, as well as on the characteristics of the reader. It is therefore an application-specific parameter.

Abstract marks and spaces have corresponding physical representations which give rise to distinct intensities when sampled by a matched optical sensor, allowing the decoder to distinguish marks and spaces. The spectral characteristics of the optical sensor, and hence the corresponding spectral characteristics of the physical marks and spaces, are application specific.

The transition time between a mark and a space is nominally zero, but is allowed to be up to 5% of the clock period.

An abstract mark is typically represented by a physical mark printed using an ink with particular absorption characteristics, such as an infrared-absorptive ink, and an abstract space is typically represented by the absence of such a physical mark, i.e. by the absorption characteristics of the substrate, such as broadband reflective (white) paper. However, Kip does not prescribe this.

The length $l_{mark}$ of a mark and length $l_{space}$ of a space are nominally the same. Suitable marks and spaces depend on the characteristics of the medium and the marking mechanism, as well as on the characteristics of the reader. Their lengths are therefore application-specific parameters.

Figure 69:
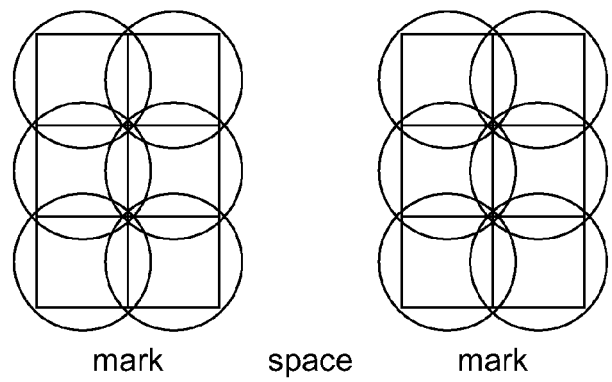
FIG. 69 shows Kip coding marks and spaces that are nominally two dots wide.

The length of a mark and the length of a space may differ by up to a factor of $((2+(\sqrt{2}-1))/(2-(\sqrt{2}-1)))$ to accommodate printing of marks at up to half the maximum dot resolution of a particular printer, as illustrated in FIG. 69. The factor may vary between unity and the limit according to vertical position, as illustrated in the figure.

The sum of the length of a mark and the length of a space equals the clock period:

$$l_{clock}=l_{mark}+l_{space} \quad \text{(EQ 4)}$$

The overall length of the strip is:

$$l_{strip}=l_{clock} \times C_{frame} \quad \text{(EQ 5)}$$

The minimum width $w_{minitrack}$ track of a data track (or clock track) within a strip depends on the reader. It is therefore an application-specific parameter.

The required width $w_{track}$ of a data track (or clock track) within a strip is determined by the maximum allowable lateral misregistration $w_{misreg}$ and maximum allowable rotation α of the strip with respect to the transport path past the corresponding optical sensor:

$$w_{track}=w_{minitrack}+w_{misreg}+l_{strip} \tan \alpha \quad \text{(EQ 6)}$$

The maximum lateral misregistration and rotation depend on the characteristics of the medium and the marking mechanism, as well as on the characteristics of the reader. They are therefore application-specific parameters.

The width of a strip is:

$$w_{strip}=(1+b_{clock}) \times w_{track} \quad \text{(EQ 7)}$$

The length of the preamble sequence in bits is derived from a parameter which specifies the length of the preamble:

$$L_{preamble} = \left\lceil \frac{l_{preamble}}{l_{clock}} \right\rceil \times (1 + b_{clock}) \quad \text{(EQ 8)}$$

Error Correction

Figure 70:
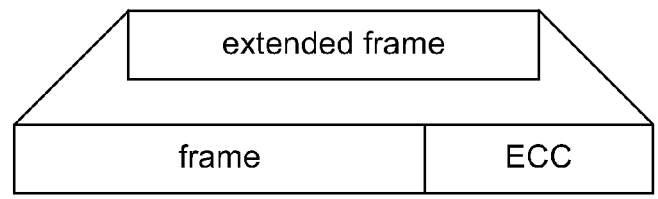
FIG. 70 is a schematic representation of the extended Kip frame structure.

The Kip encoding optionally includes error correcting coding (ECC) information to allow the decoder to correct bitstream data corrupted by surface damage or dirt. Reed-Solomon redundancy data is appended to the frame to produce an extended frame, as illustrated in FIG. 70.

A Kip Reed-Solomon code is characterized by its symbol size m (in bits), data size k (in symbols), and error-correcting capacity t (in symbols), as described below. A Reed-Solomon code is chosen according to the size $L_{data}$ of the bitstream data and the expected bit error rate. The parameters of the code are therefore application-specific.

Redundancy data is calculated on the concatenation of the bitstream data and the CRC. This allows the CRC to be corrected as well.

The bitstream data and the CRC are padded with zero bits during calculation of the redundancy data to make their length an integer multiple of the symbol size m. The padding is not encoded in the extended frame.

A decoder verifies the CRC before performing Reed-Solomon error correction. If the CRC is valid, then error correction may potentially be skipped. If the CRC is invalid, then the decoder performs error correction. It then verifies the CRC again to check that error correction succeeded.

The length of a Reed-Solomon codeword in bits is:

$$L_{codeword}=(2t+k) \times m \quad \text{(EQ 9)}$$

The number of Reed-Solomon codewords is:

$$s = \frac{(L_{data} + L_{CRC}) - 1}{L_{codeword}} + 1 \quad \text{(EQ 10)}$$

The length of the redundancy data is:

$$L_{ECC} = s \times (2t \times m) \quad \text{(EQ 11)}$$

The length of an extended frame in bits is:

$$L_{extendedframe} = L_{frame} + L_{ECC} \quad \text{(EQ 12)}$$

Reed-Solomon Coding

A $2^m$-ary Reed-Solomon code (n, k) is characterized by its symbol size m (in bits), codeword size (in symbols), and data size k (in symbols), where:

$$n = 2^m - 1 \quad \text{(EQ 13)}$$

The error-correcting capacity of the code is t symbols, where:

$$t = \left\lfloor \frac{n-k}{2} \right\rfloor \quad \text{(EQ 14)}$$

To minimize the redundancy overhead of a given error-correcting capacity, the number of redundancy symbols n−k is chosen to be even, i.e. so that:

$$2t = n - k \quad \text{(EQ 15)}$$

Reed-Solomon codes are well known and understood in the art of data storage, and so are not described in great detail here.

Figure 71:
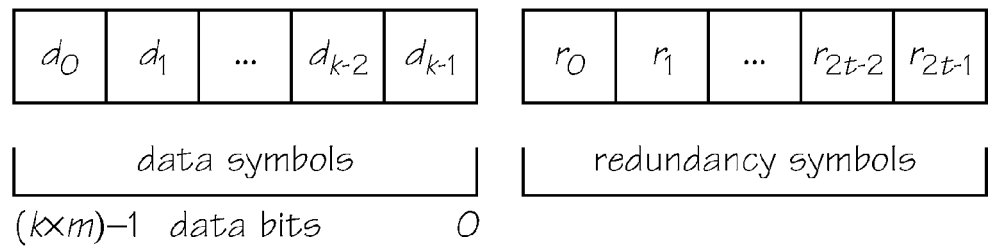
FIG. 71 shows the data symbols and the redundancy symbols of the Reed-Solomon codeword layout.

Data symbols $d_i$ and redundancy symbols $r_j$ of the code are indexed from left to right according to the power of their corresponding polynomial terms, as illustrated in FIG. 71. Note that data bits are indexed in the opposite direction, i.e. from right to left.

The data capacity of a given code may be reduced by puncturing the code, i.e. by systematically removing a subset of data symbols. Missing symbols can then be treated as erasures during decoding. In this case:

$$n = k + 2t \leq 2^m - 1 \quad \text{(EQ 16)}$$

Longer codes and codes with greater error-correcting capacities are computationally more expensive to decode than shorter codes or codes with smaller error-correcting capacities. Where application constraints limit the complexity of the code and the required data capacity exceeds the capacity of the chosen code, multiple codewords can be used to encode the data. To maximize the codewords' resilience to burst errors, the codewords are interleaved.

To maximize the utility of the Kip encoding, the bitstream is encoded contiguously and in order within the frame. To reconcile the requirement for interleaving and the requirement for contiguity and order, the bitstream is de-interleaved for the purpose of computing the Reed-Solomon redundancy data, and is then re-interleaved before being encoded in the frame. This maintains the order and contiguity of the bitstream, and produces a separate contiguous block of interleaved redundancy data which is placed at the end of the extended frame. The Kip interleaving scheme is defined in detail below.

Kip Reed-Solomon codes have the primitive polynomials given in the following table:

| Symbol size (m) | Primitive polynomial |
|---|---|
| 3 | 1011 |
| 4 | 10011 |
| 5 | 100101 |
| 6 | 1000011 |
| 7 | 10000011 |
| 8 | 101110001 |
| 9 | 1000010001 |
| 10 | 10000001001 |
| 11 | 100000000101 |
| 12 | 1000001010011 |
| 13 | 10000000011011 |
| 14 | 100000001010011 |

The entries in the table indicate the coefficients of the primitive polynomial with the highest-order coefficient on the left. Thus the primitive polynomial for m=4 is:

$$p(x) = x^4 + x + 1 \quad \text{(EQ 17)}$$

Kip Reed-Solomon codes have the following generator polynomials:

$$g(x) = (x + \alpha)(x + \alpha^2) \ldots (x + \alpha^{2t}) = \prod_{i=1}^{2t}(x + \alpha^i) \quad \text{(EQ 18)}$$

For the purposes of interleaving, the source data D is partitioned into a sequence of m-bit symbols and padded on the right with zero bits to yield a sequence of u symbols, consisting of an integer multiple s of k symbols, where s is the number of codewords:

$$u = s \times k \quad \text{(EQ 19)}$$

$$D = \{D_0, \ldots, D_{u-1}\} \quad \text{(EQ 20)}$$

Each symbol in this sequence is then mapped to a corresponding ($i^{th}$) symbol $d_{w,i}$ of an interleaved codeword W:

$$d_{w,i} = D_{(i \times s) + w} \quad \text{(EQ 21)}$$

Figure 72:
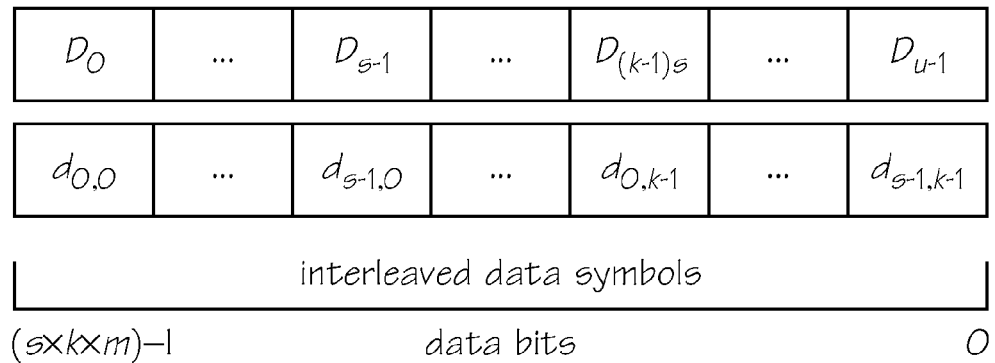
FIG. 72 shows the interleaving of the data symbols of the Reed-Solomon codewords.

The resultant interleaved data symbols are illustrated in FIG. 72. Note that this is an in situ mapping of the source data to codewords, not a re-arrangement of the source data.

Figure 73:
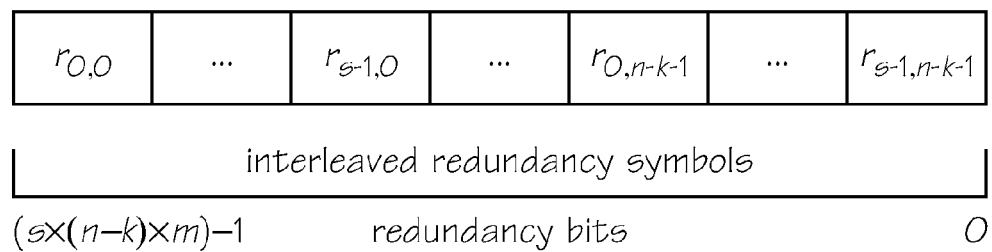
FIG. 73 shows the interleaving of the redundancy symbols of the Reed-Solomon codewords.

The symbols of each codeword are de-interleaved prior to encoding the codeword, and the resultant redundancy symbols are re-interleaved to form the redundancy block. The resultant interleaved redundancy symbols are illustrated in FIG. 73.

General Netpage Description

Netpage interactivity can be used to provide printed user interfaces to various phone functions and applications, such as enabling particular operational modes of the mobile telecommunications device or interacting with a calculator application, as well as providing general "keypad", "keyboard" and "tablet" input to the mobile telecommunications device. Such interfaces can be pre-printed and bundled with a phone, purchased separately (as a way of customizing phone operation, similar to ringtones and themes) or printed on demand where the phone incorporates a printer.

A printed Netpage business card provides a good example of how a variety of functions can be usefully combined in a single interface, including:

loading contact details into an address book
displaying a Web page
displaying an image
dialing a contact number bringing up an e-mail, SMS or MMS form
loading location info into a navigation system
activating a promotion or special offer Any of these functions can be made single-use only.

A business card may be printed by the mobile telecommunications device user for presentation to someone else, or may be printed from a Web page relating to a business for the mobile telecommunications device user's own use. It may also be pre-printed.

As described below, the primary benefit of incorporating a Netpage pointer or pen in another device is synergy. A Netpage pointer or pen incorporated in a mobile phone, smartphone or telecommunications-enabled PDA, for example, allows the device to act as both a Netpage pointer and as a relay between the pointer and the mobile phone network and hence a Netpage server. When the pointer is used to interact with a page, the target application of the interaction can display information on the phone display and initiate further interaction with the user via the phone touchscreen. The pointer is most usefully configured so that its "nib" is in a corner of the phone body, allowing the user to easily manipulate the phone to designate a tagged surface.

The phone can incorporate a marking nib and optionally a continuous force sensor to provide full Netpage pen functionality.

An exemplary Netpage interaction will now be described to show how a sensing device in the form of a Netpage enabled mobile device interacts with the coded data on a print medium in the form of a card. Whilst in the preferred form the print medium is a card generated by the mobile device or another mobile device, it can also be a commercially pre-printed card that is purchased or otherwise provided as part of a commercial transaction. The print medium can also be a page of a book, magazine, newspaper or brochure, for example.

The mobile device senses a tag using an area image sensor and detects tag data. The mobile device uses the sensed data tag to generate interaction data, which is sent via a mobile telecommunications network to a document server. The document server uses the ID to access the document description, and interpret the interaction. In appropriate circumstances, the document server sends a corresponding message to an application server, which can then perform a corresponding action.

Typically Netpage pen and Netpage-enabled mobile device users register with a registration server, which associates the user with an identifier stored in the respective Netpage pen or Netpage enabled mobile device. By providing the sensing device identifier as part of the interaction data, this allows users to be identified, allowing transactions or the like to be performed.

Netpage documents are generated by having an ID server generate an ID which is transferred to the document server. The document server determines a document description and then records an association between the document description and the ID, to allow subsequent retrieval of the document description using the ID.

The ID is then used to generate the tag data, as will be described in more detail below, before the document is printed by a suitable printer, using the page description and the tag map.

Each tag is represented by a pattern which contains two kinds of elements. The first kind of element is a target. Targets allow a tag to be located in an image of a coded surface, and allow the perspective distortion of the tag to be inferred. The second kind of element is a macrodot. Each macrodot encodes the value of a bit by its presence or absence.

The pattern is represented on the coded surface in such a way as to allow it to be acquired by an optical imaging system, and in particular by an optical system with a narrowband response in the near-infrared. The pattern is typically printed onto the surface using a narrowband near-infrared ink.

In the preferred embodiment, the region typically corresponds to the entire surface of an M-Print card, and the region ID corresponds to the unique M-Print card ID. For clarity in the following discussion we refer to items and IDs, with the understanding that the ID corresponds to the region ID.

The surface coding is designed so that an acquisition field of view large enough to guarantee acquisition of an entire tag is large enough to guarantee acquisition of the ID of the region containing the tag. Acquisition of the tag itself guarantees acquisition of the tag's two-dimensional position within the region, as well as other tag-specific data. The surface coding therefore allows a sensing device to acquire a region ID and a tag position during a purely local interaction with a coded surface, e.g. during a "click" or tap on a coded surface with a pen.

Example Tag Structure

A wide range of different tag structures (as described in the assignee's various cross-referenced Netpage applications) can be used. The preferred tag will now be described in detail.

Figure 74:
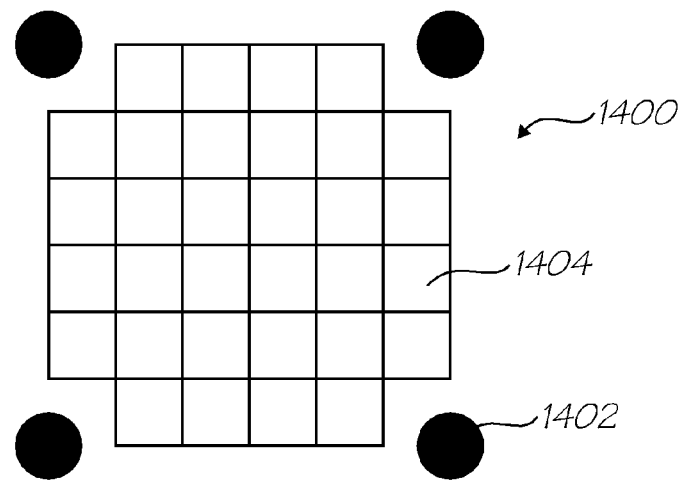
FIG. 74 shows the structure of a single Netpage tag.

FIG. 74 shows the structure of a complete tag 1400. Each of the four black circles 1402 is a target. The tag 1400, and the overall pattern, has four-fold rotational symmetry at the physical level. Each square region 1404 represents a symbol, and each symbol represents four bits of information.

Figure 75:
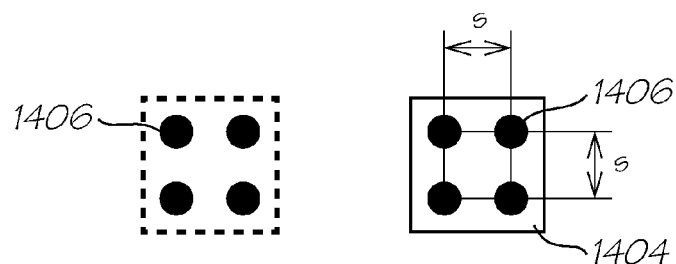
FIG. 75 shows the structure of a single symbol within a Netpage tag.

FIG. 75 shows the structure of a symbol. It contains four macrodots 1406, each of which represents the value of one bit by its presence (one) or absence (zero). The macrodot spacing is specified by the parameter s throughout this document. It has a nominal value of 143 µm, based on 9 dots printed at a pitch of 1600 dots per inch. However, it is allowed to vary by ±10% according to the capabilities of the device used to produce the pattern.

Figure 76:
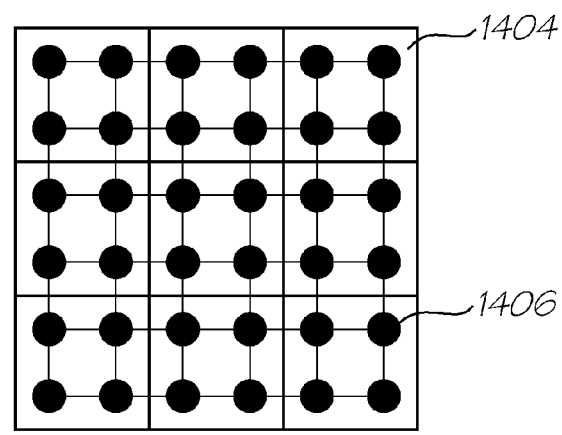
FIG. 76 shows an array of nine adjacent symbols.

FIG. 76 shows an array of nine adjacent symbols. The macrodot spacing is uniform both within and between symbols.

FIG. 77 shows the ordering of the bits within a symbol. Bit zero (b0) is the least significant within a symbol; bit three (b3) is the most significant. Note that this ordering is relative to the orientation of the symbol. The orientation of a particular symbol within the tag 1400 is indicated by the orientation of the label of the symbol in the tag diagrams. In general, the orientation of all symbols within a particular segment of the tag have the same orientation, consistent with the bottom of the symbol being closest to the centre of the tag.

Only the macrodots 1406 are part of the representation of a symbol in the pattern. The square outline 1404 of a symbol is used in this document to more clearly elucidate the structure of a tag 1400. FIG. 78, by way of illustration, shows the actual pattern of a tag 1400 with every bit set. Note that, in practice, every bit of a tag 1400 can never be set.

A macrodot 1406 is nominally circular with a nominal diameter of (5/9)s. However, it is allowed to vary in size by ±10% according to the capabilities of the device used to produce the pattern.

A target 1402 is nominally circular with a nominal diameter of (17/9)s. However, it is allowed to vary in size by ±10% according to the capabilities of the device used to produce the pattern.

The tag pattern is allowed to vary in scale by up to ±10% according to the capabilities of the device used to produce the pattern. Any deviation from the nominal scale is recorded in the tag data to allow accurate generation of position samples.

Each symbol shown in the tag structure in FIG. 74 has a unique label. Each label consists an alphabetic prefix and a numeric suffix.

Tag Group

Tags are arranged into tag groups. Each tag group contains four tags arranged in a square. Each tag therefore has one of four possible tag types according to its location within the tag group square. The tag types are labelled 00, 10, 01 and 11, as shown in FIG. 79.

Figures 80, 81:
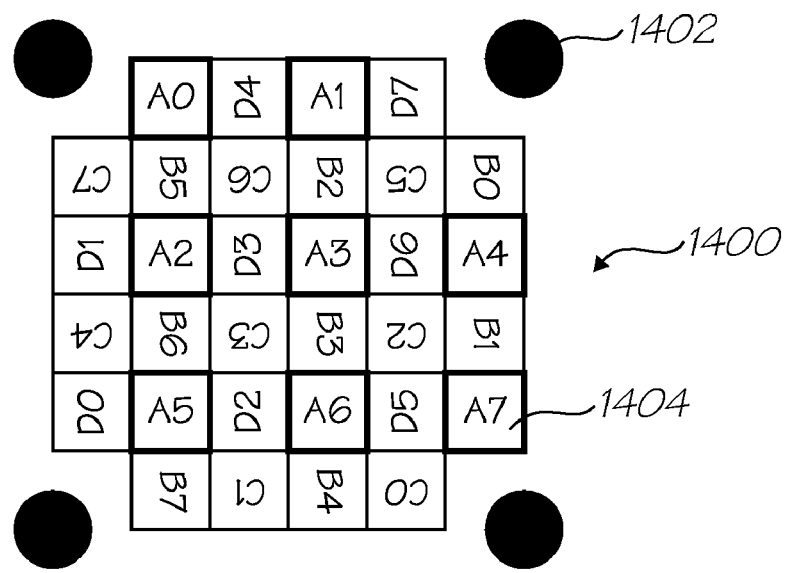
FIG. 80 shows the tag groups repeated in a continuous tile pattern.
FIG. 81 shows the contiguous tile pattern of tag groups, each with four different tag types.

FIG. 80 shows how tag groups are repeated in a continuous tiling of tags. The tiling guarantees the any set of four adjacent tags contains one tag of each type.

Codewords

The tag contains four complete codewords. Each codeword is of a punctured $2^4$-ary (8,5) Reed-Solomon code. Two of the codewords are unique to the tag. These are referred to as local and are labelled A and B. The tag therefore encodes up to 40 bits of information unique to the tag.

The remaining two codewords are unique to a tag type, but common to all tags of the same type within a contiguous tiling of tags. These are referred to as global and are labelled C and D, subscripted by tag type. A tag group therefore encodes up to 160 bits of information common to all tag groups within a contiguous tiling of tags. The layout of the four codewords is shown in FIG. 81.

Reed-Solomon Encoding

Codewords are encoded using a punctured $2^4$-ary (8,5) Reed-Solomon code. A $2^4$-ary (8,5) Reed-Solomon code encodes 20 data bits (i.e. five 4-bit symbols) and 12 redundancy bits (i.e. three 4-bit symbols) in each codeword. Its error-detecting capacity is three symbols. Its error-correcting capacity is one symbol. More information about Reed-Solomon encoding in the Netpage context is provide in U.S. Ser. No. 10/815,647, filed on Apr. 2, 2004, the contents of which are herein incorporated by cross-reference.

Netpage in a Mobile Environment

Figure 82:
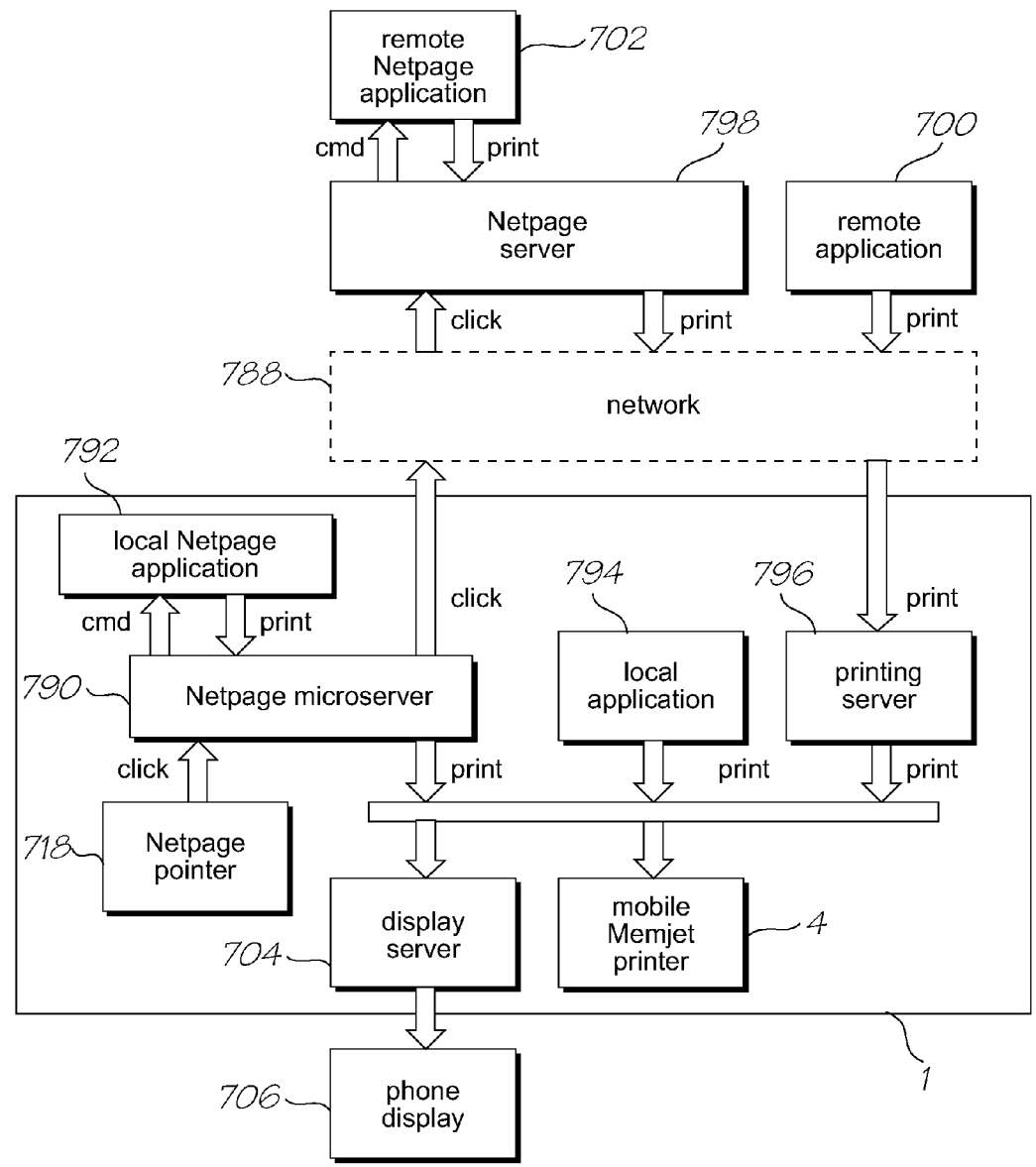
FIG. 82 is an architectural overview of a Netpage enabled mobile phone within the broader Netpage system.

FIG. 82 provides an overview of the architecture of the Netpage system, incorporating local and remote applications and local and remote Netpage servers. The generic Netpage system is described extensively in many of the assignee's patents and co-pending applications, (such as U.S. Ser. No. 09/722,174, and so is not described in detail here. However, a number of extensions and alterations to the generic Netpage system are used as part of implementing various Netpage-based functions into a mobile device. This applies both to Netpage-related sensing of coded data on a print medium being printed (or about to be printed) and to a Netpage-enabled mobile device with or without a printer.

Referring to FIG. 82, a Netpage microserver 790 running on the mobile phone 1 provides a constrained set of Netpage functions oriented towards interpreting clicks rather than interpreting general digital ink. When the microserver 790 accepts a click event from the pointer driver 718 it interprets it in the usual Netpage way. This includes retrieving the page description associated with the click impression ID, and hit testing the click location against interactive elements in a page description. This may result in the microserver identifying a command element and sending the command to the application specified by the command element. This functionality is described in many of the earlier Netpage applications cross-referenced above.

The target application may be a local application 792 or a remote application 700 accessible via the network 788. The microserver 790 may deliver a command to a running application or may cause the application to be launched if not already running.

If the microserver 790 receives a click for an unknown impression ID, then it uses the impression ID to identify a network-based Netpage server 798 capable of handling the click, and forwards the click to that server for interpretation. The Netpage server 798 may be on a private intranet accessible to the mobile telecommunications device, or may be on the public Internet.

For a known impression ID the microserver 790 may interact directly with a remote application 700 rather than via the Netpage server 798.

In the event that the mobile device includes a printer 4, an optional printing server 796 is provided. The printing server 796 runs on the mobile phone 1 and accepts printing requests from remote applications and Netpage servers. When the printing server accepts a printing request from an untrusted application, it may require the application to present a single-use printing token previously issued by the mobile telecommunications device.

A display server 704 running on the mobile telecommunications device accepts display requests from remote applications and Netpage servers. When the display server 704 accepts a display request from an untrusted application, it may require the application to present a single-use display token previously issued by the mobile telecommunications device. The display server 704 controls the mobile telecommunications device display 750.

Figure 83:
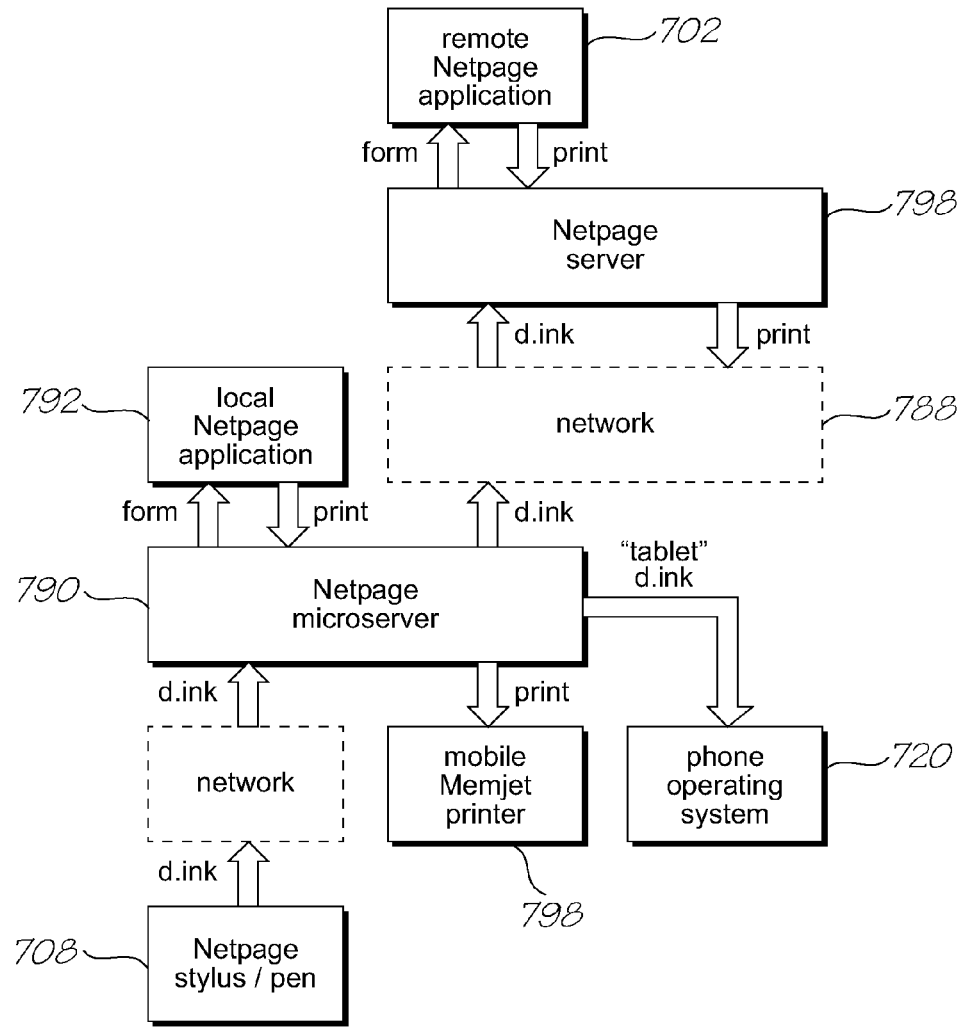
FIG. 83 shows an architectural overview of the mobile phone microserver as a relay between the stylus and the Netpage server.

As illustrated in FIG. 83, the mobile telecommunications device may act as a relay for a Netpage stylus, pen, or other Netpage input device 708. If the microserver 790 receives digital ink for an unknown impression ID, then it uses the impression ID to identify a network-based Netpage server 798 capable of handling the digital ink, and forwards the digital ink to that server for interpretation.

Although not required to, the microserver 790 can be configured to have some capability for interpreting digital ink. For example, it may be capable of interpreting digital ink associated with checkboxes and drawings fields only, or it may be capable of performing rudimentary character recognition, or it may be capable of performing character recognition with the help of a remote server.

The microserver can also be configured to enable routing of digital ink captured via a Netpage "tablet" to the mobile telecommunications device operating system. A Netpage tablet may be a separate surface, pre-printed or printed on demand, or it may be an overlay or underlay on the mobile telecommunications device display.

The Netpage pointer incorporates the same image sensor and image processing ASIC (referred to as "Jupiter", and described in detail below) developed for and used by the Netpage pen. Jupiter responds to a contact switch by activating an illumination LED and capturing an image of a tagged surface. It then notifies the mobile telecommunications device processor of the "click". The Netpage pointer incorporates a similar optical design to the Netpage pen, but ideally with a smaller form factor. The smaller form factor is achieved with a more sophisticated multi-lens design, as described below.

Obtaining Media Information Directly from Netpage Tags

Media information can be obtained directly from the Netpage tags. It has the advantage that no data track is required, or only a minimal data track is required, since the Netpage identifier and digital signatures in particular can be obtained from the Netpage tag pattern.

The Netpage tag sensor is capable of reading a tag pattern from a snapshot image. This has the advantage that the image can be captured as the card enters the paper path, before it engages the transport mechanism, and even before the printer controller is activated, if necessary.

A Netpage tag sensor capable of reading tags as the media enters or passes through the media feed path is described in detail in the Netpage Clicker sub-section below (see FIGS. 84 and 85).

Conversely, the advantage of reading the tag pattern during transport (either during a reading phase or during the printing phase), is that the printer can obtain exact information about the lateral and longitudinal registration between the Netpage tag pattern and the visual content printed by the printer. Whilst a single captured image of a tag can be used to determine registration in either or both directions, it is preferred to determine the registration based on at least two captured images. The images can be captured sequentially by a single sensor, or two sensors can capture them simultaneously or sequentially. Various averaging approaches can be taken to determine a more accurate position in either or both direction from two or more captured images than would be available by replying on a single image.

If the tag pattern can be rotated with respect to the printhead, either due to the manufacturing tolerances of the card itself or tolerances in the paper path, it is advantageous to read the tag pattern to determine the rotation. The printer can then report the rotation to the Netpage server, which can record it and use it when it eventually interprets digital ink captured via the card. Whilst a single captured image of a tag can be used to determine the rotation, it is preferred to determine the rotation based on at least two captured images. The images can be captured sequentially by a single sensor, or two sensors can capture them simultaneously or sequentially. Various averaging approaches can be taken to determine a more accurate rotation from two or more captured images than would be available by replying on a single image.

Netpage Options

The following media coding options relate to the Netpage tags. Netpage is described in more detail in a later section.

Netpage Tag Orientation

The card can be coded to allow the printer to determine, possibly prior to commencing printing, the orientation of Netpage tags on the card in relation to the printhead. This allows the printer to rotate page graphics to match the orientation of the Netpage tags on the card, prior to commencing printing. It also allows the printer to report the orientation of the Netpage tags on the card for recording by a Netpage server.

Netpage Tag Position

If lateral and longitudinal registration and motion tracking, as discussed above, is achieved by means other than via the media coding, then any misregistration between the media coding itself and the printed content, either due to manufacturing tolerances in the card itself or due to paper path tolerances in the printer, can manifest themselves as a lateral and/or longitudinal registration error between the Netpage tags and the printed content. This in turn can lead to a degraded user experience. For example, if the zone of a hyperlink may fail to register accurately with the visual representation of the hyperlink.

As discussed above in relation to card position, the media coding can provide the basis for accurate lateral and longitudinal registration and motion tracking of the media coding itself, and the printer can report this registration to the Netpage server alongside the Netpage identifier. The Netpage server can record this registration information as a two-dimensional offset which corrects for any deviation between the nominal and actual registration, and correct any digital ink captured via the card accordingly, before interpretation.

Netpage Identity

The card can be coded to allow the printer to determine the unique 96-bit Netpage identifier of the card. This allows the printer to report the Netpage identifier of the card for recording by a Netpage server (which associates the printed graphics and input description with the identity).

The card can be coded to allow the printer to determine the unique Netpage identifier of the card from either side of the card. This allows printer designers the flexibility of reading the Netpage identifier from the most convenient side of the card.

The card can be coded to allow the printer to determine if it is an authorised Netpage card. This allows the printer to not perform the Netpage association step for an un-authorised card, effectively disabling its Netpage interactivity. This prevents a forged card from preventing the use of a valid card with the same Netpage identifier.

The card can be coded to allow the printer to determine both the Netpage identifier and a unique digital signature associated with the Netpage identifier. This allows the printer to prevent forgery using a digital signature verification mechanism already in place for the purpose of controlling interactions with Netpage media.

Netpage Interactivity

Substantially all the front side of the card can be coded with Netpage tags to allow a Netpage sensing device to interact with the card subsequent to printing. This allows the printer to print interactive Netpage content without having to include a tag printing capability. If the back side of the card is blank and printable, then substantially the entire back side of the card can be coded with Netpage tags to allow a Netpage sensing device to interact with the card subsequent to printing. This allows the printer to print interactive Netpage content without having to include a tag printing capability.

The back side of the card can be coded with Netpage tags to allow a Netpage sensing device to interact with the card. This allows interactive Netpage content to be pre-printed on the back of the card.

Cryptography

Blank media designed for use with the preferred embodiment are pre-coded to satisfy a number of requirements, supporting motion sensing and Netpage interactivity, and protecting against forgery.

The Applicant's co-pending application Ser. No. 11/124, 167 (temporarily identified by its docket number until a serial number is assigned) describes authentication mechanisms that can be used to detect and reject forged or un-coded blank media. The co-pending application is one of the above listed cross referenced documents whose disclosures are incorporated herein.

Netpage Clicker

Figure 84:
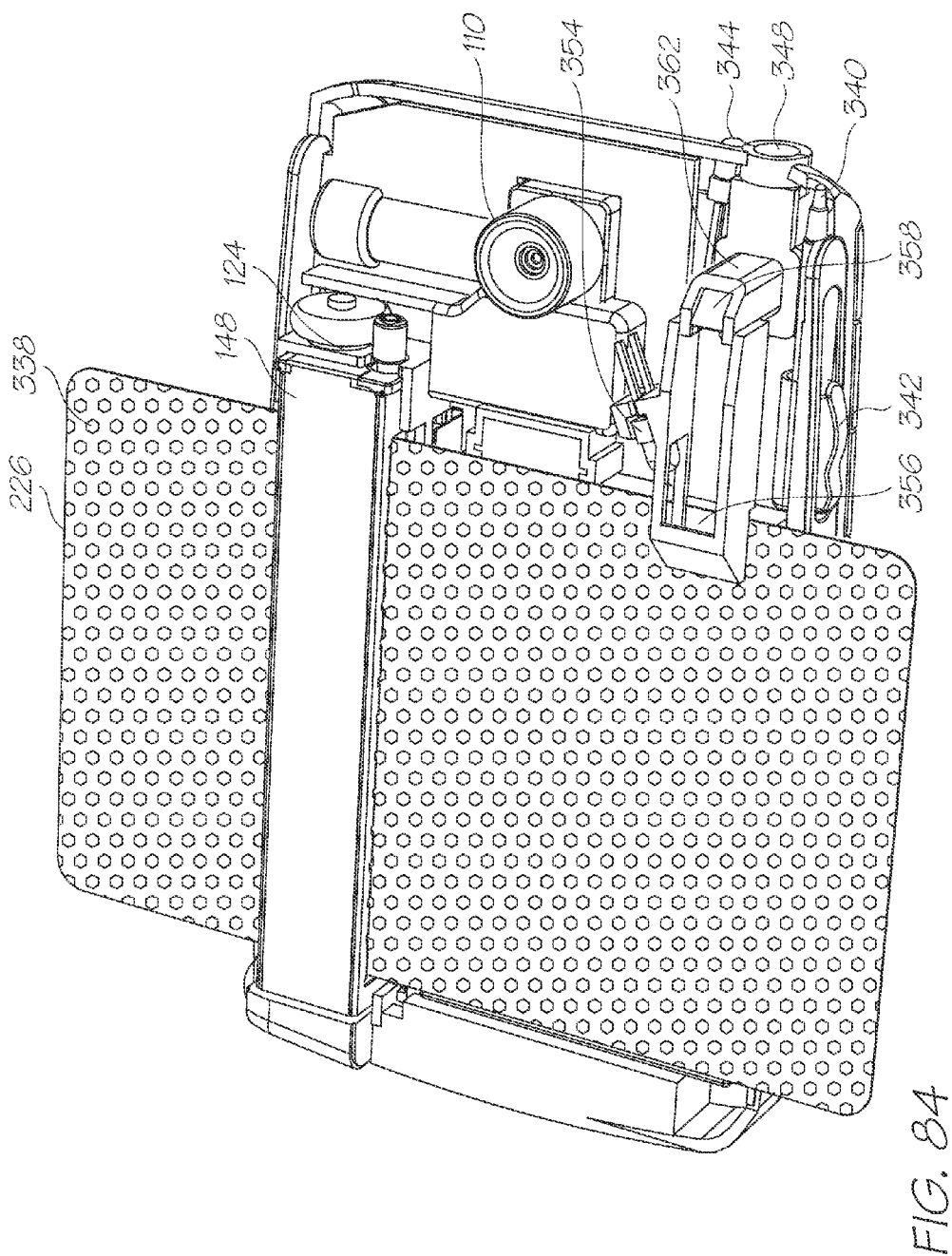
FIG. 84 is a perspective of a Netpage enabled mobile phone with the rear moulding removed.
Figure 85:
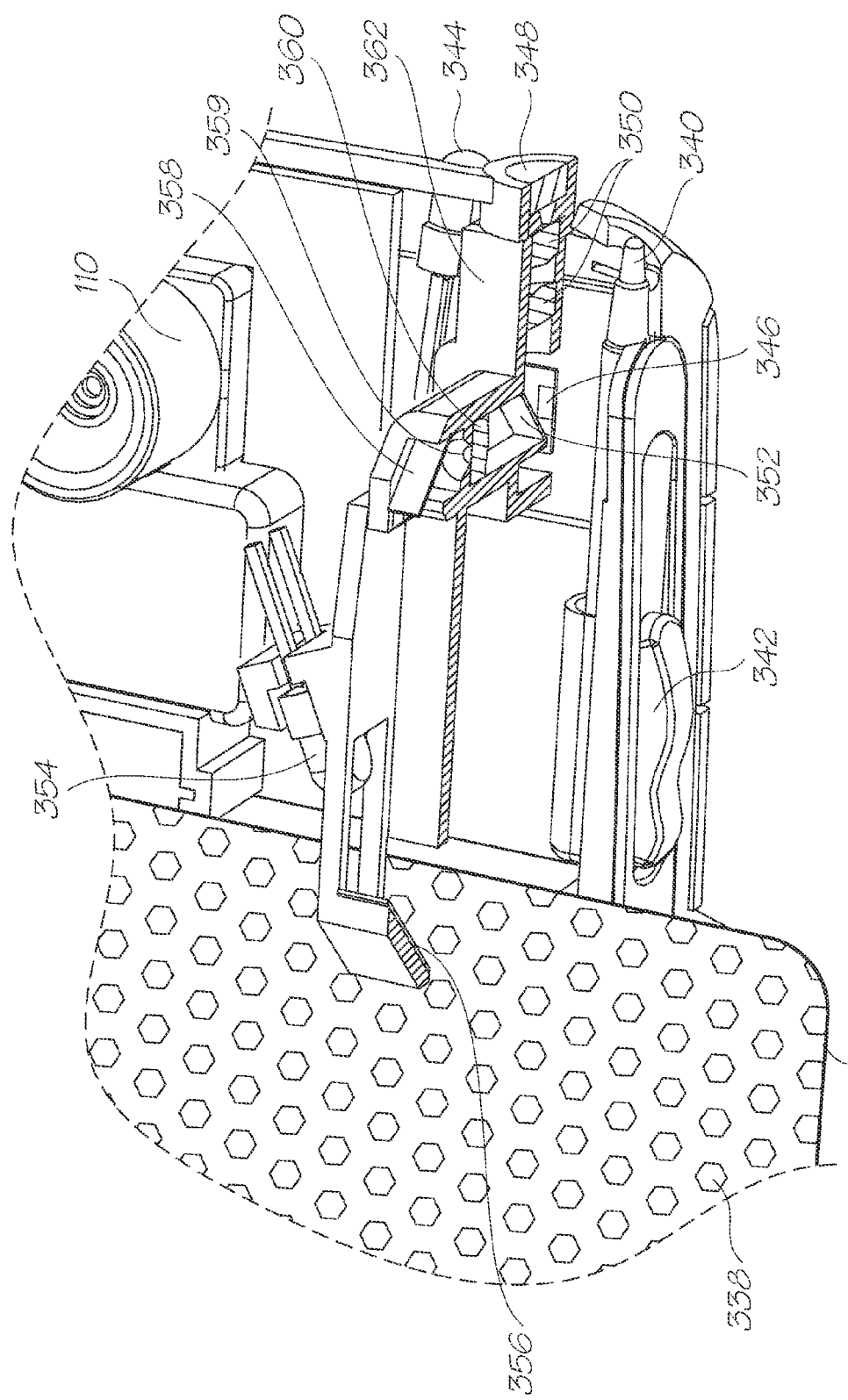
FIG. 85 is a partial enlarged perspective of the phone shown in FIG. 140 with the Netpage clicker partially sectioned.

An alternative embodiment of the invention is shown in FIGS. 84 and 85, in which the mobile device includes a Netpage clicker module 362. This embodiment includes a printer and uses a dual optical pathway arrangement to sense coded data from media outside the mobile device as well as coded data pre-printed on media as it passes through the device for printing.

The Netpage clicker in the preferred embodiment forms part of a dual optical path Netpage sensing device. The first path is used in the Netpage clicker, and the second operates to read coded data from the card as it enters the mobile telecommunications device for printing. As described below, the coded data on the card is read to ensure that the card is of the correct type and quality to enable printing.

The Netpage clicker includes a non-marking nib 340 that exits the top of the mobile telecommunications device. The nib 340 is slidably mounted to be selectively moveable between a retracted position, and an extended position by manual operation of a slider 342. The slider 342 is biased outwardly from the mobile telecommunications device, and includes a ratchet mechanism (not shown) for retaining the nib 340 in the extended position. To retract the nib 340, the user depresses the slider 342, which disengages the ratchet mechanism and enables the nib 340 to return to the retracted position. One end of the nib abuts a switch (not shown), which is operatively connected to circuitry on the PCB.

Working from one end of the first optical path to the other, a first infrared LED 344 is mounted to direct infrared light out of the mobile device via an aperture to illuminate an adjacent surface (not shown). Light reflected from the surface passes through an infrared filter 348, which improves the signal to noise ratio of the reflected light by removing most non-infrared ambient light. The reflected light is focused via a pair of lenses 350 and then strikes a plate beam splitter 352. It will be appreciated that the beam splitter 352 can include one or more thin-film optical coatings to improve its performance.

A substantial portion of the light is deflected downwardly by the plate splitter and lands on an image sensor 346 that is mounted on the PCB. The image sensor 346 in the preferred embodiment takes the form of the Jupiter image sensor and processor described in detail below. It will be appreciated that a variety of commercially available CCD and CMOS image sensors would also be suitable.

The particular position of the nib, and orientation and position of the first optical path within the casing enables a user to interact with Netpage interactive documents as described elsewhere in the detailed description. These Netpage documents can include media printed by the mobile device itself, as well as other media such as preprinted pages in books, magazines, newspapers and the like.

The second optical path starts with a second infrared LED 354, which is mounted to shine light onto a surface of a card 226 when it is inserted in the mobile telecommunications device for printing. The light is reflected from the card 226, and is turned along the optical path by a first turning mirror 356 and a second turning mirror 358. The light then passes through an aperture 359 a lens 360 and the beam splitter 352 and lands on the image sensor 346.

The mobile device is configured such that both LEDs 344 and 354 turned off when a card is not being printed and the nib is not being used to sense coded data on an external surface. However, once the nib is extended and pressed onto a surface with sufficient force to close the switch, the LED 344 is illuminated and the image sensor 346 commences capturing images.

Although a non-marking nib has been described, a marking nib, such as a ballpoint or felt-tip pen, can also be used. Where a marking nib is used, it is particularly preferable to provide the retraction mechanism to allow the nib to selectively be withdrawn into the casing. Alternatively, the nib can be fixed (ie, no retraction mechanism is provided).

In other embodiments, the switch is simply omitted (and the device operates continuously, preferably only when placed into a capture mode) or replaced with some other form of pressure sensor, such as a piezo-electric or semiconductor-based transducer. In one form, a multi-level or continuous pressure sensor is utilized, which enables capture of the actual force of the nib against the writing surface during writing. This information can be included with the position information that comprises the digital ink generated by the device, which can be used in a manner described in detail in many of the assignee's cross-referenced Netpage-related applications. However, this is an optional capability.

It will be appreciated that in other embodiments a simple Netpage sensing device can also be included in a mobile device that does not incorporate a printer.

In other embodiments, one or more of the turning mirrors can be replaced with one or more prisms that rely on boundary reflection or silvered (or half silvered) surfaces to change the course of light through the first or second optical paths. It is also possible to omit either of the first or second optical paths, with corresponding removal of the capabilities offered by those paths.

Image Sensor and Associated Processing Circuitry

In the preferred embodiment, the Netpage sensor is a monolithic integrated circuit that includes an image sensor, analog to digital converter (ADC), image processor and interface, which are configured to operate within a system including a host processor. The applicants have codenamed the monolithic integrated circuit "Jupiter". The image sensor and ADC are codenamed "Ganymede" and the image processor and interface are codenamed "Callisto".

In a preferred embodiment of the invention, the image sensor is incorporated in a Jupiter image sensor as described in co-pending application U.S. Ser. No. 10/778,056, filed on Feb. 17, 2004, the contents of which are incorporated herein by cross-reference Various alternative pixel designs suitable for incorporation in the Jupiter image sensor are described in PCT application PCT/AU/02/01573 entitled "Active Pixel Sensor", filed 22 Nov. 2002; and PCT application PCT/AU02/01572 entitled "Sensing Device with Ambient Light Minimisation", filed 22 Nov. 2002; the contents of which are incorporated herein by cross reference.

It should appreciated that the aggregation of particular components into functional or codenamed blocks is not necessarily an indication that such physical or even logical aggregation in hardware is necessary for the functioning of the present invention. Rather, the grouping of particular units into functional blocks is a matter of design convenience in the particular preferred embodiment that is described. The intended scope of the present invention embodied in the detailed description should be read as broadly as a reasonable interpretation of the appended claims allows.

Image Sensor

Jupiter comprises an image sensor array, ADC (Analog to Digital Conversion) function, timing and control logic, digital interface to an external microcontroller, and implementation of some of the computational steps of machine vision algorithms.

Figure 86:
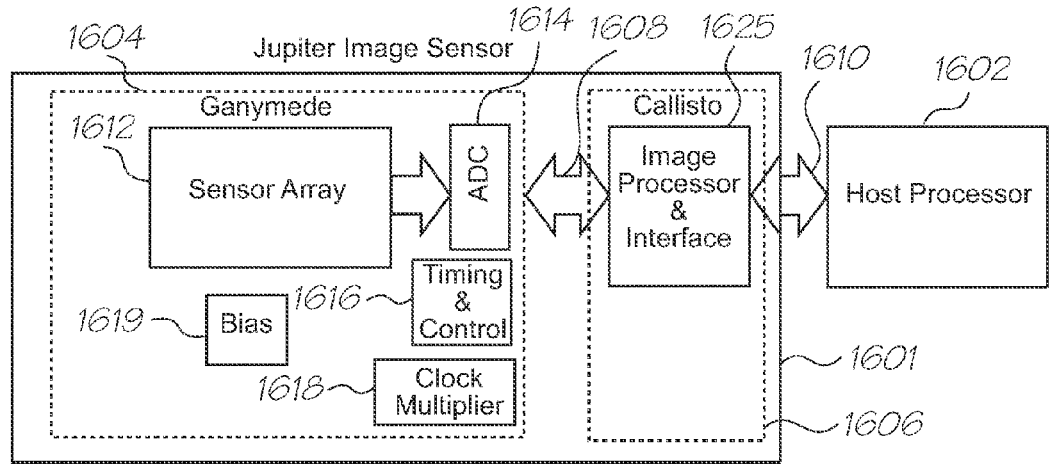
FIG. 86 is a system level diagram of the Jupiter monolithic integrated circuit.

FIG. 86 shows a system-level diagram of the Jupiter monolithic integrated circuit 1601 and its relationship with a host processor 1602. Jupiter 1601 has two main functional blocks: Ganymede 1604 and Callisto 1606. As described below, Ganymede comprises a sensor array 1612, ADC 1614, timing and control logic 1616, clock multiplier PLL 1618, and bias control 1619. Callisto comprises the image processing, image buffer memory, and serial interface to a host processor. A parallel interface 1608 links Ganymede 4 with Callisto 6, and a serial interface 1610 links Callisto 1606 with the host processor 2.

The internal interfaces in Jupiter are used for communication among the different internal modules.

Ganymede Image Sensor

Features

Sensor array 8-bit digitisation of the sensor array output

Ddigital image output to Callisto

Clock multiplying PLL

Figure 87:
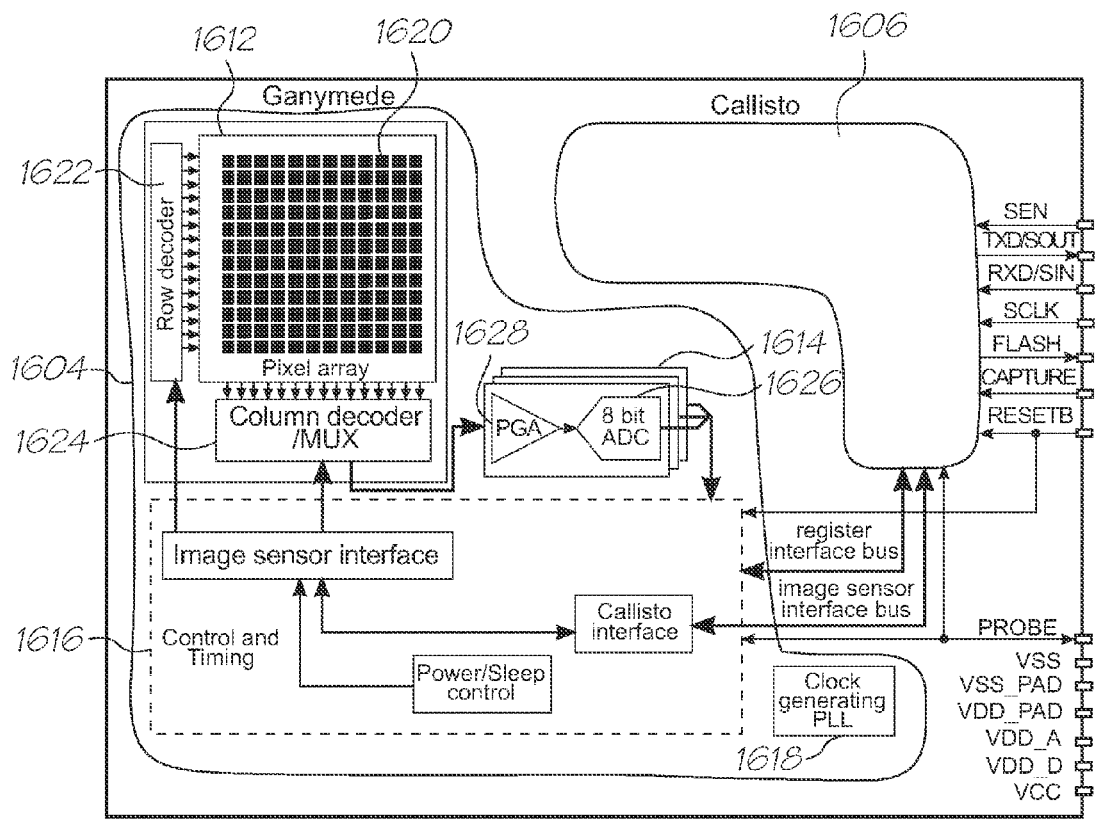
FIG. 87 is a simplified circuit diagram of the Ganymede image sensor and analogue to digital converter.

As shown in FIG. 87, Ganymede 1604 comprises a sensor array 1612, an ADC block 1614, a control and timing block 1616 and a clock-multiplying phase lock loop (PLL) 1618 for providing an internal clock signal. The sensor array 1612 comprises pixels 1620, a row decoder 1622, and a column decoder/MUX 1624. The ADC block 1614 includes an 8-bit ADC 26 and a programmable gain amplifier (PGA) 1628. The control and timing block 1616 controls the sensor array 1612, the ADC 1614, and the PLL 1618, and provides an interface to Callisto 1606.

Callisto

Callisto is an image processor 1625 designed to interface directly to a monochrome image sensor via a parallel data interface, optionally perform some image processing and pass captured images to an external device via a serial data interface.

Features

Parallel interface to image sensor
Frame store buffer to decouple parallel image sensor interface and external serial interface
Double buffering of frame store data to eliminate buffer loading overhead
Low pass filtering and sub-sampling of captured image
Local dynamic range expansion of sub-sampled image
Thresholding of the sub-sampled, range-expanded image
Read-out of pixels within a defined region of the captured image, for both processed and unprocessed images
Calculation of sub-pixel values
Configurable image sensor timing interface
Configurable image sensor size
Configurable image sensor window
Power management: auto sleep and wakeup modes
External serial interface for image output and device management
External register interface for register management on external devices Environment Callisto interfaces to both an image sensor, via a parallel interface, and to an external device, such as a microprocessor, via a serial data interface. Captured image data is passed to Callisto across the parallel data interface from the image sensor. Processed image data is passed to the external device via the serial interface. Callisto's registers are also set via the external serial interface.

Function

The Callisto image processing core accepts image data from an image sensor and passes that data, either processed or unprocessed, to an external device using a serial data interface. The rate at which data is passed to that external device is decoupled from whatever data read-out rates are imposed by the image sensor.

The image sensor data rate and the image data rate over the serial interface are decoupled by using an internal RAM-based frame store. Image data from the sensor is written into the frame store at a rate to satisfy image sensor read-out requirements. Once in the frame store, data can be read out and transmitted over the serial interface at whatever rate is required by the device at the other end of that interface.

Callisto can optionally perform some image processing on the image stored in its frame store, as dictated by user configuration. The user may choose to bypass image processing and obtain access to the unprocessed image. Sub-sampled images are stored in a buffer but fully processed images are not persistently stored in Callisto; fully processed images are immediately transmitted across the serial interface. Callisto provides several image process related functions:

Sub-sampling
Local dynamic range expansion
Thresholding
Calculation of sub-pixel values
Read-out of a defined rectangle from the processed and unprocessed image
Sub-sampling, local dynamic range expansion and thresholding are typically used in conjunction with dynamic range expansion performed on sub-sampled images, and thresholding performed on sub-sampled, range-expanded images. Dynamic range expansion and thresholding are performed together, as a single operation, and can only be performed on sub-sampled images. Sub-sampling, however, may be performed without dynamic range expansion and thresholding. Retrieval of sub-pixel values and image region read-out are standalone functions.

A number of specific alternative optics systems for sensing Netpage tags using the mobile device are described in detail in the Applicant's co-pending application Ser. No. 11/124,167. In the interests of brevity, the disclosure of Ser. No. 11/124,167 has been incorporated herein by cross reference (see list of cross referenced documents above).

The invention can also be embodied in a number of other form factors, one of which is a PDA. This embodiment is described in detail in the Applicant's co-pending application temporarily identified by Ser. No. 11/124,167 until its serial number is assigned. In the interests of brevity, the disclosure of Ser. No. 11/124,167 has been incorporated herein by cross reference (see list of cross referenced documents above).

Another embodiment is the Netpage camera phone. Printing a photo as a Netpage and a camera incorporating a Netpage printer are both claimed in WO 00/71353 (NPA035), *Method and System for Printing a Photograph* and WO 01/02905 (NPP019), *Digital Camera with Interactive Printer*, the contents of which are incorporated herein by way of cross-reference. When a photo is captured and printed using a Netpage digital camera, the camera also stores the photo image persistently on a network server. The printed photo, which is Netpage tagged, can then be used as a token to retrieve the photo image.

A camera-enabled smartphone can be viewed as a camera with an in-built wireless network connection. When the camera-enabled smartphone incorporates a Netpage printer, as described above, it becomes a Netpage camera.

When the camera-enabled smartphone also incorporates a Netpage pointer or pen, as described above, the pointer or pen can be used to designate a printed Netpage photo to request a printed copy of the photo. The phone retrieves the original photo image from the network and prints a copy of it using its in-built Netpage printer. This is done by sending at least the identity of the printed document to a Netpage server. This information alone may be enough to allow the photo to be retrieved for display or printing. However, in the preferred embodiment, the identity is sent along with at least a position of the pen/clicker as determined A mobile phone or smartphone Netpage camera can take the form of any of the embodiments described above that incorporate a printer and a mobile phone module including a camera.

Further embodiments of the invention incorporate a stylus that has an inkjet printhead nib. This embodiment is described in detail in the Applicant's co-pending application temporarily identified by Ser. No. 11/124,167 until its serial number is assigned. In the interests of brevity, the disclosure of Ser. No. 11/124,167 has been incorporated herein by cross reference (see list of cross referenced documents above).

The cross referenced application also briefly lists some of the possible applications for the M-Print system. It also discusses embodiments in which the Netpage tag pattern is printed simultaneously with the visible images.

CONCLUSION

The present invention has been described with reference to a number of specific embodiments. It will be understood that where the invention is claimed as a method, the invention can also be defined by way of apparatus or system claims, and vice versa. The assignee reserves the right to file further applications claiming these additional aspects of the invention.

Furthermore, various combinations of features not yet claimed are also aspects of the invention that the assignee reserves the right to make the subject of future divisional and continuation applications as appropriate.

We claim:

1. A method of determining a first relative rotation of coded data on a print medium to be printed on by a mobile device that has a printer, a first sensor and processing means, the print medium comprising a substrate defining first and second opposite faces, the first face bearing coded data, the method comprising the steps of:
   (a) capturing a first image of the coded data when the print medium is at a first position using the first sensor;
   (b) determining a first relative rotation of the coded data with respect to the print medium from a known physical orientation of the print medium and the first image, using the processing means;
   (c) capturing a second image of the coded data when the print medium is at a second position using the first sensor;
   (d) determining a second relative rotation of the coded data with respect to the print medium from a known physical orientation of the print medium and the second image, using the processing means; and
   (e) calculating a third rotation from the first and second rotations using the processing means; wherein,
      the third rotation is a more precise measure of the first relative rotation than the first relative rotation or the second relative rotation.

2. A method according to claim 1, wherein the mobile device further includes a transmitter, the method further including the step of transmitting, using the transmitter, the first relative rotation to a remote computer system.

3. A method according to claim 2, wherein the transmitter is configured to transmit the relative rotation via a mobile telecommunications network.

4. A method according to claim 1, wherein the mobile device further includes a transmitter, the method further including the step of transmitting, using the transmitter, the third relative rotation to a remote computer system.

5. A method according to claim 1, further including the steps, performed by the processing means, of:
   decoding at least some of the coded data in the first image;
   determining a location from the decoded data; and
   determining, based on the location and a position of the coded data within the first image, a first position of the print medium relative to the first sensor at time the first image was captured.

6. A method according to claim 1, wherein determining the movement includes capturing a plurality of images of the coded data as the print medium moves past the first sensor, and determining the movement based on the plurality of images.

7. A method according to claim 1, the mobile device further including a light emitting device, the method including the step of using the light emitting device to illuminate the print medium while the first sensor senses the coded data.

8. A method according to claim 7, further including the steps of generating a clock signal based on the movement, and using the clock signal to synchronize the printing onto the print medium.

9. A method according to claim 1, wherein the coded data takes the form of a two-dimensional array of data, the first sensor being configured to capture an image of a subset of the coded data, the subset of the coded data being sufficient to enable the position to be determined.

10. A method according to claim 1, including the steps, performed during printing onto the print medium, of:
    using the first sensor to sense the coded data; and
    using the processing means to generate a clock signal based on the sensed coded data; and
    using the clock signal to synchronize the printing onto the print medium.

11. A method according to claim 10, wherein the step of using the first sensor to sense the coded data includes capturing a first image of the coded data, and the step of generating the clock signal includes using the processor to perform the steps of;
    determining a position of the print medium relative to the first sensor at the time the coded data was sensed, based at least partly on the determined location;
    using the first sensor to capture subsequent images of the coded data as the printhead is being printed;
    determining movement of the print medium during printing based on the subsequently captured images; and
    deriving the clock signal based on the movement.

12. A method according to claim 11, wherein determining the movement during printing includes using the processing means to perform the steps of:
    decoding the coded data captured in at least some of the subsequently captured images;
    determining a position of the print medium relative to the first sensor at the time each of the images was captured; and
    determining the movement of the print medium based on the positions determined over time.

13. A method according to claim 12, wherein determining the movement during printing includes the step of performing pattern recognition on at least some of the coded data in at least some of the captured images to determine movement of the print medium relative to initial position.

14. A method according to claim 1, wherein the print medium includes at least one orientation indicator indicative of an orientation of the print medium, the method comprising determining the orientation from the orientation indicator before commencing printing.

15. A method according to claim 14, wherein the at least one orientation indicator is disposed at or adjacent an edge of the print medium.

16. A method according to claim 15, the print medium having a leading edge and a trailing edge defined relative to intended feed direction of the print medium through a media feed path, at least one of the at least one orientation indicators being disposed on or in the print medium at or adjacent the leading edge.

17. A method according to claim 1, wherein the mobile device further comprises a second sensor and the method further including the steps of:
    using the second sensor to capture the second image of at least some of the coded data;
    using the processing means to determine, from the known physical orientation of the print medium and the second image, the second relative rotation of the coded data with respect to the print medium; and
    using the processing means to calculate, from the first and second rotations, the third rotation.

18. A method according to claim 17, including capturing the first and second images substantially simultaneously.

* * * * *